United States Patent [19]
Nair et al.

[11] Patent Number: 5,428,210
[45] Date of Patent: * Jun. 27, 1995

[54] DATA CARD TERMINAL WITH EMBOSSED CHARACTER READER AND SIGNATURE CAPTURE

[75] Inventors: Parameswaran B. Nair, Acworth, Ga.; Mark Brady, Dix Hills; Peter R. Cavicchi, N. Babylon, both of N.Y.; Kumar S. Choudhuri, Kennesaw, Ga.; Timothy W. Depew, Ft. Lauderdale, Fla.; John C. Evans, Atlanta, Ga.; Shelley K. Friedman, Boca Raton, Fla.; James H. Hamilton, Lawrenceville, Ga.; Edward G. Kligfeld, Ft. Lauderdale, Fla.; Holly B. Krahe, Deerfield Beach, Fla.; Thomas J. Liney, Boca Raton, Fla.; Murray A. Morton, Coral Springs, Fla.; Paul W. Noblett, Jr., Ft. Lauderdale, Fla.; Gregory A. Philmon, Loganville, Ga.; James F. Price; James T. Stills, both of Atlanta, Ga.; Laura J. Turner, Ft. Lauderdale; Diane T. Voght, Sunrise, both of Fla.

[73] Assignee: National Bancard Corporation, Sunrise, Fla.

[ * ] Notice: The portion of the term of this patent subsequent to Aug. 2, 2011 has been disclaimed.

[21] Appl. No.: 820,401

[22] Filed: Jan. 10, 1992

[51] Int. Cl.⁶ .................... G06K 15/20; G06K 5/00
[52] U.S. Cl. ........................ 235/375; 235/380
[58] Field of Search ............... 235/380, 449, 440, 444, 235/446, 447, 448, 375, 379, 382, 486, 483, 493; 382/3, 13; 364/408, 406, 401, 404; 902/5, 22, 24, 25, 27; 340/825.33, 825.34

[56] References Cited
U.S. PATENT DOCUMENTS
3,873,770  3/1975  Ioannou .................. 178/18

(List continued on next page.)

FOREIGN PATENT DOCUMENTS
2657981  8/1991  France ................... 235/449
0308392  12/1990  Japan ................... 235/380

OTHER PUBLICATIONS
Brochure—"DirectSolutions-Maximum Approvals For Maximum Sales", published by Citibank, 1990.
Brochure—"NaBANCO", published by NaBANCO, circa 1991.
Brochure—"VisaNet-Point-of-Sales Services", published by Visa U.S.A., 1991.

Primary Examiner—Donald Hajec
Assistant Examiner—Michael G. Lee
Attorney, Agent, or Firm—Jones & Askew

[57] ABSTRACT

A data card terminal, such as a credit card transaction terminal, is disclosed. The terminal includes a transaction terminal comprising an embossed character reader and magnetic stripe reader, with a separate signature capture printer. The transaction terminal is operative for detecting the physical presence of a data card during a card transaction. The embossed character reader employs a tactile imager and pattern recognition for detecting the embossed characters on the data card. A signature capturing printer prints a paper receipt, which is signed by a cardholder at a signature capturing window on the printer. A signature capturing system digitizes and compresses signals corresponding to the signature of the card holder. Transaction data including compressed signature signals and signals indicative of the presence of the card are transmitted to the host computer system of a transaction processor, who guarantees the transaction as chargeback-protected under certain circumstances. Also disclosed are methods for operation of the terminal, and methods for operation of transaction processor systems responsive to signals from the terminal, such as providing chargeback protected transactions and providing electronic and off-line transaction authorizations.

235 Claims, 35 Drawing Sheets

U.S. PATENT DOCUMENTS

| | | | |
|---|---|---|---|
| 3,885,108 | 5/1975 | Zock | 179/90 |
| 4,114,027 | 9/1978 | Slater et al. | 340/825.33 X |
| 4,194,685 | 3/1980 | Hill et al. | 235/375 |
| 4,555,617 | 11/1985 | Brooks et al. | 235/449 |
| 4,587,379 | 5/1986 | Masuda | 179/2 |
| 4,597,101 | 6/1986 | Kishimoto et al. | 382/3 |
| 4,707,592 | 11/1987 | Ware | 235/380 |
| 4,724,521 | 2/1988 | Carron et al. | 364/300 |
| 4,751,374 | 6/1988 | Nose | 235/380 |
| 4,782,217 | 11/1988 | Soza et al. | 235/380 |
| 4,783,823 | 11/1988 | Tasaki et al. | 382/4 |
| 4,788,420 | 11/1988 | Chang et al. | 235/483 |
| 4,809,195 | 2/1989 | Bechet | 382/3 |
| 4,861,974 | 8/1989 | Kondo et al. | 235/475 |
| 4,874,932 | 10/1989 | Kimizu | 235/379 |
| 4,935,608 | 6/1990 | Tanaka | 235/380 |
| 5,010,485 | 4/1991 | Bigari | 364/408 |
| 5,012,077 | 4/1991 | Takano | 235/380 |
| 5,045,674 | 9/1991 | Mita et al. | 235/439 |
| 5,055,838 | 10/1991 | Wise et al. | 340/870 |
| 5,091,975 | 2/1992 | Berger et al. | 382/3 |
| 5,099,111 | 3/1992 | Takakura et al. | 235/486 |
| 5,120,906 | 6/1992 | Protheroe et al. | 178/18 |
| 5,149,945 | 9/1992 | Johnson et al. | 235/380 |
| 5,151,582 | 9/1992 | Fujiok | 235/449 |
| 5,195,133 | 3/1993 | Kapp et al. | 235/380 |
| 5,285,506 | 2/1994 | Crooks et al. | 382/13 |

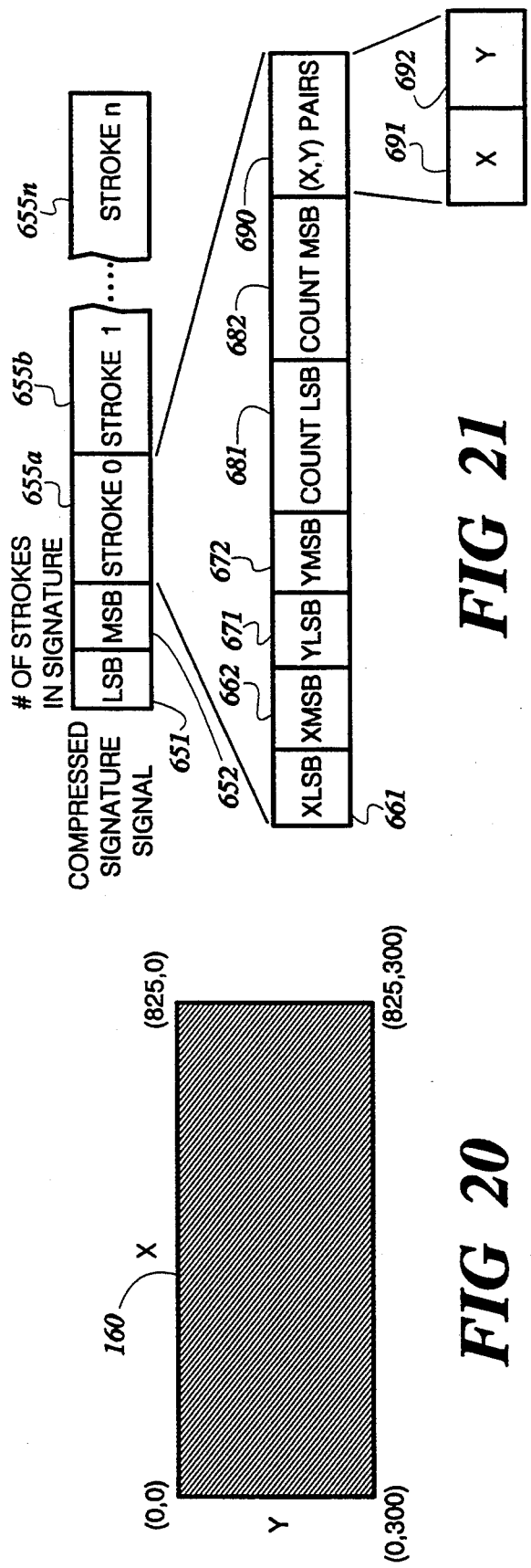

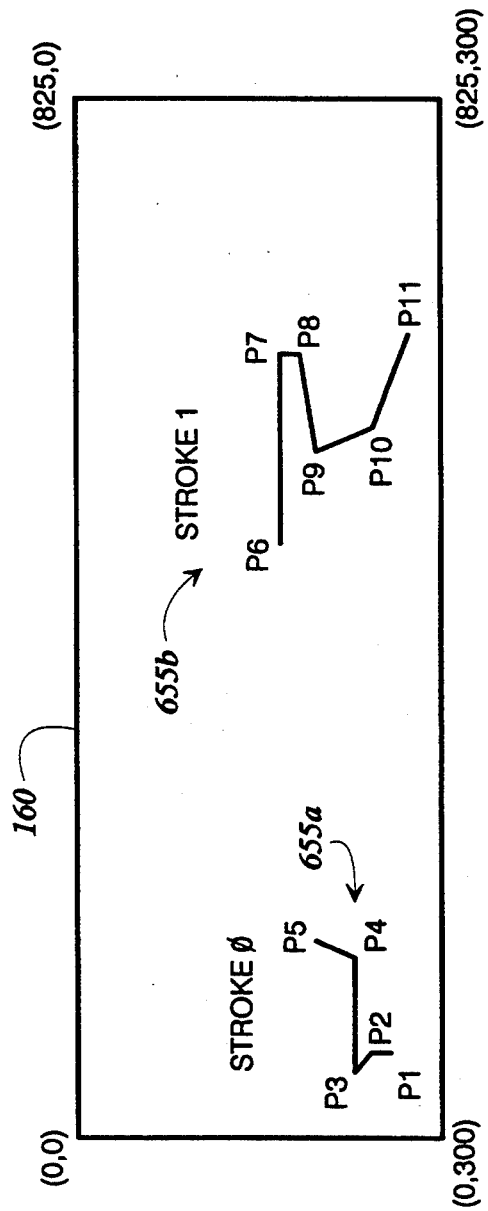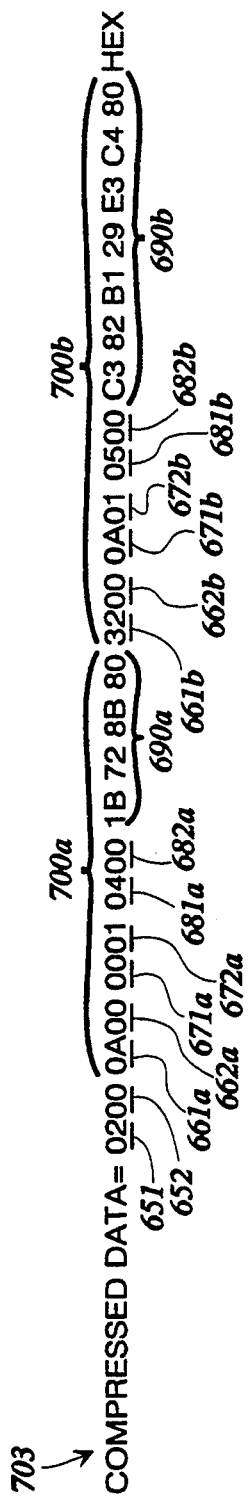
FIG 23A
FIG 23B

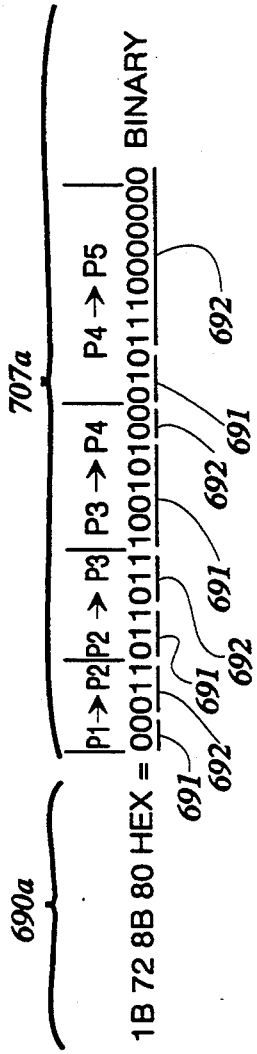
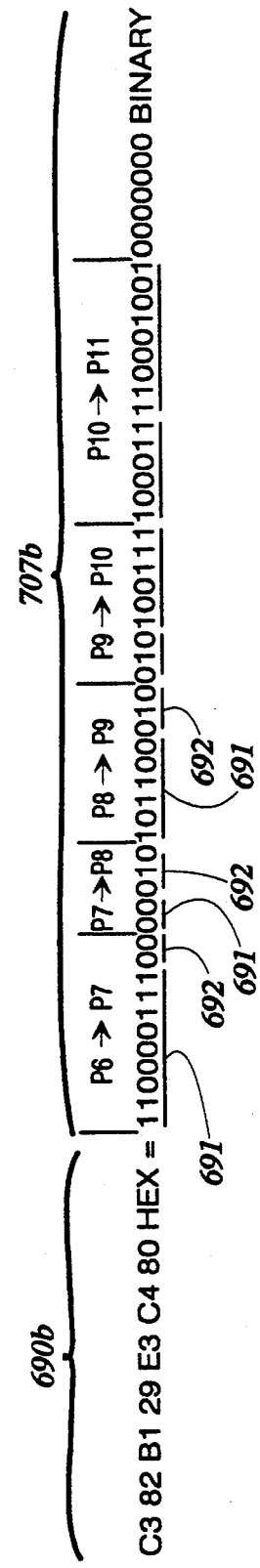
FIG 23C
FIG 23D

DATA CARD TERMINAL WITH EMBOSSED CHARACTER READER AND SIGNATURE CAPTURE

TECHNICAL FIELD

The present invention relates generally to data card transaction systems that use terminals such as credit card transaction terminals, and relates more particularly to a data card transaction terminal that detects the physical presence of a data card with an embossed character reader and a magnetic stripe reader, provides signature capturing capability, and may be utilized in transaction information processing systems for conducting transactions that are chargeback protected to a merchant utilizing the terminal.

CROSS REFERENCE TO RELATED APPLICATION

This application discloses subject matter in common with application Ser. No. 07/819,327, filed concurrently herewith, on or about Jan. 10, 1992.

BACKGROUND OF THE INVENTIONS

The use of data cards or payment cards, such as credit cards, has gained widespread acceptance as a method of paying for goods and services. As used herein, the term "data card" will be generally used to signify such cards, which can include credit cards, debit cards, and other financial account cards. Data cards in use today typically include a magnetic stripe containing account and other information, and most often include an account number and other information in embossed or raised characters.

Two elements must be present before a credit card transaction can be completed successfully. First, the consumer or cardholder must possess a valid credit card. Second, the merchant must be authorized to accept the card as payment for the goods or services and to receive payment from the organization that issued the credit card. The card issuing organization subsequently receives payment from the cardholder.

Credit cards are issued by banks and other financial organizations, generally as members and under the regulations of a credit card issuing association or entity. VISA ®, MasterCard ®, DISCOVER CARD ®, and AMERICAN EXPRESS ® are examples of credit card issuing associations or entities for particular brands of data cards. When a credit card is issued, the issuer is, in effect, granting a line of credit to the cardholder. Because the issuer is granting a line of credit, a credit card will be issued only after the issuer has conducted a credit background check and is satisfied as to the cardholder's ability and willingness to repay the debts incurred. The issuer's confidence is reflected in the amount of credit granted, which may range from a few hundred dollars to tens of thousands of dollars.

Many data card transactions involve third-party credit card transaction processors in addition to the merchant and credit card issuer. Transaction processors, which are sometimes independent business institutions, provide merchants with data processing services that facilitate the flow of credit card transaction data and the corresponding payments of monies between the merchants and card issuers. The flow of transaction data from the merchant to the issuer via a transaction processor is commonly referred to as "processing" or "clearing" the transactions. The flow of money from the issuer to the merchant via a processor is known as "settlement". The term "transaction processor", as used herein, generally means a third-party institution that processes card transactions independently of a card issuer, but can also include card issuers and card issuing associations that process their own transactions.

In a typical credit card transaction, a card holder presents a credit card to a merchant, who records transaction data by using either an electronic terminal or a manually imprinted sales draft. The recorded data includes the amount of the purchase, the cardholder's account number, the card's expiration date, the merchant identification number, and the date of the transaction. In most cases, the cardholder is also required to sign a copy of the receipt.

At the end of each day, the merchant determines the total dollar volume of the credit card transactions completed and prepares a deposit slip indicating that amount. All of the transaction data is then transferred to the merchant's credit card transaction processor and entered into the transaction processor's computers. This transfer may be electronic, in which case a data capture terminal transfers the data directly to the processor's computer. Alternatively, the transfer may involve the deposit of imprinted paper sales drafts and subsequent entry of the data into the computers by the processor's data entry personnel.

Once the data is received by the transaction processor, the amount of the merchant's "deposit" is verified and recorded. At that point, the transactions are separated according to the type of credit card used to complete the transaction. The transaction processor then transfers the corresponding transaction data to the appropriate credit card issuer or card issuing association. After the data is transferred to the issuer, the issuer posts the individual transactions to the appropriate cardholder's account.

In most cases, settlement occurs very soon after the data is cleared. For example, after a transaction processor receives a merchant's daily transaction data, the balance due the merchant is calculated and paid to the merchant via check, direct deposit, or wire transfer. The transaction processor sorts the transaction data from all of its client merchants according to the type of card used and forwards that data to the appropriate card issuer. The issuer or card association then determines the balance due the transaction processor and transfers that amount to the transaction processor.

As a part of transaction settlement, transaction processors and issuers assess fees for processing the credit card transaction. These fees are commonly referred to as the "discount rate" and are usually calculated as a percentage of the face value of the credit card transaction. The issuer deducts its fee as percentage from the total amount due the transaction processor.

Although credit cards provide significant convenience for both cardholders and merchants, there are also well known risks associated with credit card transactions. The principal risk is loss resulting from fraudulent or unauthorized use of the credit card. In such a case, the goods or services are taken by the cardholder and are usually unrecoverable. The loss must then be absorbed by the merchant, credit card transaction processor, and/or the credit card issuer.

Over the years, card issuers and merchants have relied on several different methods to protect themselves from fraud or misuse and to verify the validity of a credit card before completing a transaction. Initially, the card issuers provided "warning bulletins" to merchants. Warning bulletins, which are still in widespread use, are booklets that list the account numbers of credit cards that should no longer be accepted. Account numbers are included on these lists if the card has been reported stolen, if the cardholder has exceeded his or her credit limit or has become delinquent in the payments to the issuer, or if a card should not be accepted for another reason (such as mistakenly issued cards and cards that are invalid outside their country of origin).

More recently, card issuers and card issuing associations have provided real-time access to their computerized databases. This allowed merchants to request telephonic authorization for a transaction based on a search of a continually updated database before completing each transaction. For a typical transaction authorization, the merchant obtains an "authorization code" the merchant obtains an authorization source or institution, often via telephone. Authorization sources include card issuing associations, card issuers themselves, as well as independent credit card transaction processors that also provide clearing and settlement services between merchants and card issuers.

Several different methods are currently used for obtaining authorizations. In one method, a merchant uses a telephone to call a phone number provided by an authorization source or institution; an operator associated with the authorization institution enters the transaction data into a computer and provides an authorization number or code to the merchant if the transaction is authorized. Some authorization institutions also provide a form of audio response unit (ARU) that responds to dual tone multiple frequency (DTMF) signals entered from a merchant's TOUCH-TONE ® telephone. In this way, the merchant directly enters the numeric transaction data into a computer and receives an authorization number if the transaction is authorized.

Some transaction processors and card issuers provide electronic terminals that read the account number and expiration date from a magnetic stripe on the credit card. Once the merchant enters the purchase amount into the terminal, the terminal automatically dials an authorization source host computer and initiates an authorization request. The terminal displays and/or stores an approval code (authorization indicia) if the transaction is authorized. In each case, the approval code is recorded along with the other transaction data.

One particular difficulty that has been encountered in the use of prior an authorization systems is when a data card transaction terminal is unable to communicate with the authorization source, or when communications with the authorization source are interrupted. Such situations generally result in the merchant being forced to accept the risk of the transaction if the merchant decides to proceed with the transaction without receiving an authorization.

Another difficulty that often arises with known authorization systems is when a card issuer or card issuing association issues a "call me" in response to an authorization request. A "call me" or referral, as defined hereinbelow, typically results in a delay while the merchant places a telephone call to the entity issuing the "call me". Such delays cause inconvenience to the merchant and cardholder, and can result in a possible lost sale. Again, the merchant is at risk if the merchant decides to proceed with the transaction without contacting the authorization source and/or receiving authorization for the transaction.

Current manual systems for handling "call me" responses and referrals are therefore in need of improvement. Moreover, the inability of present systems to handle the interruption or failure to establish communications with authorization sources is in need of correction.

In order to insure that authorization is received and that all transaction data is properly recorded, card issuing associations have established a variety of operating regulations. These regulations include procedures for handling and present transactions for payment by the card issuing institution. If the merchant does not comply with the regulations and/or procedures, the transaction may be "charged back" to the merchant, who would then bear the loss associated with that sale.

A "chargeback" occurs when a credit card issuing association refuses to honor a presentment of a processed transaction because the issuer believes it violates a specific operating regulation. The chargeback results in reversal of the transaction to the transaction processor or merchant. Some transaction processors provide research services on behalf of their customers/merchants in an effort to resolve the dispute to the benefit of the merchant and re-present the transaction to the issuer for payment. Chargebacks are allowed only under specific conditions as provided in the association's operating regulations, and can be resolved or reversed only under specified conditions.

Chargebacks generally are of two basic types. A first comprises situations or disputes originating with a card issuer or card issuing association alleging improper or incomplete transaction procedures. A second comprises complaints originating with a cardholder regarding the origin of the transaction or the quality of the goods or services received.

Disputes regarding transaction procedures can be further classified to include authorization-related disputes, retrieval-related disputes, and transaction data disputes. Authorization related disputes are usually initiated by the card issuer when the credit card account is in a delinquent, over limit, or otherwise allegedly uncollectible condition, and the issuer cannot locate a record indicating that the transaction was authorized. The premise for the dispute is that the issuer claims the transaction would not have been authorized if the merchant had properly sought authorization at the time of the transaction.

Retrieval-related disputes can be initiated by a cardholder or by a card issuer. These disputes commonly arise when a cardholder sees an unfamiliar transaction posted to his or her account. At that point, the cardholder is entitled to request, through the issuer, a copy of the paper documentation supporting the transaction. In other situations, the card issuer may request copies to aid in its research of disputes or fraud. Such requests are called "retrieval requests." Once the cardholder or issuer properly requests a copy of the documentation, the transaction may be charged back to the transaction processor or merchant if the requested documentation is not provided within a prescribed time limit. A transaction can also be charged back when the copy of the transaction provided is of poor quality or legibility, or does not include the minimum information required by the card issuer's regulations.

Transaction data disputes typically occur when there are problems associated with the cardholder's account number, the amount of the purchase, the signature, the date of the transaction, the validity of the card on the date of the transaction, etc. Such problems may occur when any of the above data are improperly entered or illegible. These disputes are commonly referred to as "technical" disputes or chargebacks, since they are based on errors in merchant procedures or in the entry of the data.

Cardholder disputes occur when the cardholder denies participation in the transaction, or where the cardholder is dissatisfied with the merchandise or services purchased. In these cases, federal laws provide a cardholder with certain consumer rights. Cardholder disputes may also include claims that a single transaction was processed more than one time, that a credit issued by the merchant to the cardholder was not processed, or that the cardholder had revoked a merchant's authority to charge his account.

In each of the above situations, the transaction may be re-presented to the issuer and the chargeback reversed if the transaction processor and/or merchant are able to provide data that refutes or disproves the chargeback and substantiates the transaction. As a result, the process of reversing a chargeback typically requires research and/or retrieval of transaction data on the part of the processor and/or merchant. In some cases, the issuer's operating regulations require that copies of the sales drafts be retained by the merchant for three years from the date of the transaction. In addition, the regulations typically impose fairly strict time limits for responding to retrieval requests or chargeback notices. As a result, a retrieval or chargeback notice may require a merchant to sort through a very large number of archived paper receipts in order to locate the receipt in question and provide the information necessary to comply with the issuer's request.

In recent years, several devices and services have been created in order to simplify the storage and retrieval of transaction data, and to reduce the likelihood of authorization-related and technical chargebacks by insuring the accuracy of the recorded transaction data. So-called electronic "data capture" data card transaction terminals electronically detect and decode the cardholder's account number and expiration date from the magnetic stripe, and receive a purchase amount from a keypad. Once the data is entered in this fashion, it is used to print a receipt and is electronically transmitted to a transaction processor.

The use of data capture terminals has helped eliminate keying errors and insures that the data recorded on a cardholder's receipt is the same data used to process and settle the transaction. However, even when data capture devices are used, the merchant still must keep paper copies of the receipts for up to three years and comply with any retrieval requests.

Some third party credit card transaction processors market their authorization, processing, and settlement services to merchants in conjunction with a "chargeback defense system" of some sort. The chargeback defense systems promoted by some processors include a review of chargebacks against the operating regulations promulgated by card issuing associations. In addition, some transaction processors maintain databases of transaction information that allow the processor to obtain reversal of certain types of chargebacks on behalf of its customers/merchants. For example, if an issuer refuses to honor a transaction because it is unable to locate an authorization record, the processor may be able to reverse the chargeback without involving the merchant by providing the missing record of authorization to the issuer.

Although transaction processors often attempt to reverse chargebacks without the involvement of the merchant, certain retrieval requests or chargeback regulations still require that the merchant be involved in order to provide a copy of a receipt or reply to a dispute regarding the quality of the goods or services received by the cardholder. Accordingly, merchants must still maintain voluminous paper records of transactions for many years, resulting in inconvenience and expense when these paper records must be searched in order to respond to a retrieval request or a chargeback situation.

It is possible that data card transactions where a card is physically presented by a card holder to a merchant and the account number is electronically obtained are more likely to be valid transactions of the card holder than transactions where the account number was manually entered at a keyboard. If it were possible to compare and verify the account number, expiration date, or other information obtained from reading the magnetic stripe of a data card against another source of information associated with the card (such as the embossed characters on the data card or a second track of information on the magnetic stripe), it would be even easier to verify that a card was physically present for the transaction. It would then be possible to provide credit card issuers and/or transaction processors with greater assurance that a data card was indeed physically present at a transaction terminal on a given date in connection with a given transaction. Such greater assurances could therefore provide an incentive to a transaction processor or other entity to guarantee such transactions and make them "chargeback protected" for the merchant.

In addition, requirements for storage of paper receipts generated in connection with data card transactions could be reduced or possibly eliminated if the information essential to verifying a transaction could be obtained and stored electronically. In many cases, the signature of a card holder is a key piece of information that reminds the card holder that he or she actually participated in a particular transaction, or helps the card holder ascertain that the signature is a forgery. If signatures associated with data card transactions could be electronically captured, stored, and associated with other transaction data, and such information could be readily retrieved upon request, it might be possible to eliminate the requirement for retention of signature-bearing paper transaction receipts.

Graphic digitizer devices enable provision and storage, as electronic signals, of the X and Y coordinates of a stylus relative to a tablet or other surface. Examples of such devices are shown in U.S. Pat. Nos. 4,689,448, 4,705,919, and 4,77 1,138. It is possible with such devices, coupled to a computer system, to electronically capture and store a signature as an array of digital signals in a computer memory. However, because a signature is essentially a graphic object bounded in two-dimensional space by a rectangle enclosing the signature, it takes many digital signals to represent and store the signature electronically. Such a large volume of digital signals takes a long time to communicate electronically and consumes large amounts of memory for storage. The data storage requirements and corresponding signal transmission time of the data representing a digitized full signature have presented significant technical challenges to practical signature capture at data card terminals and concurrent transmission of the signature signals via telecommunication links to the host computer systems of transaction processors.

Apparatus for identifying cards based on embossing imparted to the surface of the card are known in the art. U.S. Pat. No. 4,783,823 of Tasaki et al. describes a device including an embossment sensor or detector that is adapted to contact with the upper surface of a card for thereby producing a signal representative of the result of the detection. A memory associated with the card is loaded with pattern data corresponding to the pattern defined by the embossment. When the card is inserted into the reader, the card is apparently moved past a linear array of sensors, and a circuit operates to read out identification data (pattern data) from the card's memory and determine that the inserted card is the authorized one when the identification data read from the memory coincides with the information (pattern) carried by the embossed area formed in the card and read by the embossment detector.

The Tasaki et al. patent provides little useful information as to how the pattern detection is actually accomplished. It appears that the device merely detects a simple geometric pattern of raised areas embossed on the card instead of embossed characters, since there is no discussion that the pattern is encoded with information such as account number, name, expiration date, or the like. Moreover, the movement of the card past the linear array of sensors requires a special mechanism to move and handle the card. It would be more useful and efficient in data card applications if the embossed character region, which in credit cards contains name, account number, expiration date, etc., could be read and decoded to obtain the information encoded therein, without a complex card moving mechanism.

U.S. Pat. No. 5,055,838 describes a capacitive silicon tactile imaging array comprising a matrix of sensors and a method of making same. Such devices might be employed for taking an electronic "picture" of the embossed character regions provided on many current data cards; this picture conceivably could be used in verifying the account information provided in the magnetic stripe of the data card. However, such an electronic "picture" requires many digital signals to represent, resulting in large memory storage requirements and processing delays to handle the large amounts of data. In addition, it is a non-trivial problem to adapt a matrix sensor for making such an electronic picture of the embossed area of a card and accurately determining, with a computer or other electronics, what characters are present in the embossing on the card.

Accordingly, although attempts have been made to simplify the process of storing and retrieving data in connection with retrieval requests and chargebacks, and in detecting the authenticity of data cards, there are still needs for substantial improvements in facilitating data card transactions. There is still need for improved systems and methods that simplify the storage, transmission, and retrieval of transaction data associated with data card transactions, including the signature, in a manner that automatically insures compliance with the operating procedures promulgated by the card issuing associations.

In addition, there are needs for improved systems enabling provision of transaction chargeback protection in favor of merchants that assures the merchant that the operating procedures of card issuing associations have been complied with, that all relevant data for receiving chargeback protection for a given transaction has been properly obtained, stored, and transmitted to a transaction processor, and that the risk of receiving a technical, authorization-related, or retrieval-related chargeback resulting from a given transaction has been transferred to the transaction processor.

SUMMARY OF THE INVENTION

Briefly described, the present inventions include an improved data card terminal with an embossed character reader and a signature capture printer, for facilitating the provision of chargeback protection and other features by a transaction processor for the benefit of a merchant. The preferred terminal includes means for detecting the physical presence of a data card at a data card terminal at which the transaction is recorded and for providing a card present flag. The terminal is further operative for obtaining transaction information corresponding to the particular transaction. The terminal further includes means for electronically obtaining card identifying information relating to the data card from an information carrying medium associated with the data card A preferred system incorporating the terminal comprises a signature capturing printer. The preferred signature capturing printer includes means for receiving a signature from a holder of the data card who is purportedly authorized to conduct a transaction with the data card, and for providing signature signals corresponding to the signature. The disclosed signature capturing printer, while especially suitable for use in connection with methods and systems described herein, is also suitable for use as a stand-alone printer device, for use in connection with other types of data card terminals and other types of data processing apparatus.

The preferred terminal includes means responsive to the card present flag, the signature signals, and the card identifying information from the card identifying information obtaining means for providing a transaction protected flag associated with the transaction information. Communication means associated with the terminal transmits the transaction information, including the signature signals and the transaction protected flag, to a transaction processor. Transaction processing means, associated with the transaction processor, is responsive to the transaction protected flag for processing the transaction represented by the transaction information in a manner so that the merchant is not charged back for the transaction.

As is known, card identifying information in present day data cards is provided in a plurality of sources on the data card, for example, the account number and other information is provided on a plurality of tracks on a magnetic stripe on the card, and the account number, cardholder name, and expiration date are typically embossed on the card. According to another aspect of the invention, the card identifying information obtaining means comprises means for obtaining the card identifying information from a first source of the plurality of sources and from a second source of the plurality of sources. Means are provided for verifying the accuracy of card identifying information obtained from the first source. And, means are provided for restoring at least a portion of the card identifying information obtained from the first source with information obtained from the second source in response to a determination by the verifying means that the card identifying information obtained from the first source is not accurate or complete.

The first source of card identifying information may comprise a magnetic stripe reader, and the second source may comprise an embossed card reader. Alternatively, the first source of card identifying information may comprise a first track of the magnetic stripe read by the magnetic stripe reader, and the second source may comprise a second track of the magnetic stripe read by the magnetic stripe reader.

The preferred verifying means comprises means for computing the longitudinal redundancy check (LRC) associated with a track on the magnetic stripe, and the restoring means is operative for restoring at least a portion of the account number read from the magnetic stripe reader with at least a portion of the account number read from the embossed card reader. Alternatively, the verifying means may comprise means for checking a checksum associated with the account number.

According to another aspect of the invention, the card present flag comprises information indicative that the card identifying information obtaining means successfully obtained the card identifying information electronically from the data card. The magnetic stripe reader, operative for obtaining card identifying information from a first track of the magnetic stripe and from a second track of the magnetic stripe, and the embossed card reader, are preferred for electronically obtaining the card identifying information.

According to another aspect of the invention, a remotely located authorization source, which may be associated with a card issuing association, a card issuer, or the transaction processor, provides transaction authorization indicia. The terminal is operative for initiating a communication session with the authorization source via the transaction processor's host computer system and requesting authorization indicia. In such an embodiment, the transaction protected flag means is responsive to the authorization indicia, the card present flag, the signature signals, and the card identifying information for providing the transaction protected flag.

According to another aspect of the invention, the authorization means comprises a transaction processor host computer system that is operative to communicate with a remotely located authorization source independent of the transaction processor for seeking the authorization indicia, or is alternatively operative for providing the authorization indicia in the event that the host computer system is unable to communicate with the authorization source. Typically, the remotely located authorization source comprises a computer system associated with a card issuing association or a card issuer. In accordance with this embodiment of the invention, the transaction processor host computer system operates as the authorization source and as the transaction processing means. The preferred data card terminal communicates with the transaction processor host computer system for requesting and obtaining the authorization indicia, and is operative for transmitting the signature signals, the transaction protected flag, and the transaction information to the transaction processor host computer system while the data card terminal is communicating with the host computer system for requesting the authorization indicia.

Preferred embodiments of the terminal include memory means for storing the signature signals, the transaction protected flag, and the transaction information as a transaction record in a transaction batch. In such embodiments, the data card terminal is operative for transmitting the transaction batch to the transaction processor host computer system during a communications session. Accordingly, the preferred data card terminal is operative for communicating a transaction record associated with a transaction being conducted at the data card terminal during an authorization communications session when the terminal communicates with the transaction processor host computer system for obtaining the authorization indicia, and is alternatively operative for transmitting the transaction record to the transaction processor host computer system during a subsequent communications session in the event that the data card terminal is unable to communicate with the transaction processor host computer system during an authorization communications session.

Yet another aspect of the inventions relates to methods of operation of a transaction processor that receives transaction information from a merchant utilizing a terminal constructed in accordance with the present invention. The method relates to guaranteeing a financial transaction conducted by a cardholder utilizing a data card against chargebacks of the transaction to a merchant participating in the transaction. The disclosed method includes the step of providing to the merchant a data card transaction terminal. At the terminal, and in response to the presentation of a data card by a cardholder in connection with a proposed transaction, the method comprises automatically detecting the physical presence of the data card at the terminal, automatically detecting an account number associated with the data card, and capturing a signature of the cardholder in connection with the transaction.

In further response to the proposed transaction, the terminal requests authorization indicia from an authorization source. In further response to the presentation of the data card, the method comprises obtaining and storing in the terminal financial information corresponding to the transaction, the authorization indicia, and the cardholder signature.

In response to the storing of the information in the preceding step, the method comprises storing a transaction protected flag in the terminal indicative that the transaction is chargeback protected, and communicating the financial information corresponding to the transaction, the authorization indicia, the cardholder signature, and the transaction protected flag to a transaction processing host computer system.

Finally, the method comprises the step of processing the transaction so that the merchant is not charged back for the transaction.

According to another aspect of the inventions, the method comprises providing a chargeback protection flag from a remote location to the preferred terminal during a configuration download session, to selected merchants who have arranged with the transaction processor for chargeback protection services. In such an embodiment, the terminal is responsive to the state of the chargeback protection flag, as well as to the presence of the card, the authorization indicia, the signature, and the transaction information for providing the transaction protected flag.

According to yet another aspect of the invention, there is disclosed a method of obtaining authorization indicia from an authorization source, preferably carried out by a data card terminal. The method comprises establishing a communication link with a transaction processing host computer system. Once the communication link is established, the terminal provides the detected account number associated with the data card to the transaction processing host computer system, and provides a proposed transaction amount to the transaction processing host computer system.

The method further comprises, at the transaction processing host computer system, attempting to establish a communication link to an authorization source computer system corresponding to the card presented. The transaction processing host computer system, in response to establishment of the communication link with the authorization source computer system, provides the detected account number associated with the data card and the proposed transaction amount to the authorization source computer system.

The transaction processing host computer system then receives authorization indicia from the authorization source computer system as remotely obtained authorization indicia.

In response to failure of establishment of the communication link with the authorization source computer system, the transaction processing host computer system determines whether to authorize the transaction, and if so, provides transaction processor authorization indicia. The authorization indicia, whether the remotely obtained authorization indicia from the authorization source computer system or the transaction processor authorization indicia, are then provided to the terminal.

In response to a failure to obtain the remotely obtained authorization indicia or a determination not to authorize the transaction by the transaction processing host computer system, the method comprises providing a "call me" indicia to the terminal, and terminating the communication between the terminal and the transaction processing host computer system. In response to being provided the call me indicia, the preferred terminal automatically seeks authorization from an audio response unit (ARU).

The step of automatically seeking authorization from an ARU comprises automatically dialing an ARU authorization telephone number associated with a voice grade telephone line, switching the telephone line to an audio means associated with the terminal to the communication link. The merchant may also be signalled to pick up a telephone handset and communicate verbally with an entity associated with the ARU.

According to yet another aspect of the invention, there is disclosed a method, particularly suitable for use with the disclosed terminal, for providing electronic authorizations to a merchant in connection with a proposed transaction associated with a data card presented by a cardholder. Briefly described, the method comprises the steps of:

(1) automatically attempting to connect the terminal for communications via a telecommunications link to an authorization computer system;

(2) in response to failure to connect the terminal to the authorization computer system or receipt of a call me signal from the authorization computer system, automatically attempting to connect the terminal with an audio response unit (ARU) via a second telecommunications link;

(3) in response to connection of the terminal to the ARU, providing information associated with the data card and with the proposed transaction in the form of data signals to the ARU; and (4) providing an audible authorization approval code received from the ARU to the merchant.

Preferably, the n-Method is carried out by a data card terminal including audio means, and the step of attempting to connect the terminal with an audio response unit (ARU) via a second telecommunications link comprises automatically dialing a telephone number associated with the ARU, and connecting audible authorization indicia from the ARU to the audio means, such as a speaker.

The terminal operator is then preferably prompted to enter the audible authorization code into a keyboard associated with the terminal. In response to entry of the authorization code at the terminal, the terminal validates a check digit associated with the transaction data to detect keying errors or fictitious codes. In response to detection that an incorrect code has been entered, the terminal prompts the operator to re-enter the code. In the event that a valid check digit is not entered after a predetermined number of attempts by the terminal operator, the transaction is voided.

The method preferably further comprises the steps of, after prompting the merchant to enter the audible authorization code into a keyboard associated with the terminal, identifying the transaction as containing an "off line" authorization code in the terminal. The terminal then stores transaction data associated with transactions indicated as "off line" in a memory associated with the terminal. Subsequently, transaction data identified as containing an "off line" authorization codes are transmitted to a transaction processing computer system via a telecommunications link.

More particularly described, a preferred system for providing authorizations in connection with data card transactions includes a data card terminal comprising means for detecting an account number associated with a data card presented by the cardholder in connection with a proposed transaction, a first communication means for connecting the terminal for data communications via a first telecommunications link, a second communications means for connecting the terminal for data communications via a separate second telecommunications link in the event of failure to establish communications via the first telecommunications link, and a third communications means for connecting the terminal for communications via a separate voice grade third telecommunications link in the event of failure to establish communications via the first telecommunications link or the second telecommunications link.

The system further comprises a communications processor associated with a transaction processor, including means for communicating with data card terminals via the first telecommunications link or alternatively via the second telecommunications link, means for communicating with an authorization source computer system associated with an authorization source via a host/authorization source telecommunications link. The communications processor is operative for connecting the data card terminal to the authorization source computer system via the first telecommunications link or the second telecommunications link, whichever is established, and the host/authorization source telecommunications link. The authorization source computer system is operative for providing authorization indicia to the terminal via the established communication links.

The third telecommunications link is operative for connecting the terminal to an audio response means associated with an audio response unit (ARU). The ARU provides authorization indicia to the terminal via the third telecommunications link, in the event of failure to communicate with the authorization source computer system or the transaction processor host computer system.

According to yet another aspect of the invention, there is disclosed a data card terminal operative for receiving electronic authorizations in connection with a proposed transaction associated with a data card presented by a cardholder to a merchant. The preferred terminal comprises first communication means for automatically connecting the terminal for data communications with a transaction processing host computer system via a first telecommunications link. A second communications means is provided for automatically connecting the terminal for data communications with the transaction processing host computer system via a separate second telecommunications link. A third communications means is provided for automatically connecting the terminal for communications with an audio response unit (ARU) via a separate third telecommunications link in response to failure to establish the first telecommunications link or the second telecommunications link.

The terminal further includes means for requesting authorization indicia from the transaction processing host computer system via the first telecommunications link or the second telecommunications link in connection with a proposed transaction. Authorization indicia received from via the first telecommunications link or the second telecommunications link are considered electronically received authorizations, and are automatically associated with other transaction information and stored in the terminal for subsequent communications to the transaction processor.

In the event that communications cannot be established for electronically receiving the authorization indicia from an authorization source via the first telecommunication link or the second telecommunication link, there is provided audio means for providing an audible authorization indicia from the audio response unit (ARU) to the merchant. Means are provided for receiving the manual entry of the audible authorization indicia from the merchant as manually entered authorization indicia. Means for verifying the manually entered authorization indicia determine whether the authorization indicia entered by the merchant are valid (to reduce mistakes and fraud). Finally, there is provided means for storing authorization indicia received from the transaction processing host computer system or the manually entered authorization indicia.

The preferred terminal further comprises means for detecting an account number associated with the data card presented by the cardholder in connection with the proposed transaction, and means for automatically providing the detected account number to said transaction processing host computer system or said ARU, in the manner described in connection with other preferred embodiments. The preferred account number providing means comprises signal means for providing the detected account number to the transaction processing host computer system, and DTMF means for providing the detected account number to said ARU.

If the transaction processing host computer system or an authorization source connected to the transaction processing host computer system provides a "call me" signal, or in response to failure to establish communications with the transaction processing host computer system, the third communication means is automatically operative for dialing a telephone number associated with the audio response unit (ARU), providing information associated with the data card and with the proposed transaction in the form of DTMF signals via the third telecommunications link, connecting the audible authorization indicia from the ARU to the audio means. The merchant is then prompted to enter the audible authorization indicia into the terminal, where it is verified for errors or fraud.

Accordingly, it is an object of the present invention to provide an improved data card transaction terminal.

It is another object of the present invention to provide a signature capturing and embossed card reading capability in a data card transaction terminal.

It is a further object of the present invention to provide improved systems, methods and apparatus by which a merchant may be guaranteed against chargebacks for the benefit of merchants.

It is another object of the present invention to provide an improved data card transaction terminal that detects the physical presence of a data card in connection with a transaction, thereby providing a greater degree of assurance of the validity of the transaction to a transaction processor and the ability to treat a transaction as chargeback-protected to a merchant.

It is another object of the present invention to provide an improved data card transaction terminal that detects the physical presence of a data card and provides a signal indicative of the same.

It is a further object of the present invention to provide an improved apparatus and method by which a credit card transaction terminal will ensure that all data related to a transaction is collected before the transaction is completed.

It is a further object of the present invention to provide an improved apparatus and method by which an off-line approval code may be requested in the event the terminal is unable to communicate with a host computer.

It is a further object of the present inventions to provide a method by which an off-line authorization code may be validated for authenticity.

It is a further object of the present invention to provide an improved data card transaction terminal and method for operation of same by which a cardholder's signature will be captured and stored electronically along with other data related to a transaction.

It is a further object of the present invention to provide an improved data card transaction terminal that will control the transmission of a digitized signature from the terminal to a data card transaction host or store data associated with the transaction at the terminal, depending on whether the terminal is able to communicate with the host computer.

It is a further object of the present invention to provide improved systems for use in handling data card transactions that will allow a credit card transaction processor to respond to retrieval requests without the involvement of the merchant.

It is a further object of the present invention to provide improved systems for use in handling data card transactions that allow reduction or elimination of paper transaction receipts stored by merchants.

It is a further object of the present invention to provide an improved apparatus and method that allows a transaction processor to respond to chargebacks without the involvement of the merchant.

It is a further object of the present invention to provide an improved data card transaction terminal that will automatically read the data that is embossed on the face of a payment card.

It is a further object of the present invention to provide an improved apparatus and method that will automatically read data from multiple sources on a data card and restore data detected as being erroneous, and verify the data so read in order to ensure that the restored data are accurate.

It is another object of the present invention to provide improved methods and apparatus for facilitating the provision of chargeback protected data card transaction services, from a transaction processor to a merchant, facilitated by detecting predetermined characteristics of a given data card transaction indicative of the validity of the transaction, in particular, detection of the physical presence of a data card in connection with the given transaction.

It is another object of the present invention to provide a data card transaction processor with a greater degree of confidence that a given data card transaction is a valid one, so that the transaction processor may elect to assume the risk of the particular transaction on behalf of a merchant, by capturing additional information associated with the transaction, namely, information from both tracks of the data card, information from the embossing on the card, and digitized information corresponding to the signature of the cardholder in connection with a transaction.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 1 provides an overview of a prior art credit card transaction processing system.

Figure 6:
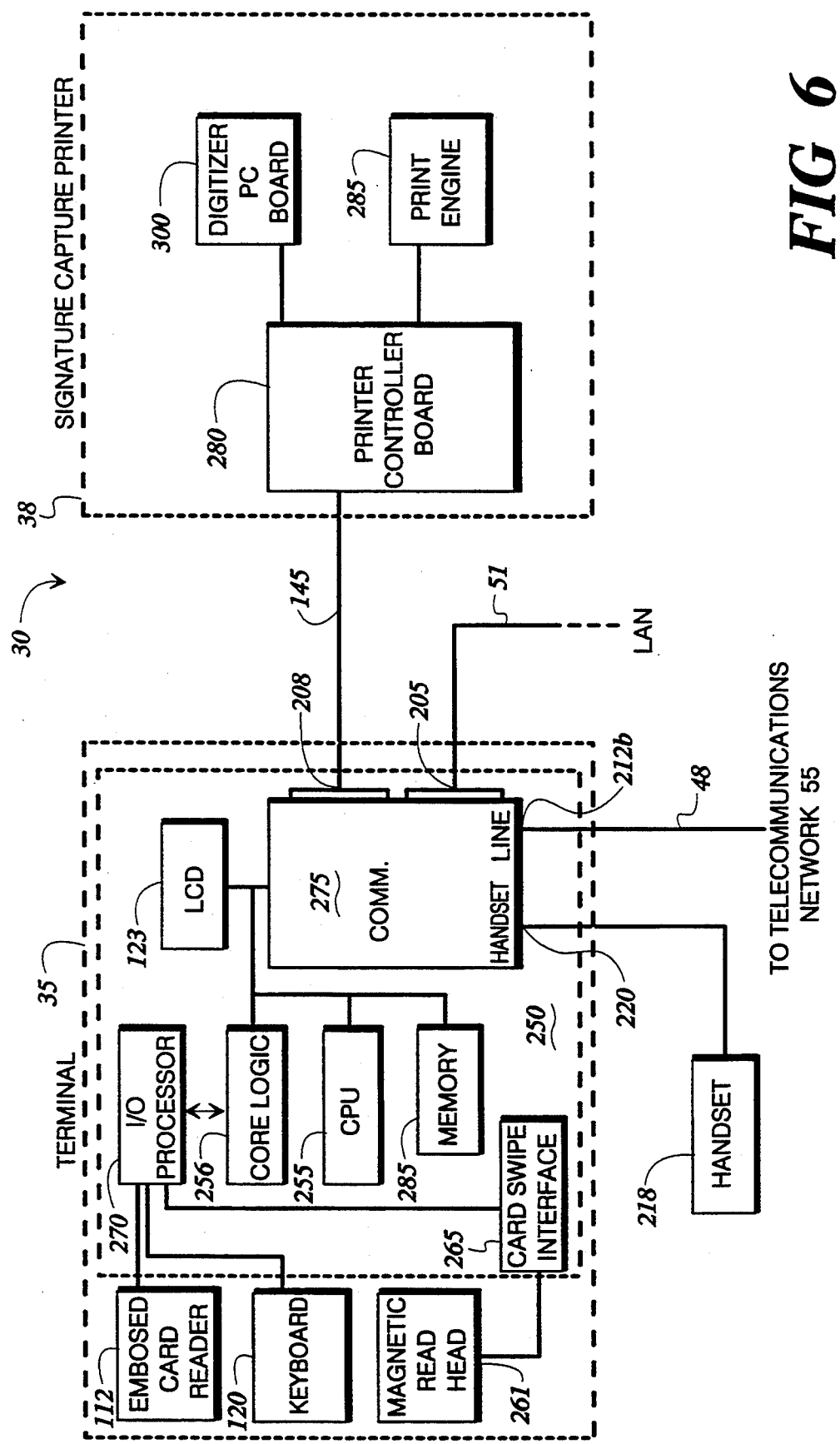
FIG. 6 is a block diagram illustrating the primary components of the preferred data card transaction terminal/printer of FIG. 3.

FIG. 9, consisting of FIGS. 9A–9E, are partial diagrammatic end views of an embossed card reader employed in the preferred transaction terminal of FIG. 6, showing the method of operation.

Figure 10:
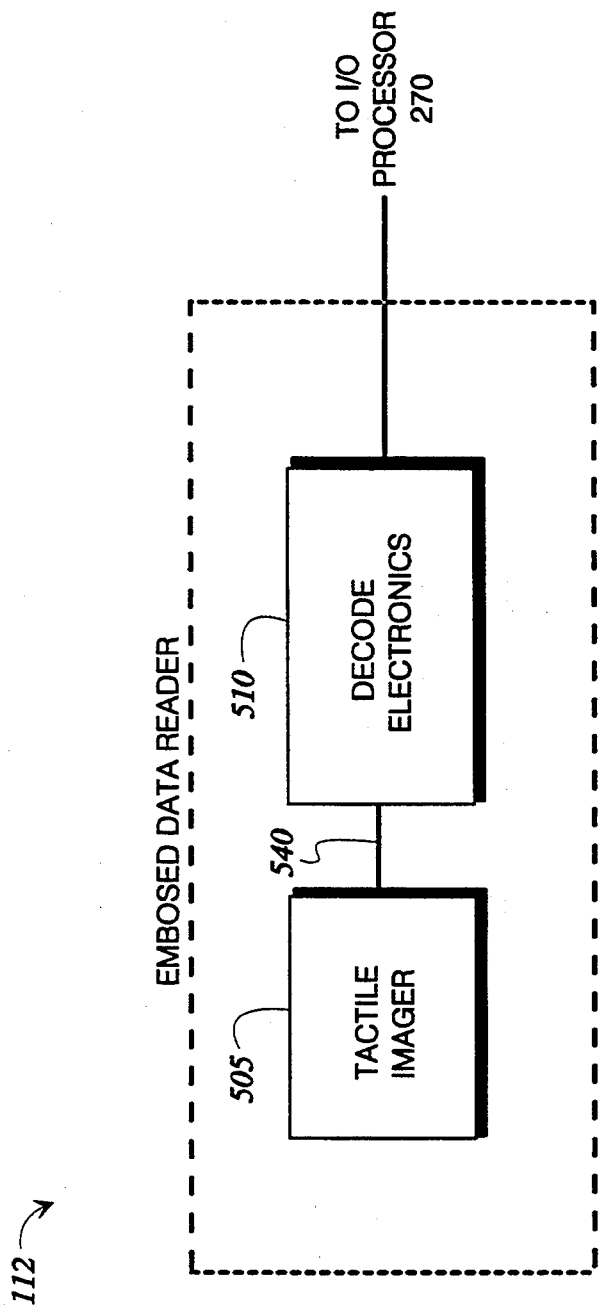

FIG. 10 is a block schematic diagram of the embossed card reader circuitry employed in the preferred transaction terminal of FIG. 6.

Figure 11:
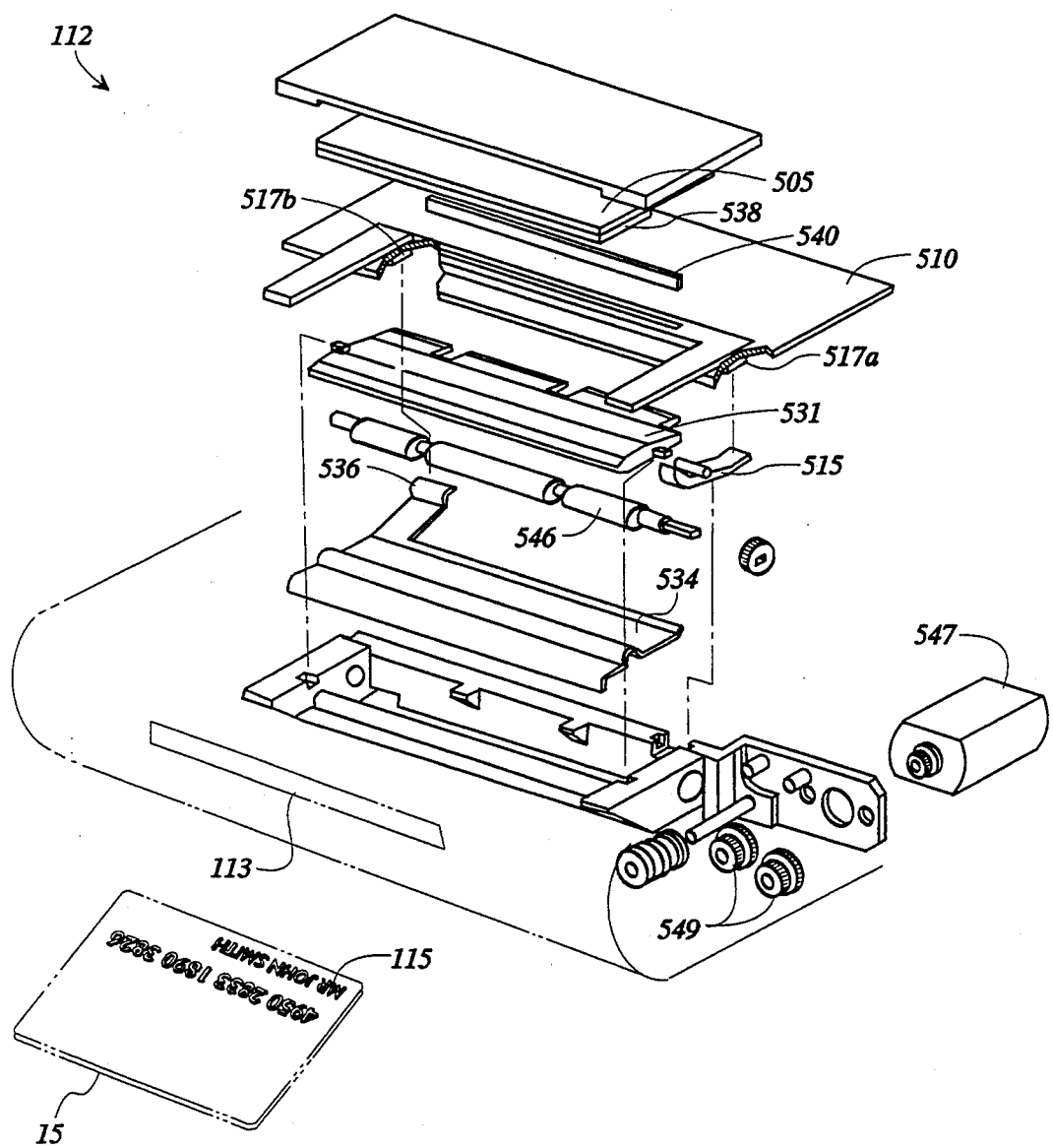

FIG. 11 is an exploded view of the embossed card reader.

Figure 12:
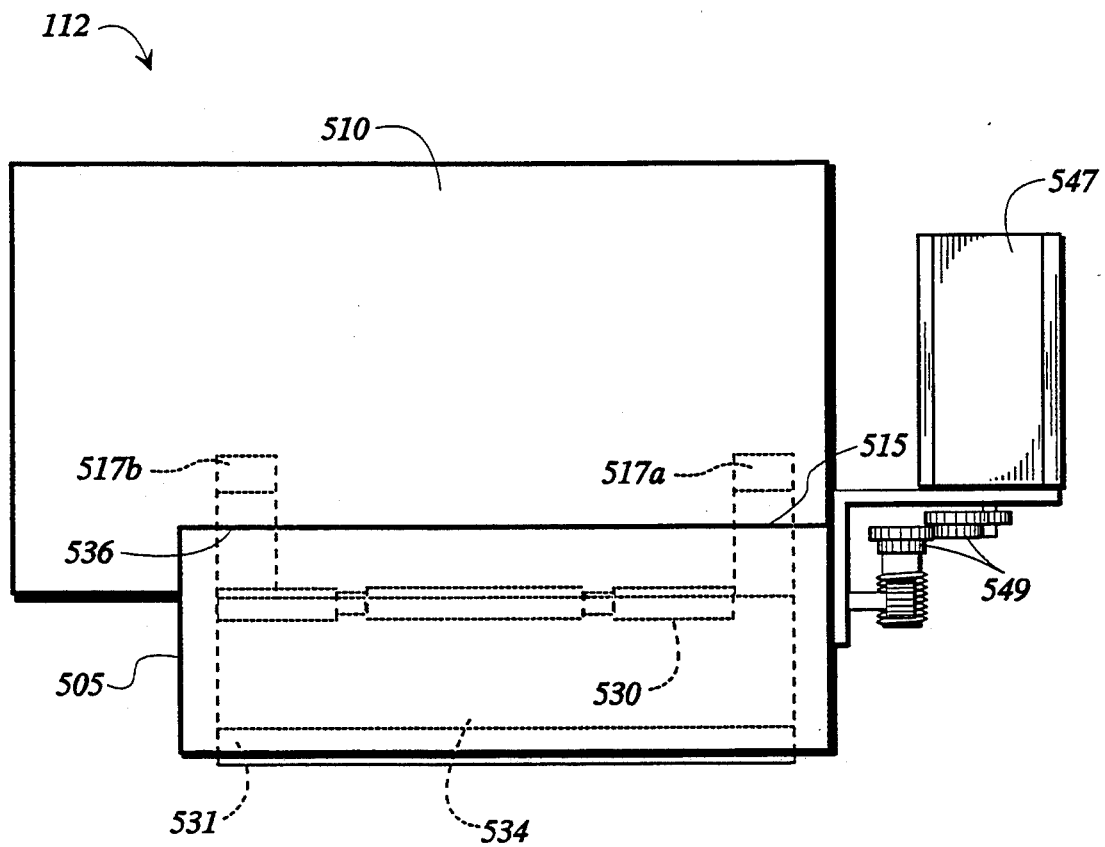

FIG. 12 is a bottom plan view of the embossed card reader, showing the location of the switches.

Figure 13:
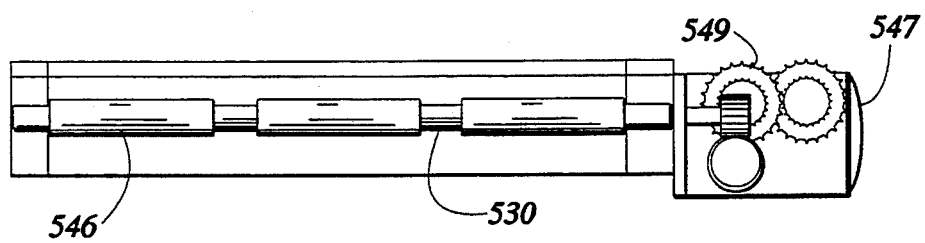

FIG. 13 is a partial front elevation of the embossed card reader.

Figure 14:
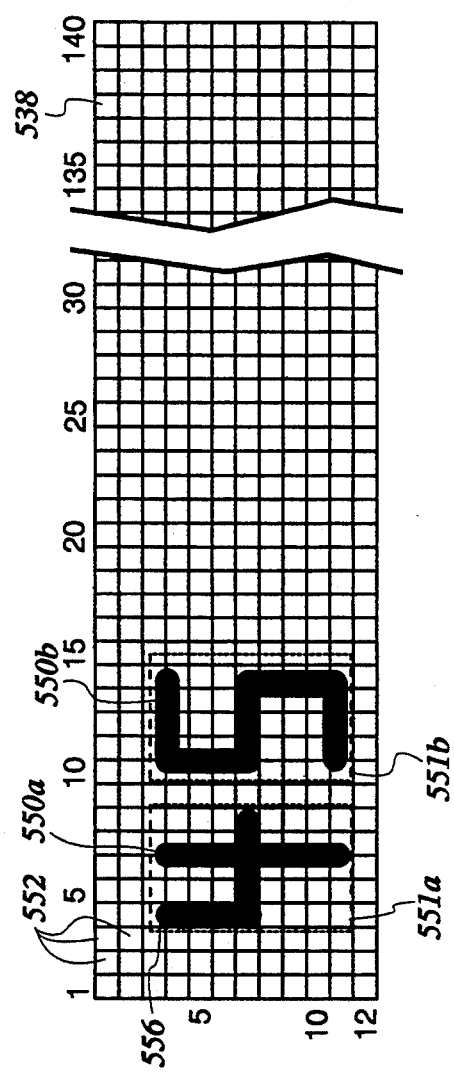

FIG. 14 illustrates the imaging array of the embossed card reader and the division of the array into character cells for the preferred method of recognizing the embossed characters.

Figure 15:
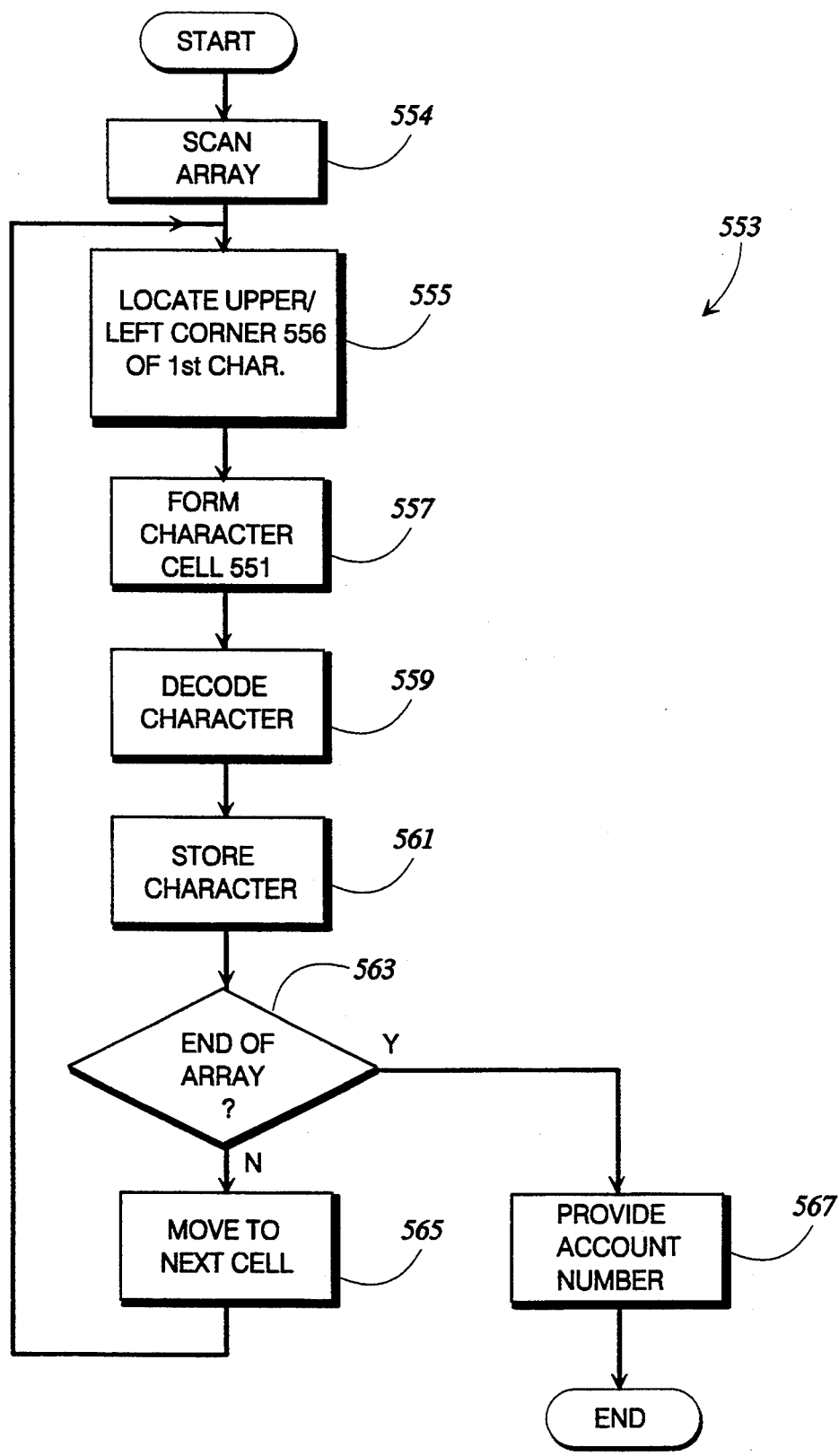

FIG. 15 is a flow chart illustrating the method employed in the preferred embodiment for recognizing embossed characters on a data card, carried out in the preferred embossed card reader.

Figure 3:
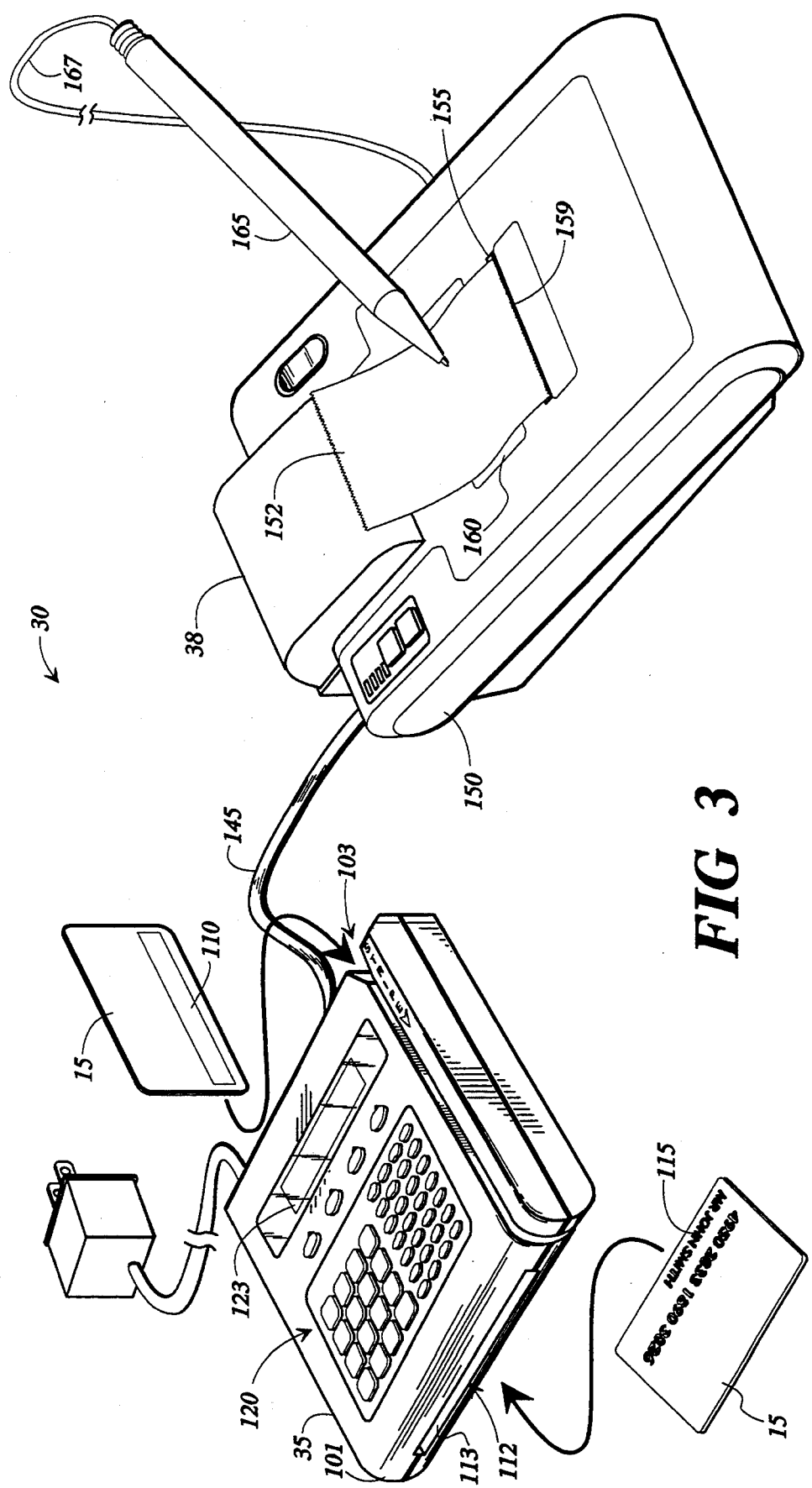
FIG. 3 is a perspective view of an improved data card terminal/printer constructed in accordance with the preferred embodiment of the present invention, comprising a transaction terminal and a signature capture printer.
Figure 16:
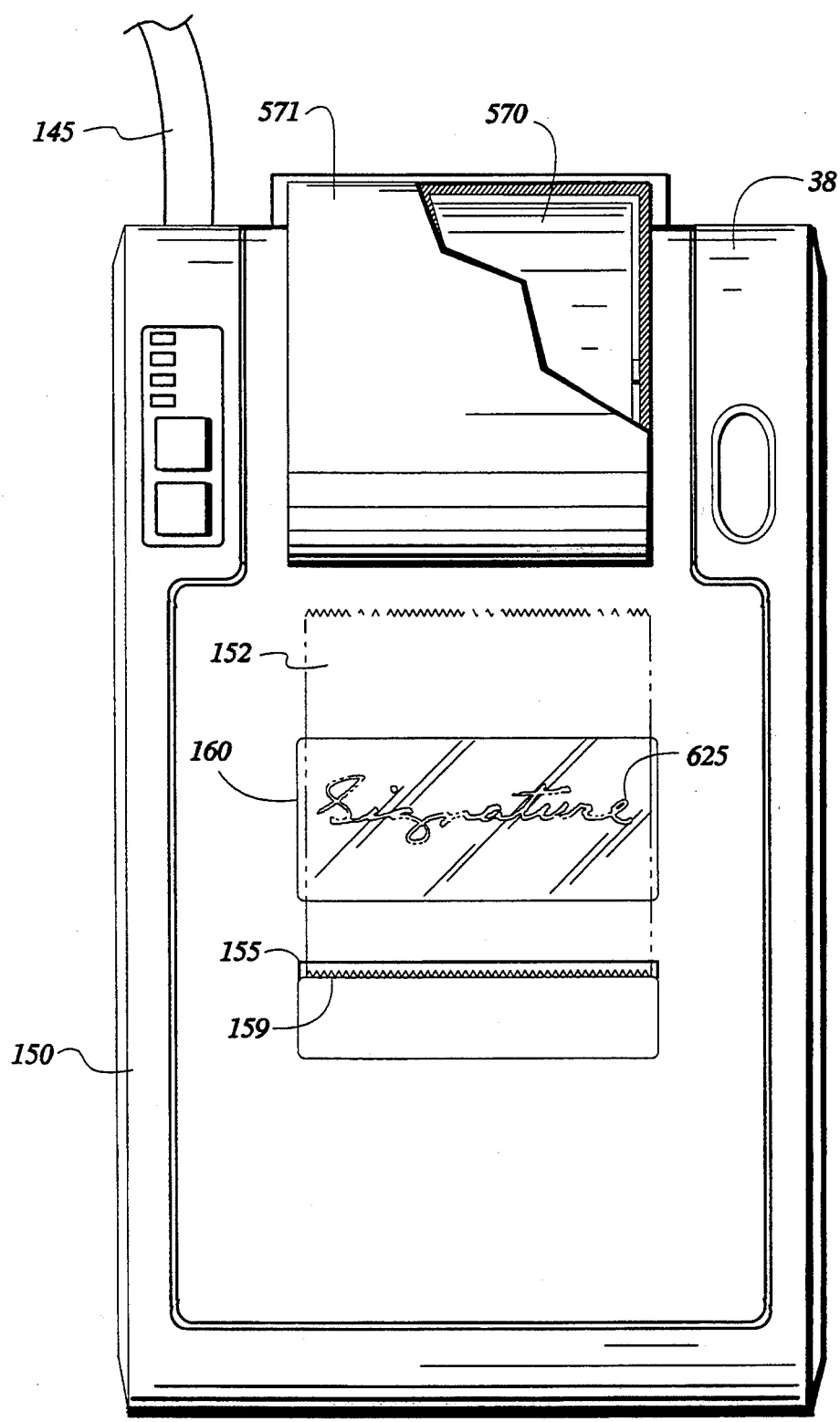

FIG. 16 is a top plan view of the preferred signature capture printer illustrated in FIG. 3.

Figure 17:
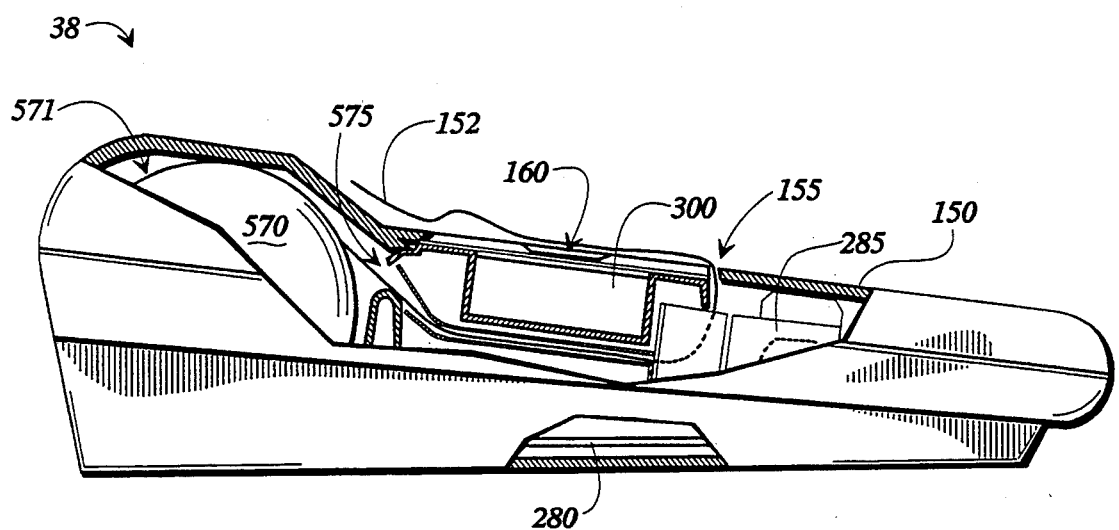

FIG. 17 is a side cut-away view of the preferred signature capture printer of FIG. 3.

Figure 18:
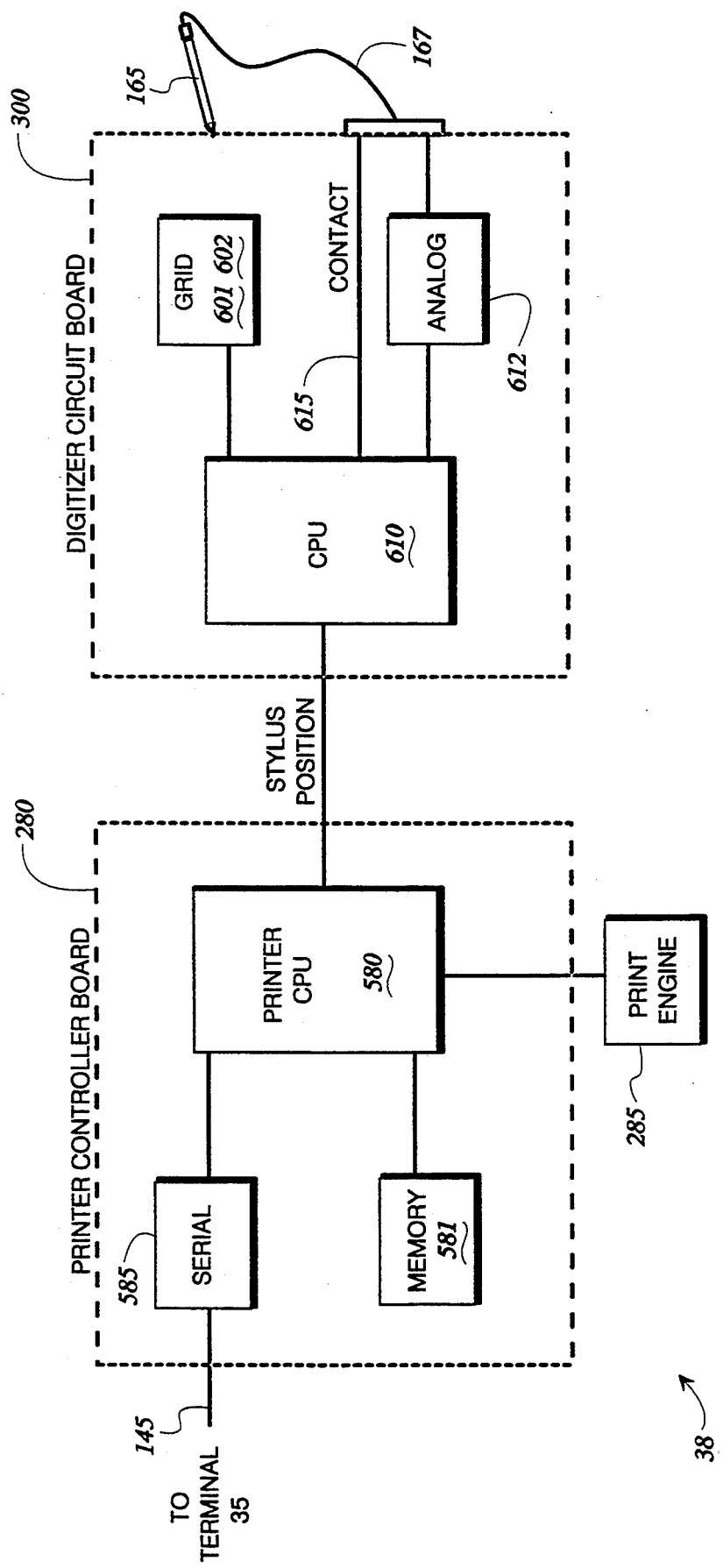

FIG. 18 is a block schematic diagram of the signature capture circuitry of the preferred signature capture printer of FIG. 3.

Figure 19:
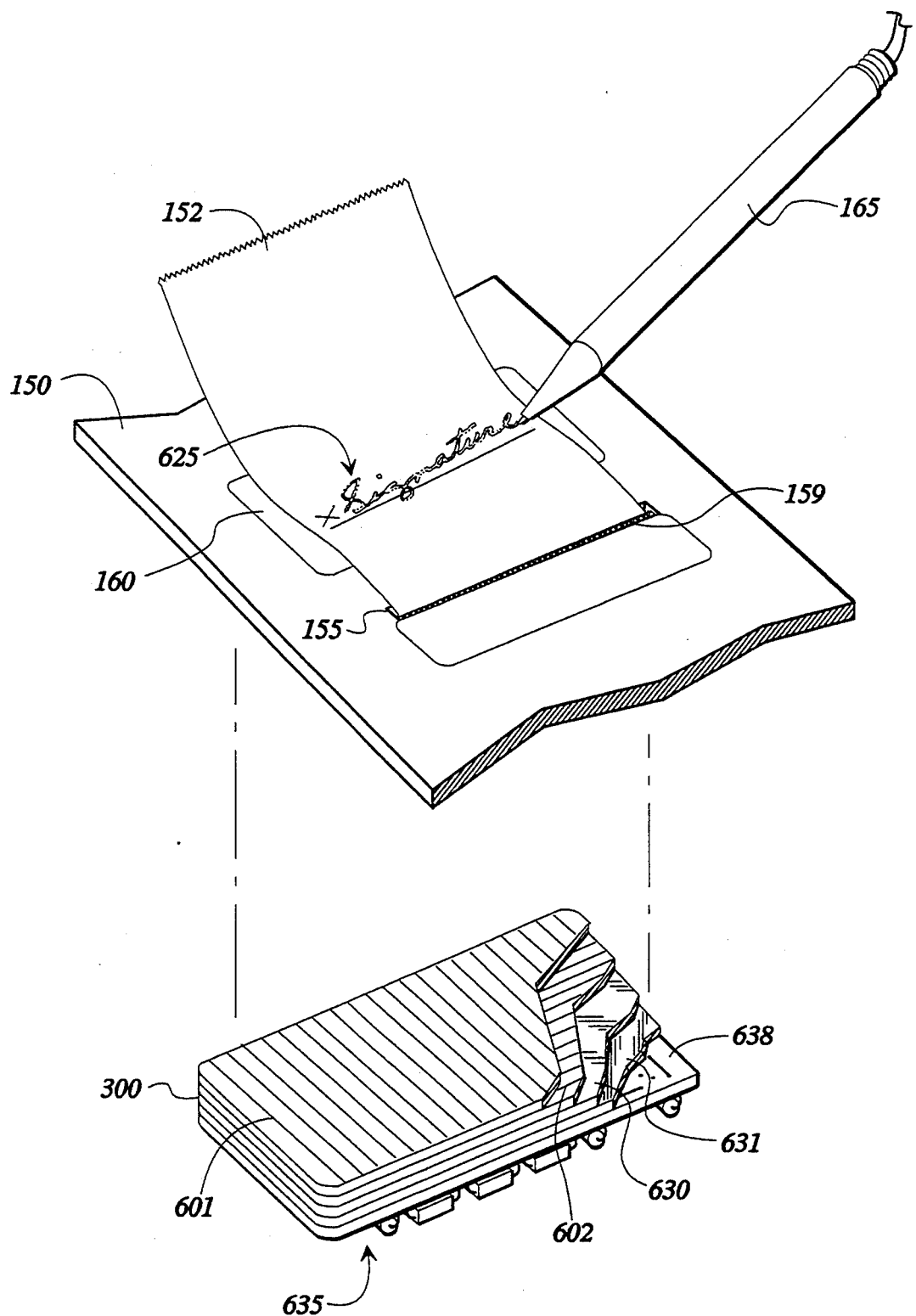

FIG. 19 is a partial exploded view of the signature capture printer of FIG. 3, showing the relationship between the paper, top cover, and digitizer printer circuit board.

FIG. 20 illustrates the X-Y coordinates of the signature capturing window provided on a signature capture printer constructed in accordance with the preferred embodiment illustrated in FIG. 16.

FIG. 21 illustrates the data format of the digital signature signals generated in connection with a signature capture by a signature capture printer constructed in accordance with the preferred embodiment illustrated in FIG. 16.

Figure 22A:
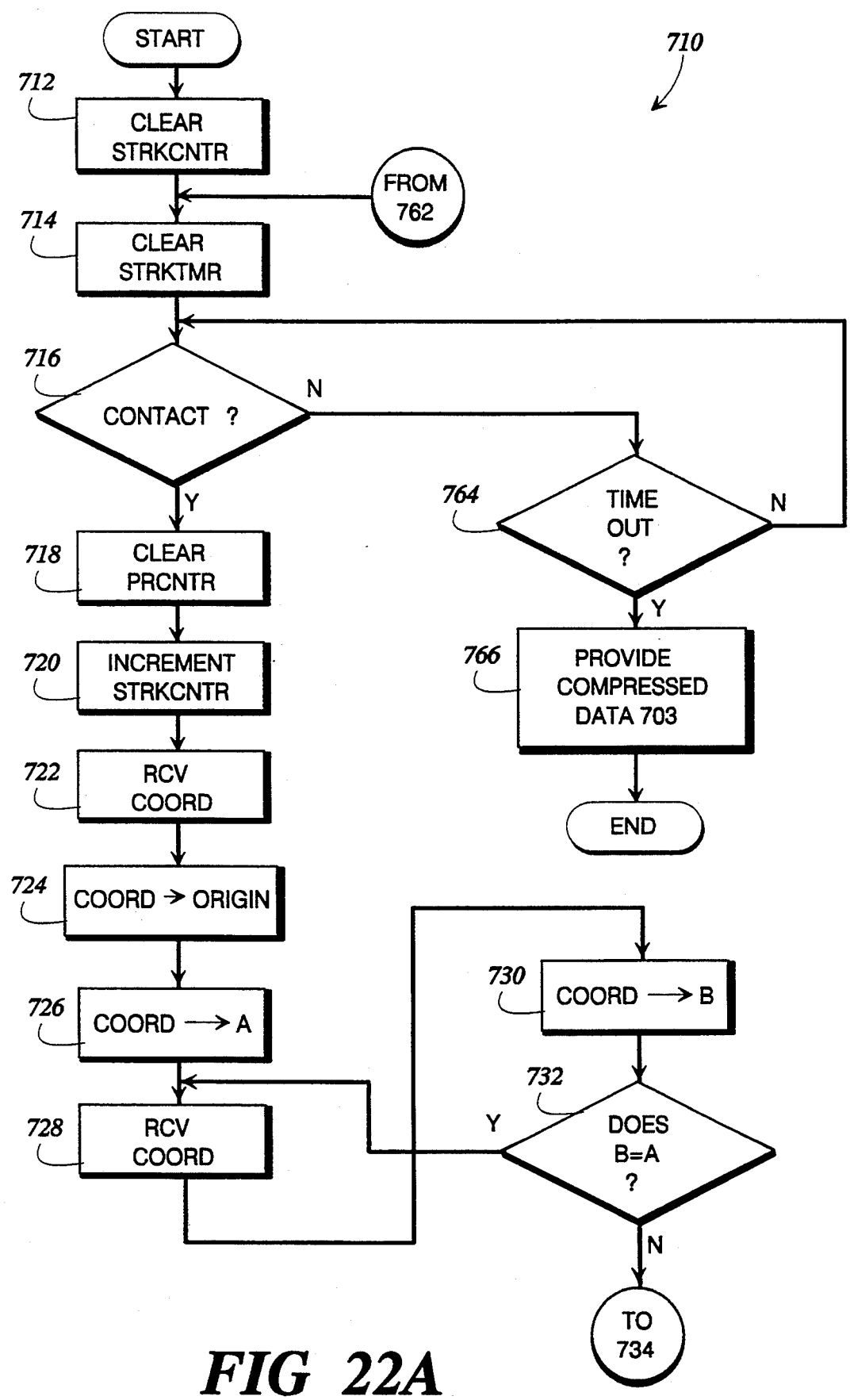
Figure 22B:
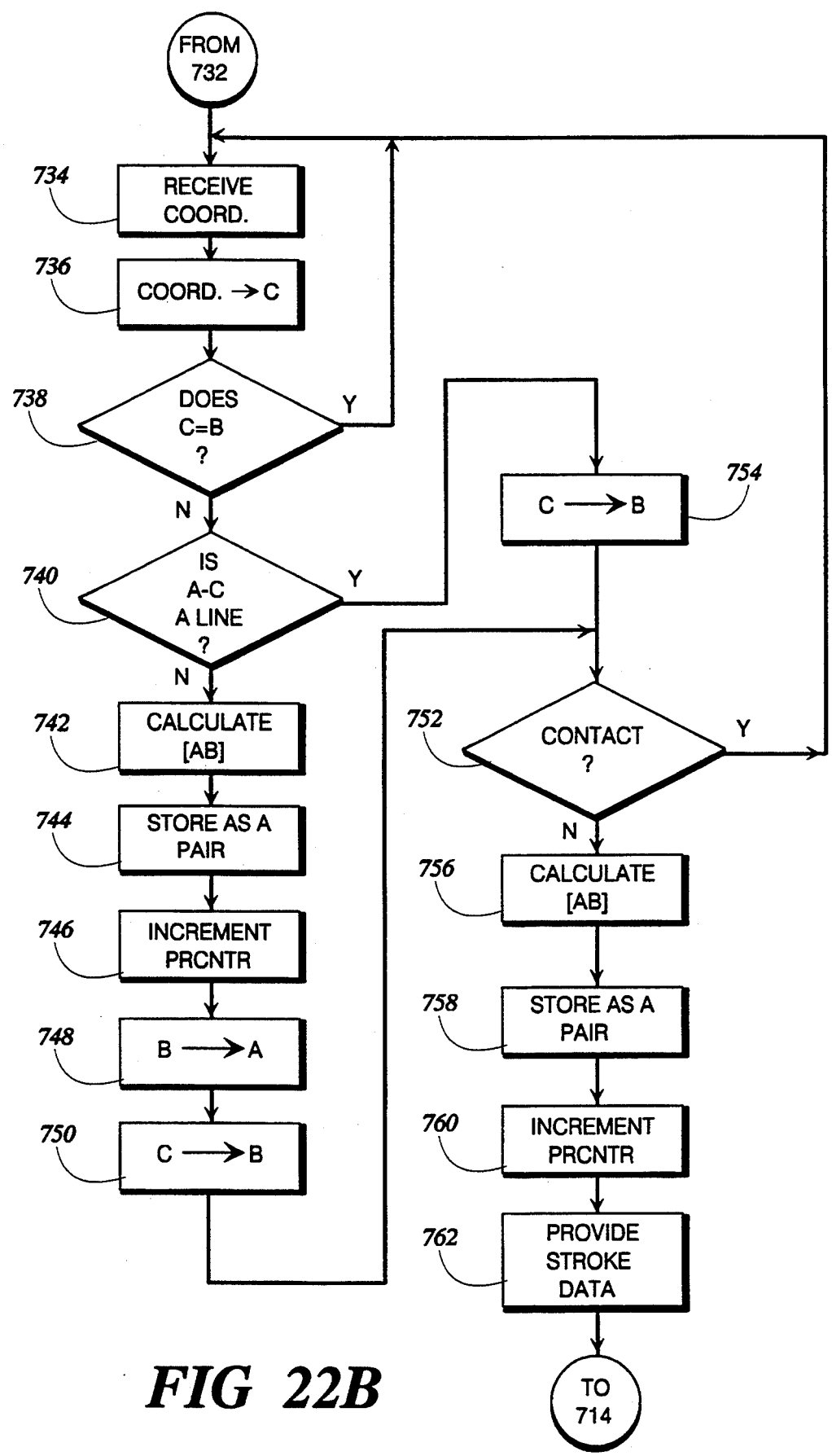

FIG. 22, consisting of FIGS. 22A–22B, is a flow diagram of a signature capturing and signature signal compression method forming a part of the transaction terminal/printer software.

FIG. 23, consisting of FIGS. 23A–23D, illustrates exemplary strokes of a partial exemplary signature entered in the signature capturing window, which is coded into compressed signature signals according to the method of FIG. 22.

Figure 24:
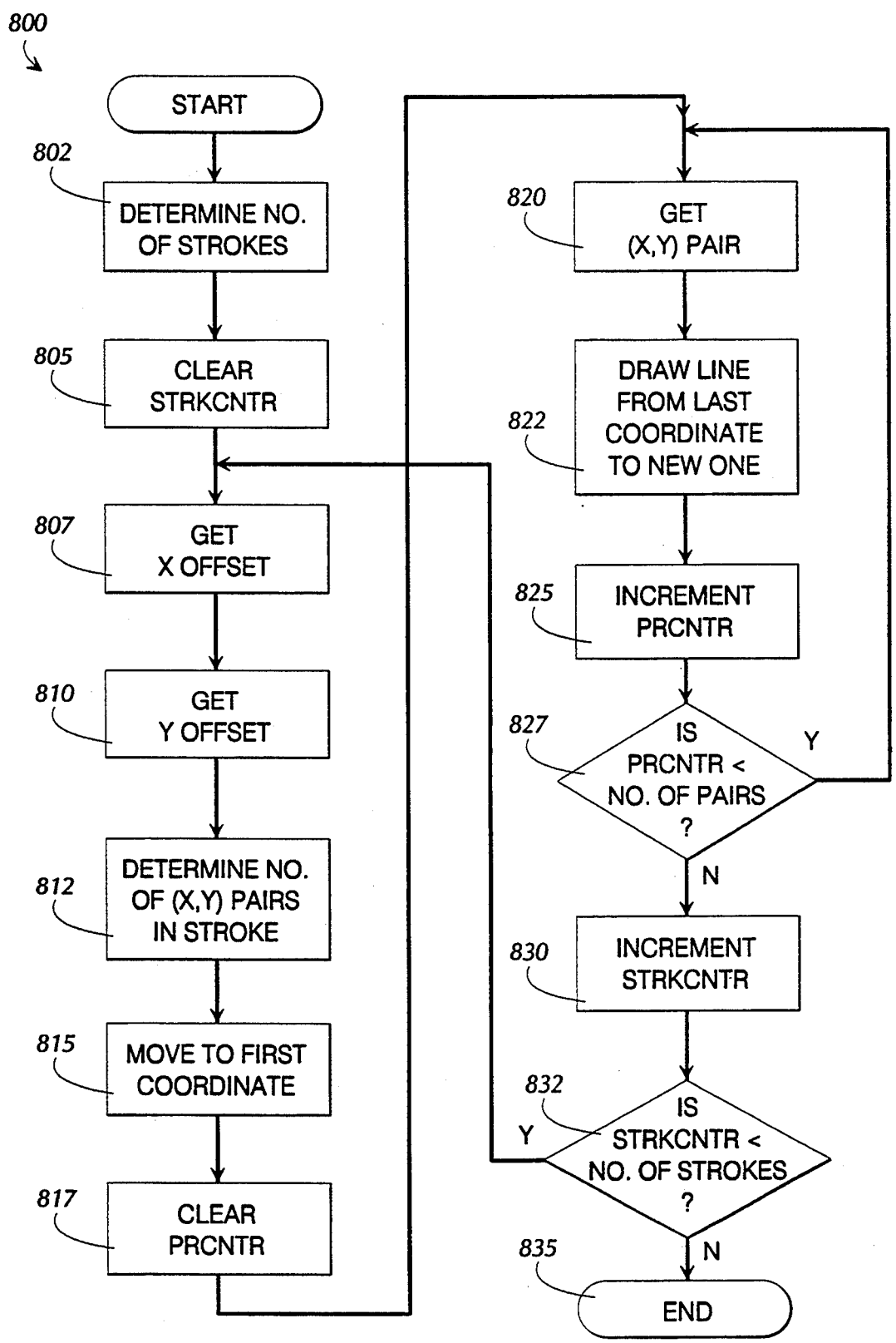

FIG. 24 is a flow diagram illustrating the method by which compressed signature signals are decompressed in order to reproduce a stored signature.

Figure 25:
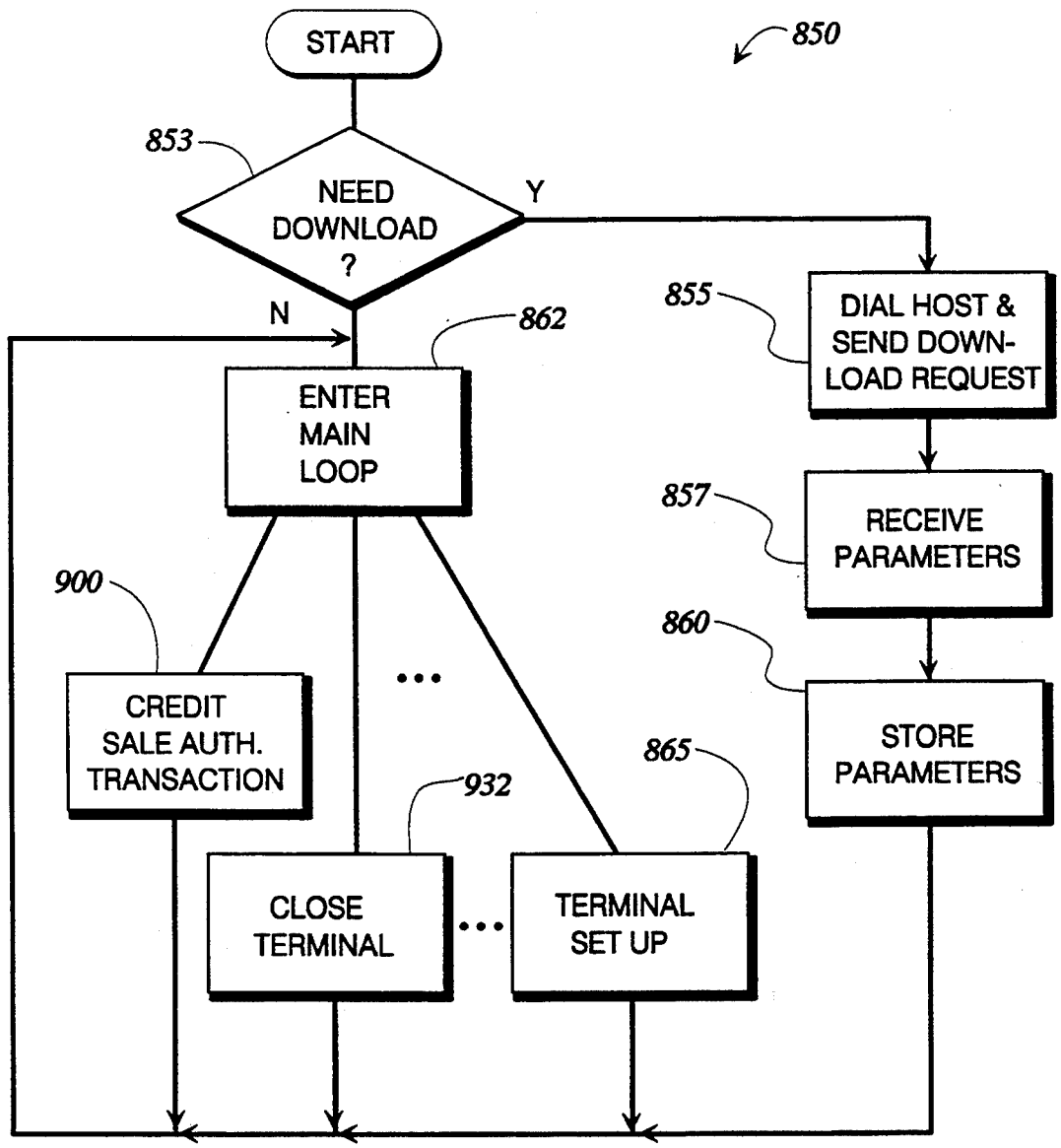

FIG. 25 is a flow diagram illustrating the main program loop of the operation of a terminal constructed in accordance with the present invention, implemented as computer software.

Figure 26:
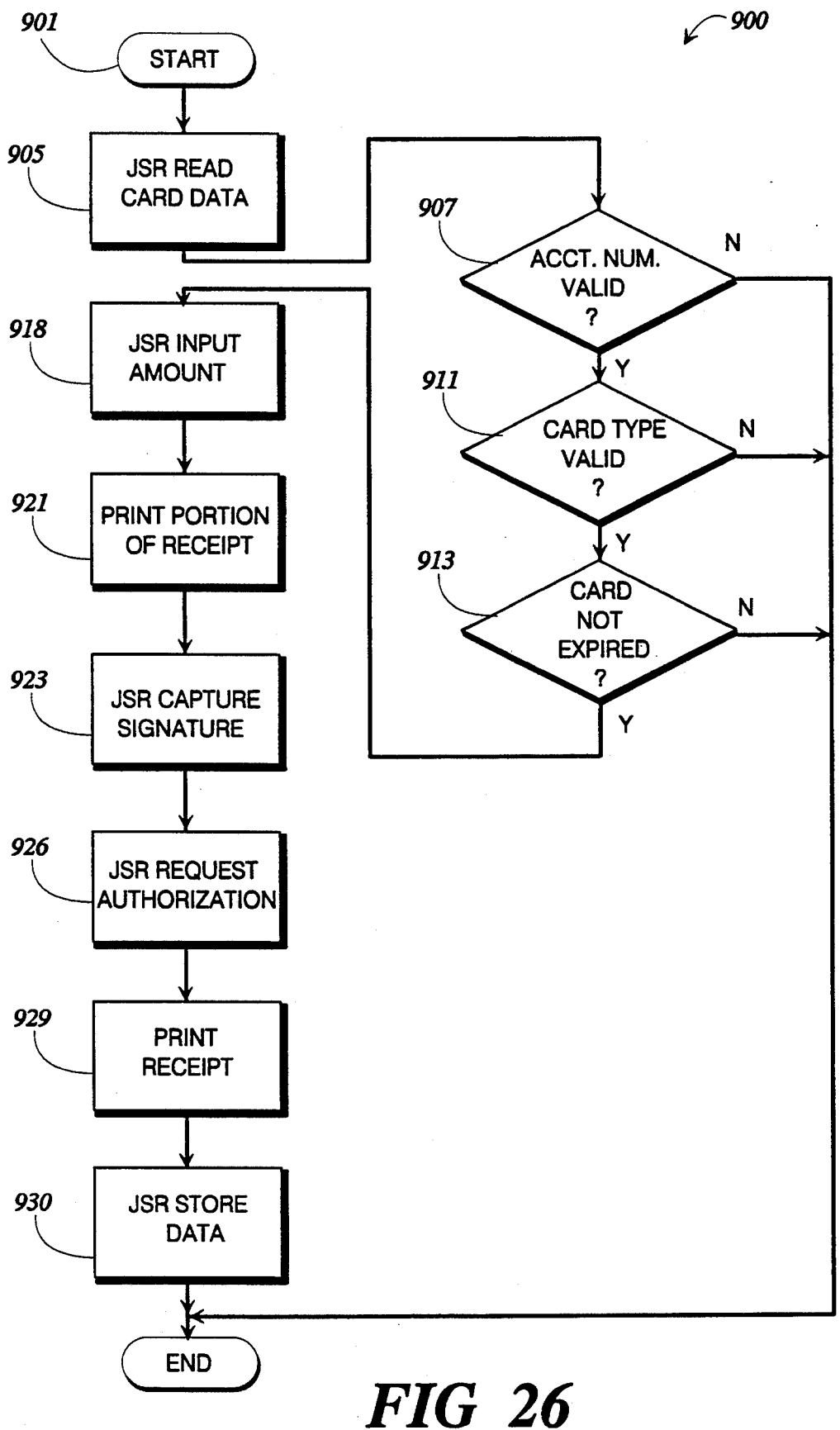

FIG. 26 is a flow diagram illustrating a preferred subroutine for conducting a credit card transaction with card detection, transaction authorization, and signature capture forming a part of the transaction terminal/printer software method of FIG. 25.

Figure 27:
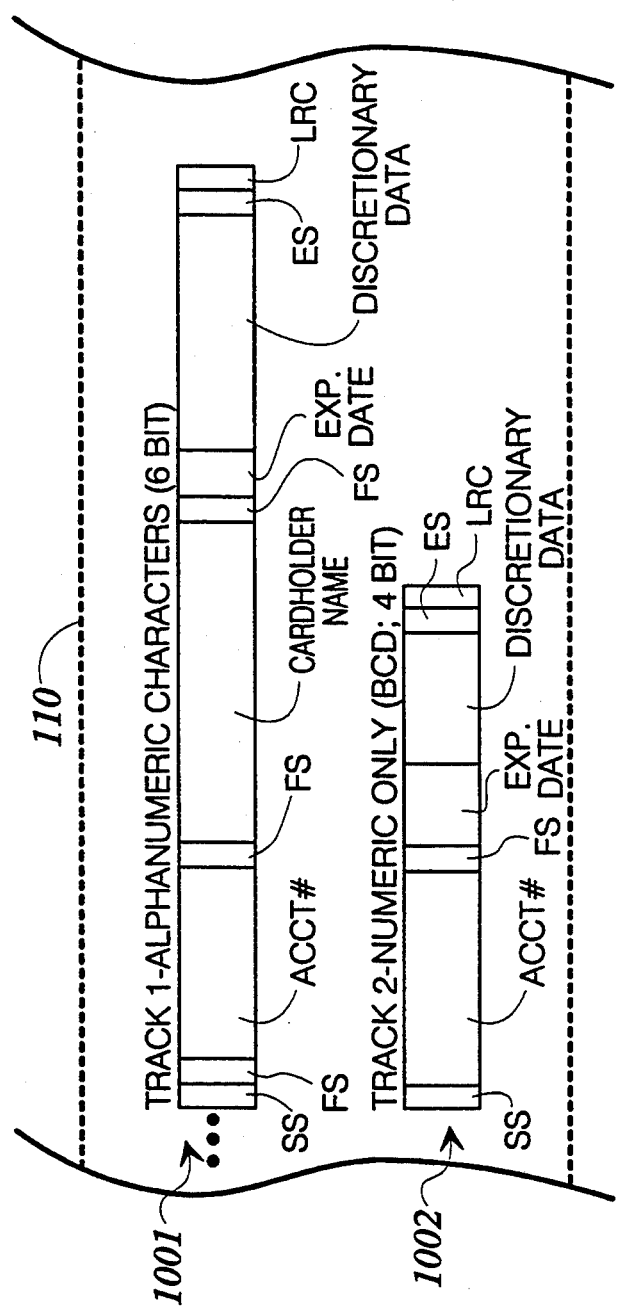

FIG. 27 is a diagram illustrating the data encoded on track 1 and track 2 of a magnetic stripe of a typical data card.

Figure 28A:
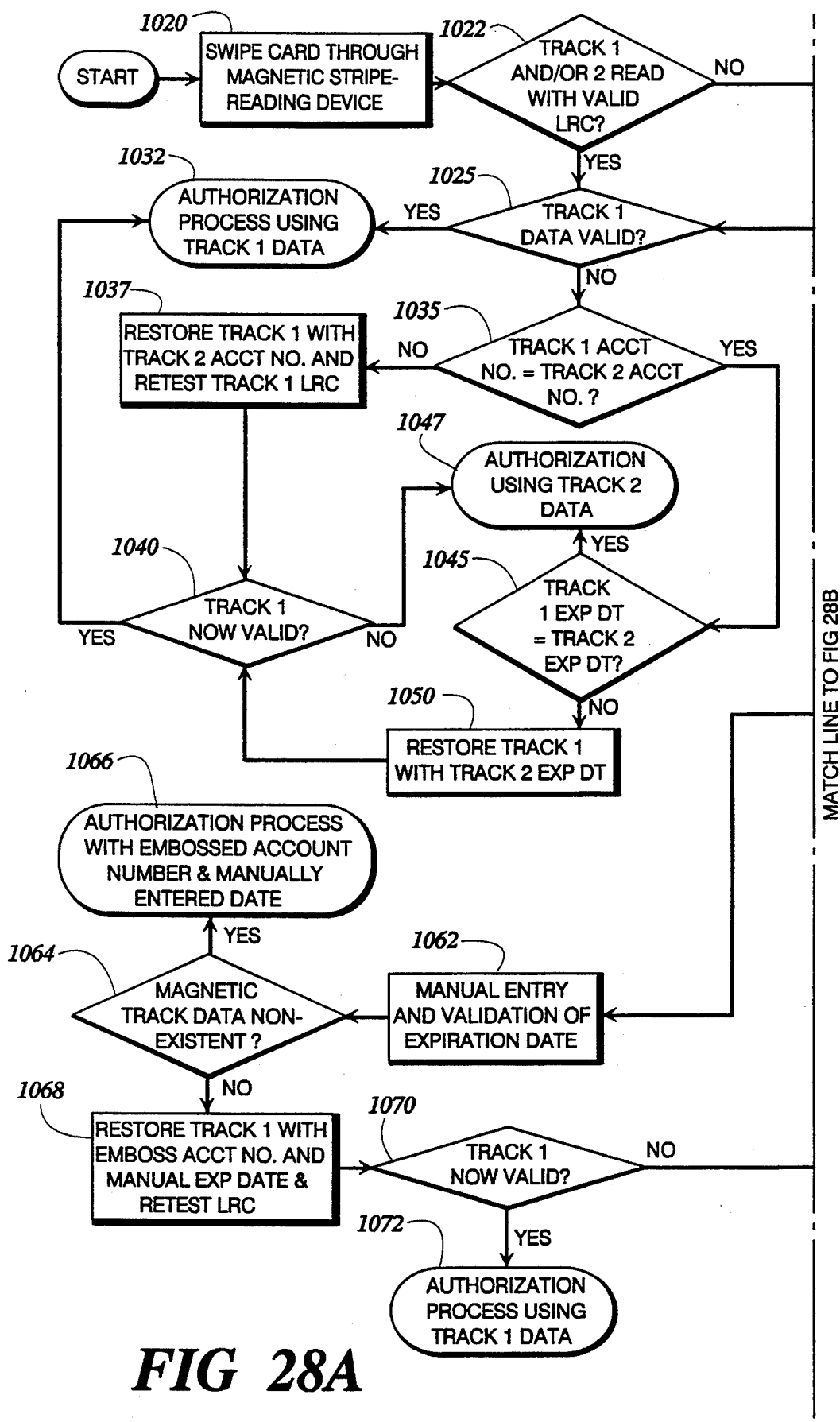
Figure 28B:
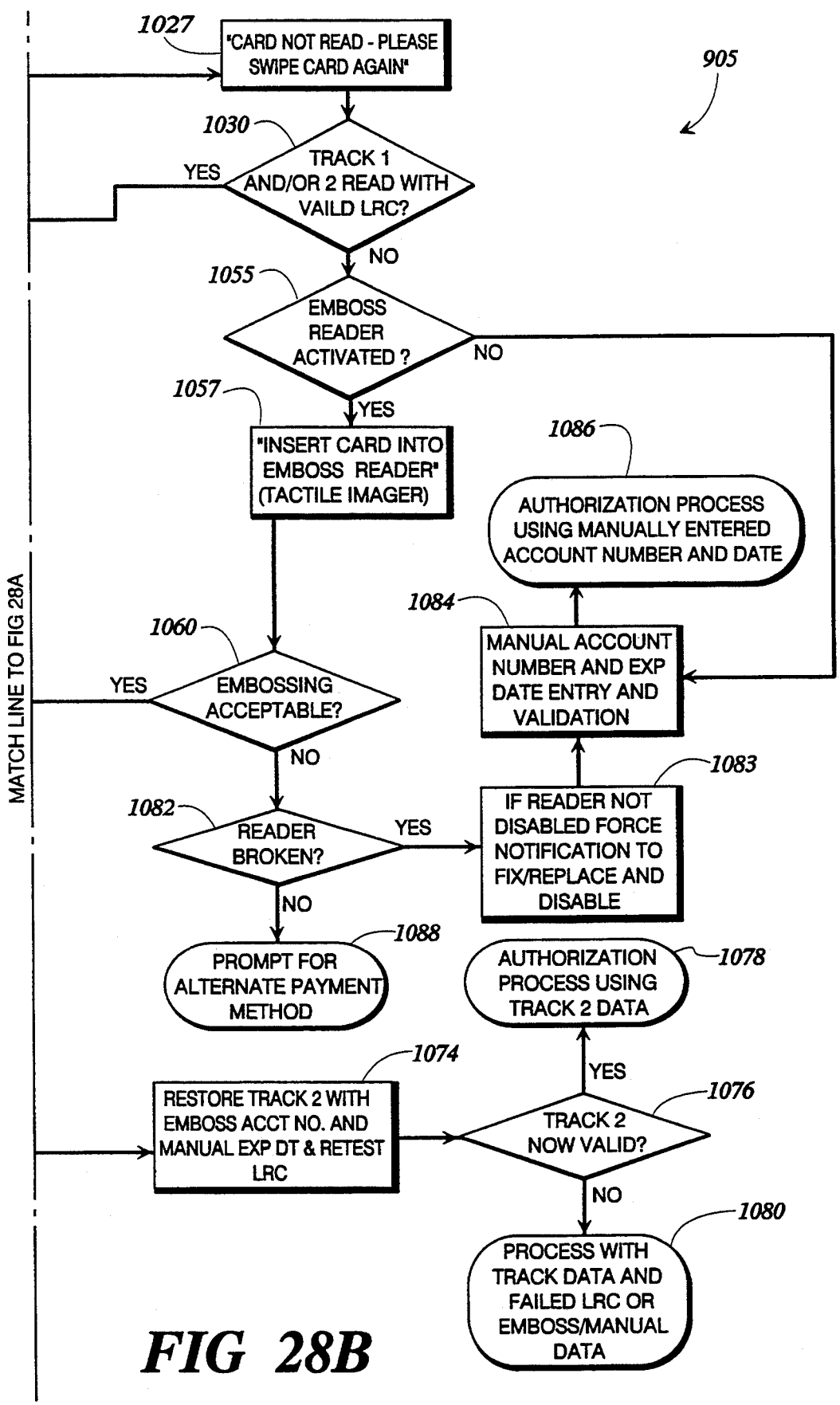

FIG. 28, consisting of FIGS. 28A and 28B, is a flow diagram illustrating the preferred read card data subroutine forming a part of the transaction terminal/printer software method of FIG. 25.

Figure 29:
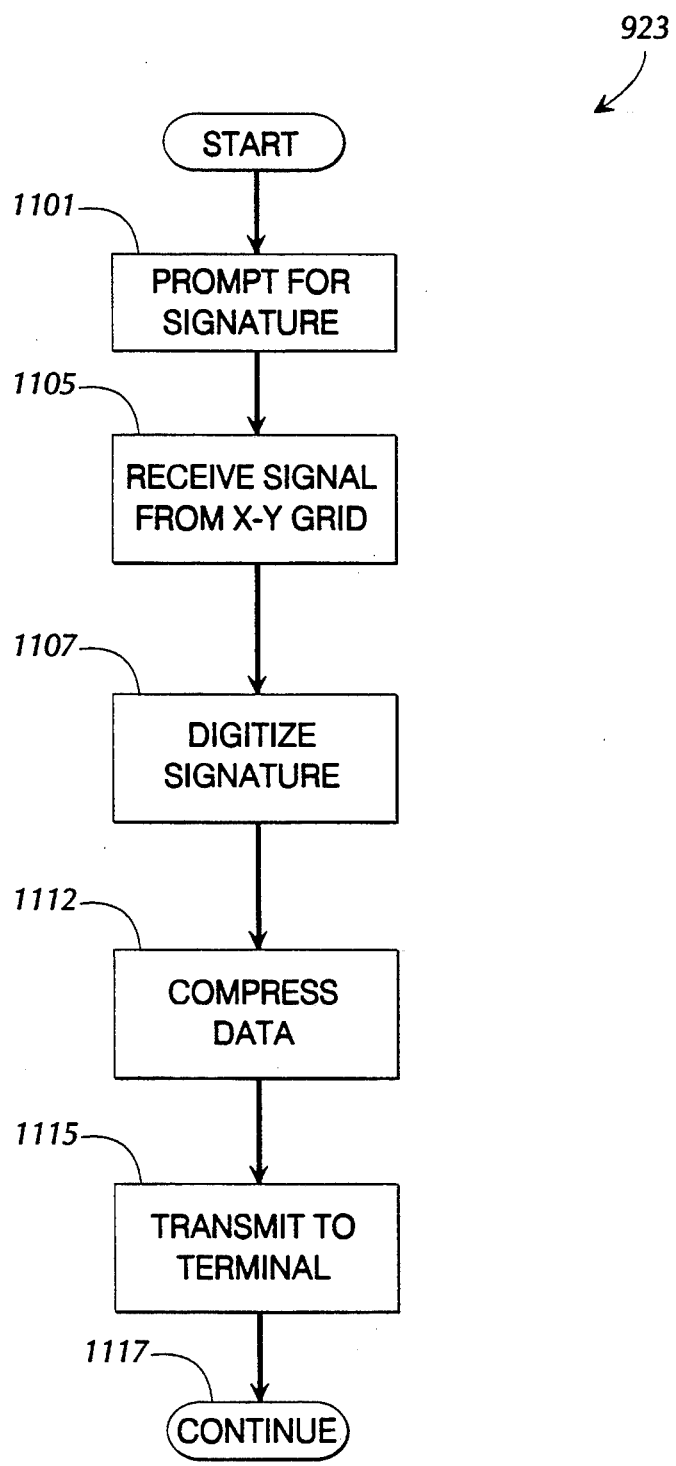

FIG. 29 is a flow diagram illustrating the preferred capture signature subroutine forming a part of the transaction terminal/printer software method of FIG. 25.

Figure 30:
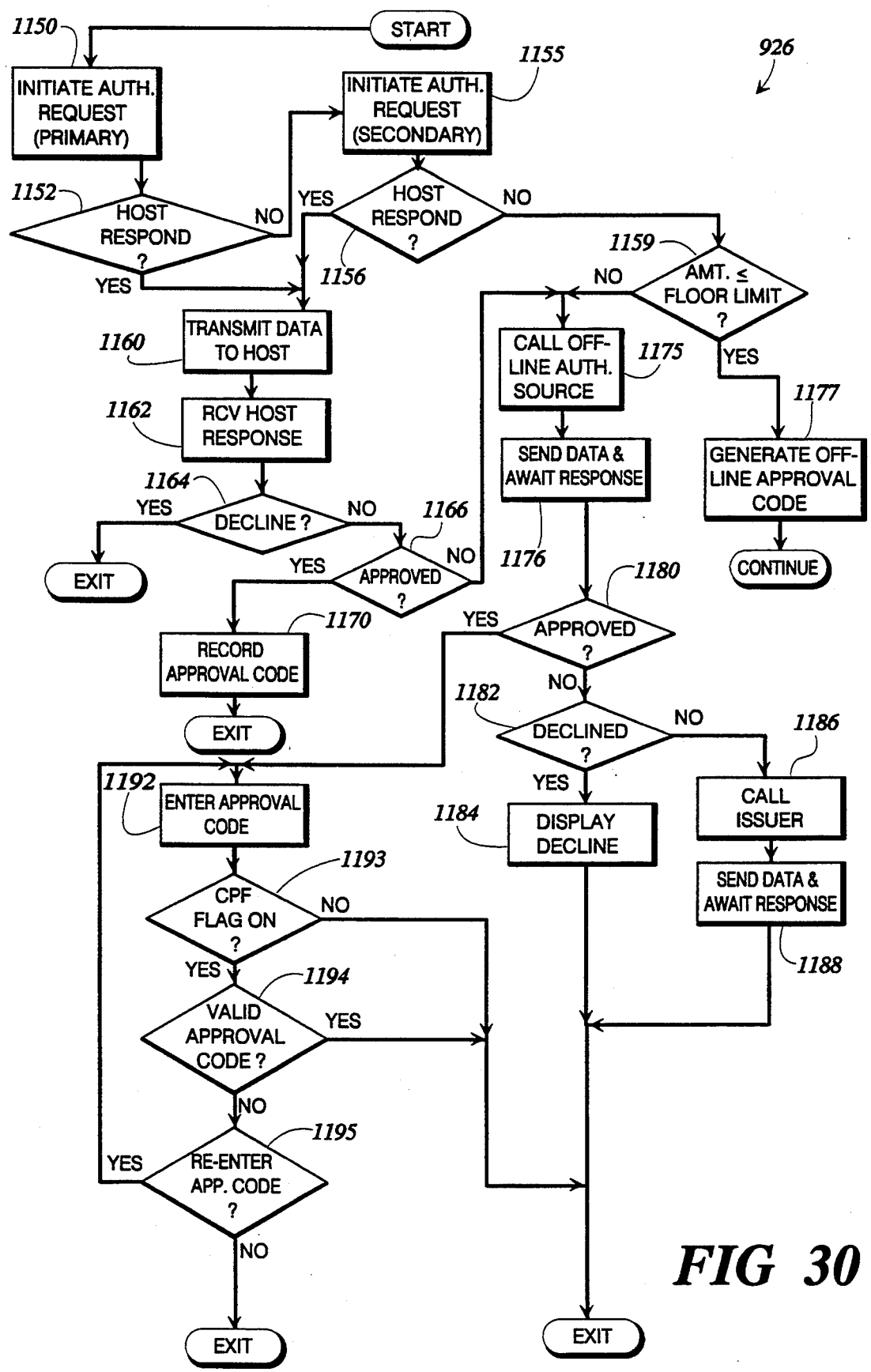

FIG. 30 is a flow diagram illustrating the preferred request authorization subroutine forming a part of the transaction terminal/printer software method of FIG. 25.

Figure 31:
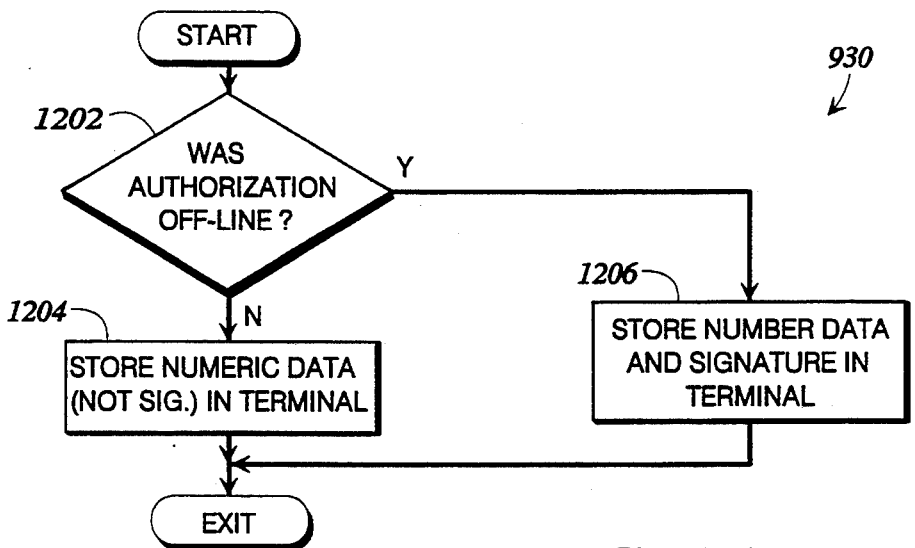

FIG. 31 is a flow diagram illustrating the preferred store data subroutine forming a part of the transaction terminal/printer software method of FIG. 25.

Figure 32:
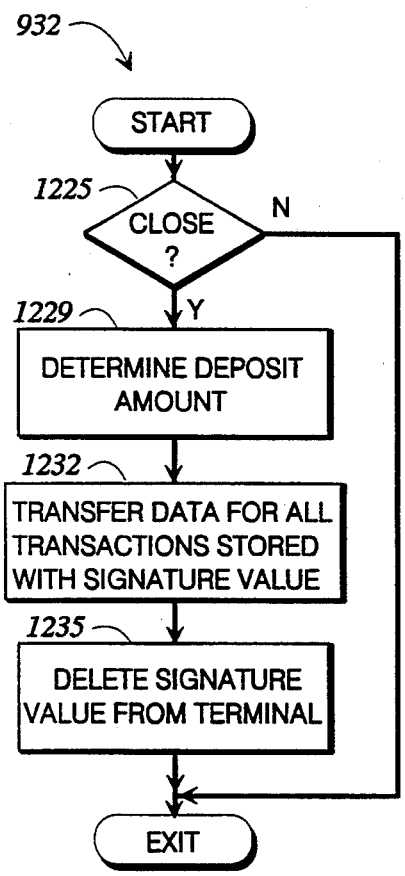

FIG. 32 is a flow diagram illustrating the close terminal subroutine forming a part of the transaction terminal/printer software method of FIG. 25.

Figure 33:
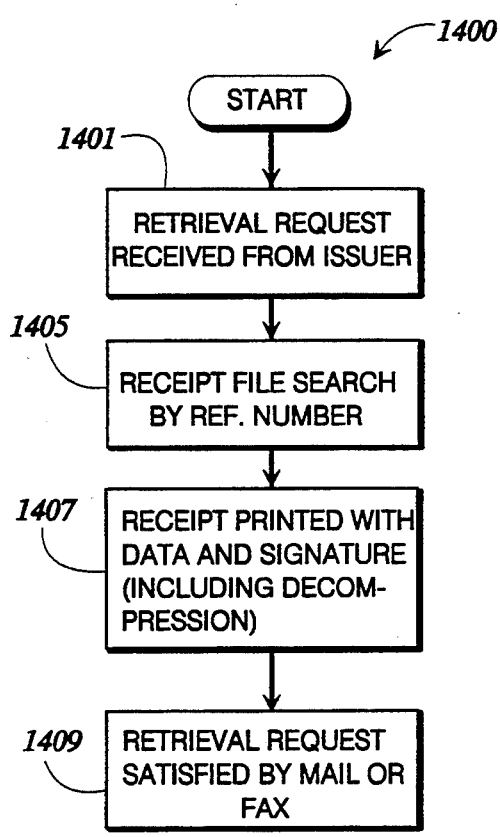

FIG. 33 is a flow diagram illustrating the retrieval request processing method employed in a transaction processing host computer system constructed in accordance with the present invention.

Figure 34:
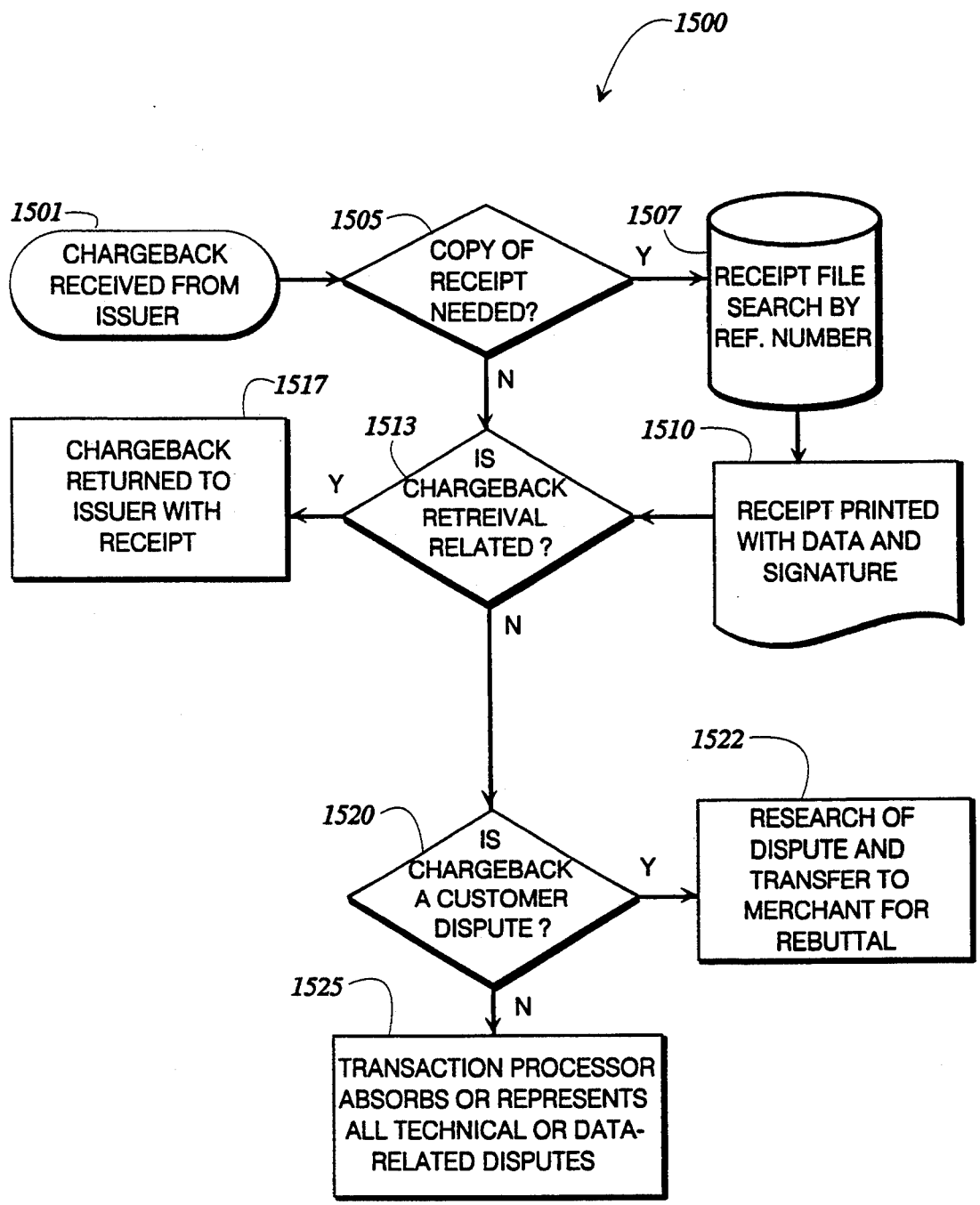

FIG. 34 is a flow diagram illustrating the chargeback processing method employed in a transaction processing host computer system constructed in accordance with the present invention.

Figure 35A:
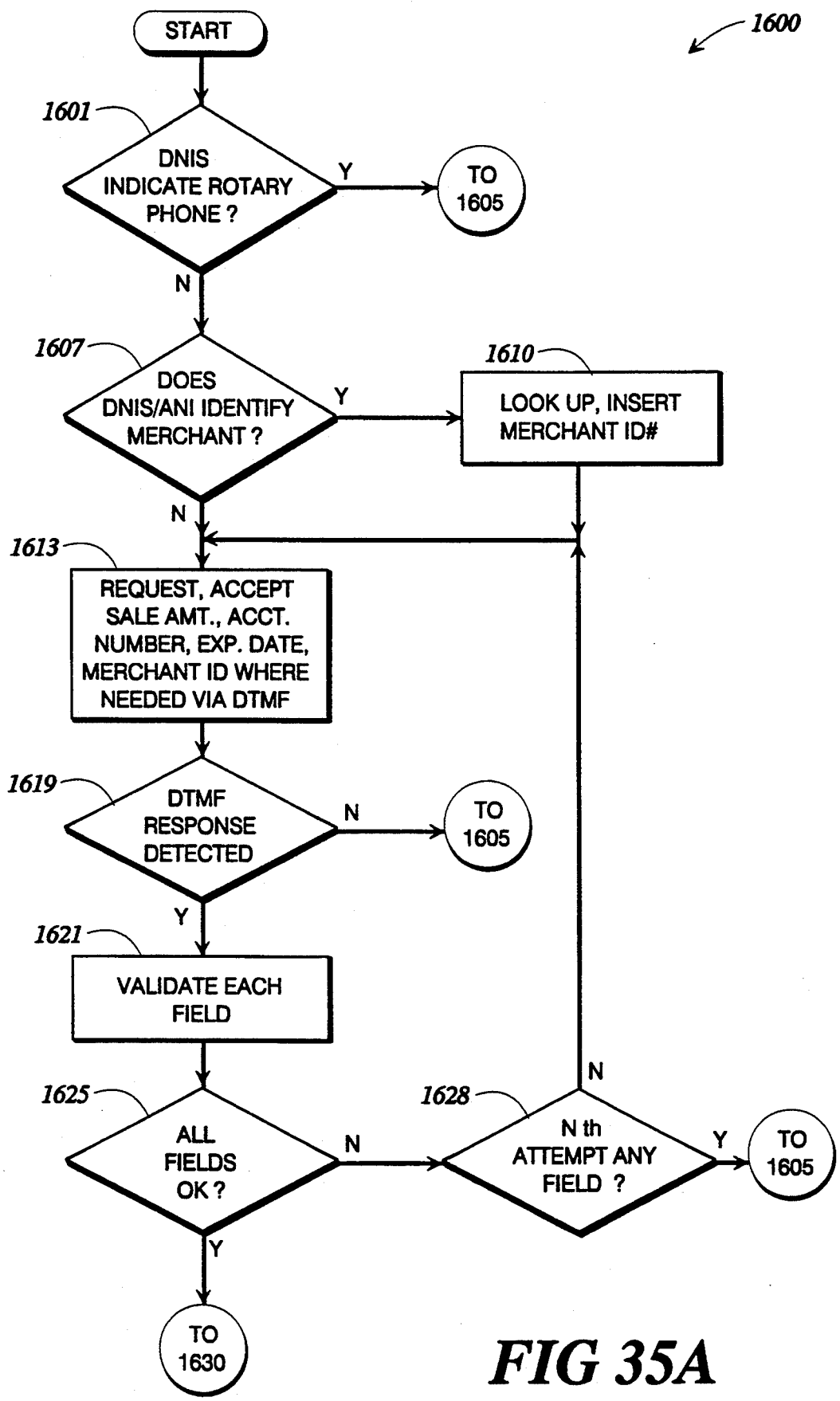
Figure 35B:
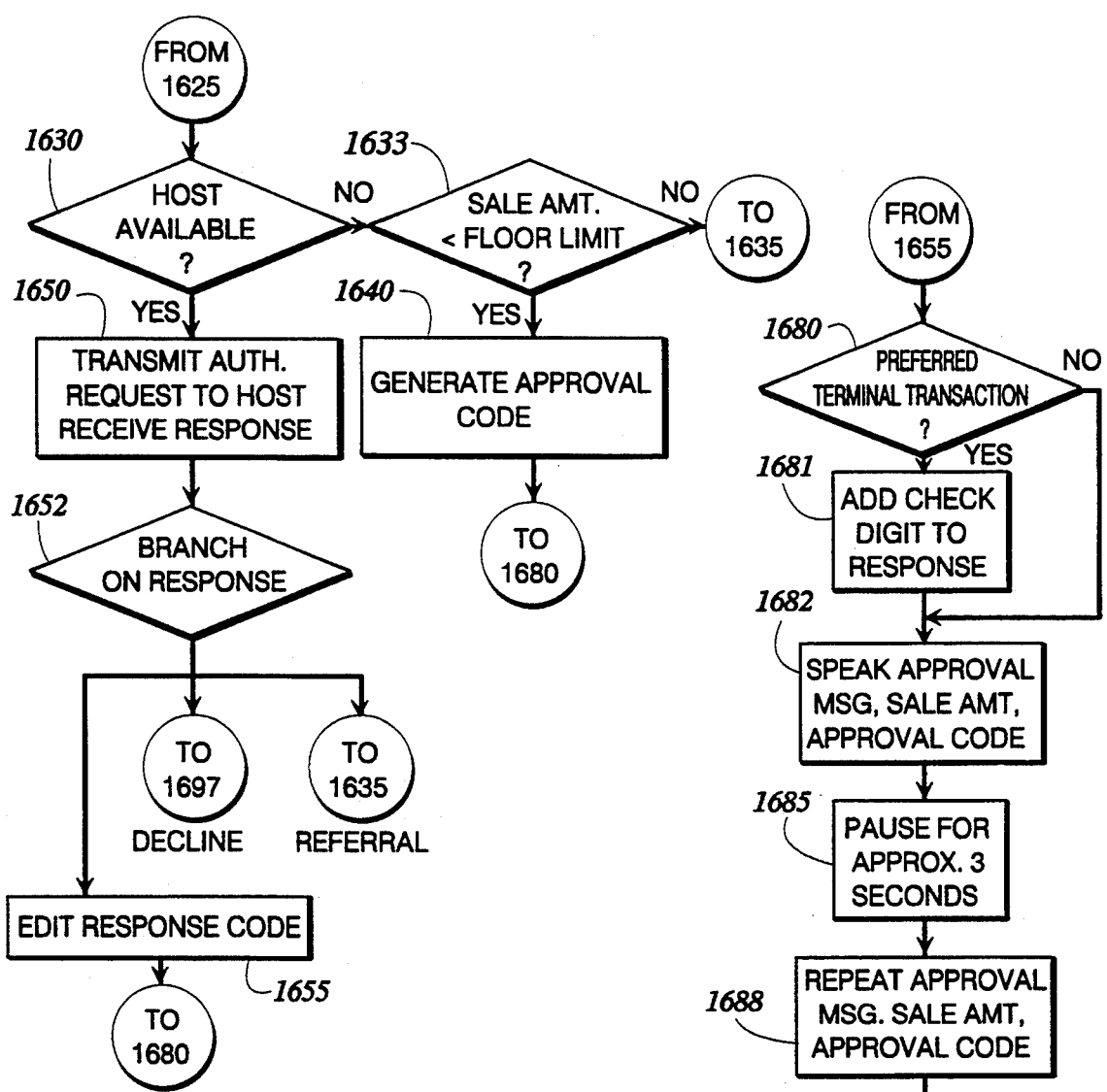
Figure 35C:
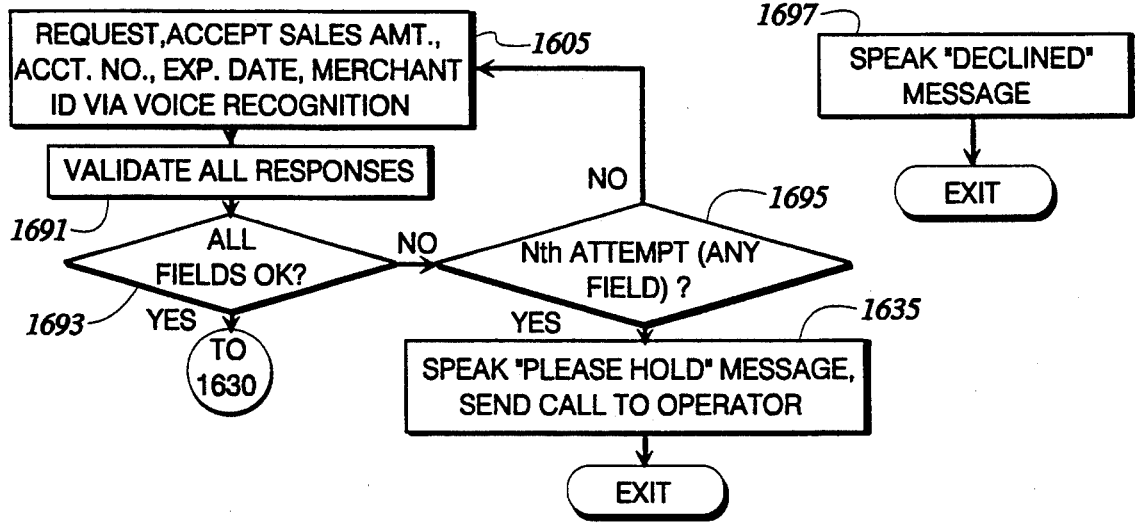

FIG. 35, consisting of FIGS. 35A-35C, is a flow diagram illustrating a method for providing off-line authorization for transactions in accordance with the present invention, carried out by a host system.

DETAILED DESCRIPTION OF THE PREFERRED EMBODIMENTS

Referring now to the drawings, in which like numerals indicate like elements throughout the several views and drawing figures, it may be helpful to review the operation of a data card transaction processing system before turning to a description of the preferred embodiments of a data card transaction terminal/printer, and associated systems constructed in accordance with the present invention for providing chargeback protection and the like.

Definitions

Before turning to an explanation of the disclosed embodiments, some definitions are in order:

A "data card" can mean a debit card, a credit card, or other financial account card. Such data cards typically have a magnetic stripe associated with the card, carrying an account number associated with the card, expiration date, issuing institution, and other information, as well as a visible indication of an account number and other information in an area of embossed characters. The terms "data card", "credit card", etc. are used interchangeably herein.

A "merchant" is an institution that renders goods or services in exchange for payment, but also can include other types of institutions that rely upon information provided to them by way of data cards, for example, health service providing institutions.

A data card "transaction" is a transaction typically involving the exchange of information and/or goods and/or services and/or money between a card-holding consumer and a goods or service provider such as a merchant. However, the term "transaction" is generally meant in the broadest sense to include other types of information exchanges between institutions involving a data card, for example, the exchange of information pertaining to health insurance benefit cards and health providers would be considered a "transaction".

A "transaction processor" is an institution that processes data card transactions, for example a credit card transaction processing company. Transaction processors are sometimes independent third party institutions that are not related to any particular credit card issuer. However, since many card issuing associations and card issuers also process transactions, card issuing associations and card issuers are generally included within the term "transaction processor", except where a distinction between the institutions is required.

A "card issuing association" or entity, as used herein, is an institution or other entity that issues regulations governing a particular brand of data card, for example VISA ®, MasterCard ®, AMERICAN EXPRESS ®, DISCOVER ®, and the like. Some associations called "bankcard associations" typically comprise "member banks" that actually issue the credit cards, for example VISA ® and MasterCard ® bankcard associations. Other non-bank entities such as AMERICAN EXPRESS ® are included within the term for purposes of this invention. Card issuing associations typically accumulate transaction data from transaction processors and send it to the individual cardholder's bank.

A "card issuer", as used herein, is an institution or organization, often a bank, that issues a data card such as a debit or credit card. Card issuers are generally members of a card issuing association. However, the terms "card issuer" and "card issuing association" are sometimes used synonymously when the context suggests an entity that is responsible for issuance and/or regulation of transactions involving certain data cards.

"Settlement" refers to the process by which funds are transferred from a card issuer to a merchant.

"Clearing" a transaction refers to the process by which data pertaining to a merchant's credit card transactions is transferred to a card issuer. Transaction clearance is often provided nowadays by transaction processors that are independent of credit card issuers. However, since card issuers also clear transactions themselves, they are often transaction processors as well.

"Authorization indicia", also referred to as "authorization codes", "authorization approval", or "approval code", refers to predetermined signals or codes received from a card issuing association or other authorization source, indicative that a particular transaction has been authorized. These indicia may be electronic or may be audible. The authorization indicia or codes are generally associated with other transaction data, to flag the transaction as having been pre-approved.

"Referral" means a signal or predetermined indicia received by a merchant from an authorization source indicative that the merchant should contact the authorization source, or a card issuer, in connection with a particular transaction. A referral is often generated in response to a determination that a transaction should not be completed because the account associated with a presented card is over its credit limit, may have been stolen, or for some other reason.

A "call me" signal is the same as a referral.

An "audio response unit" or "ARU" is a synthesized voice generating apparatus that responds to dual tone multiple frequency (DTMF) signals provided by standard TOUCH-TONE ® telephones to enter the account number, expiration date and purchase amount. In addition, the ARU contains circuitry that is capable of recognizing certain spoken words and numbers. If a transaction is approved, the ARU's voice synthesizer provides an approval number and is operative for generating an audible but synthesized voice message corresponding to a predetermined message. For example, an ARU may be programmed to provide messages such as, "Transaction authorized, approval code is 12345", or "Transaction declined, call me." Such messages are generated and delivered to merchants automatically and telephonically, without human intervention or participation.

A "retrieval request" is a request or inquiry made of a merchant or merchant's transaction processor, typically from a cardholder or card issuer, for a hard copy of documentation associated with a given transaction. Typically, a transaction may be charged back to the transaction processor or merchant if the requested documentation is not provided within a time limit set under card issuing association regulations.

General Description of Credit Card Transaction Processing Systems

Figure 1:
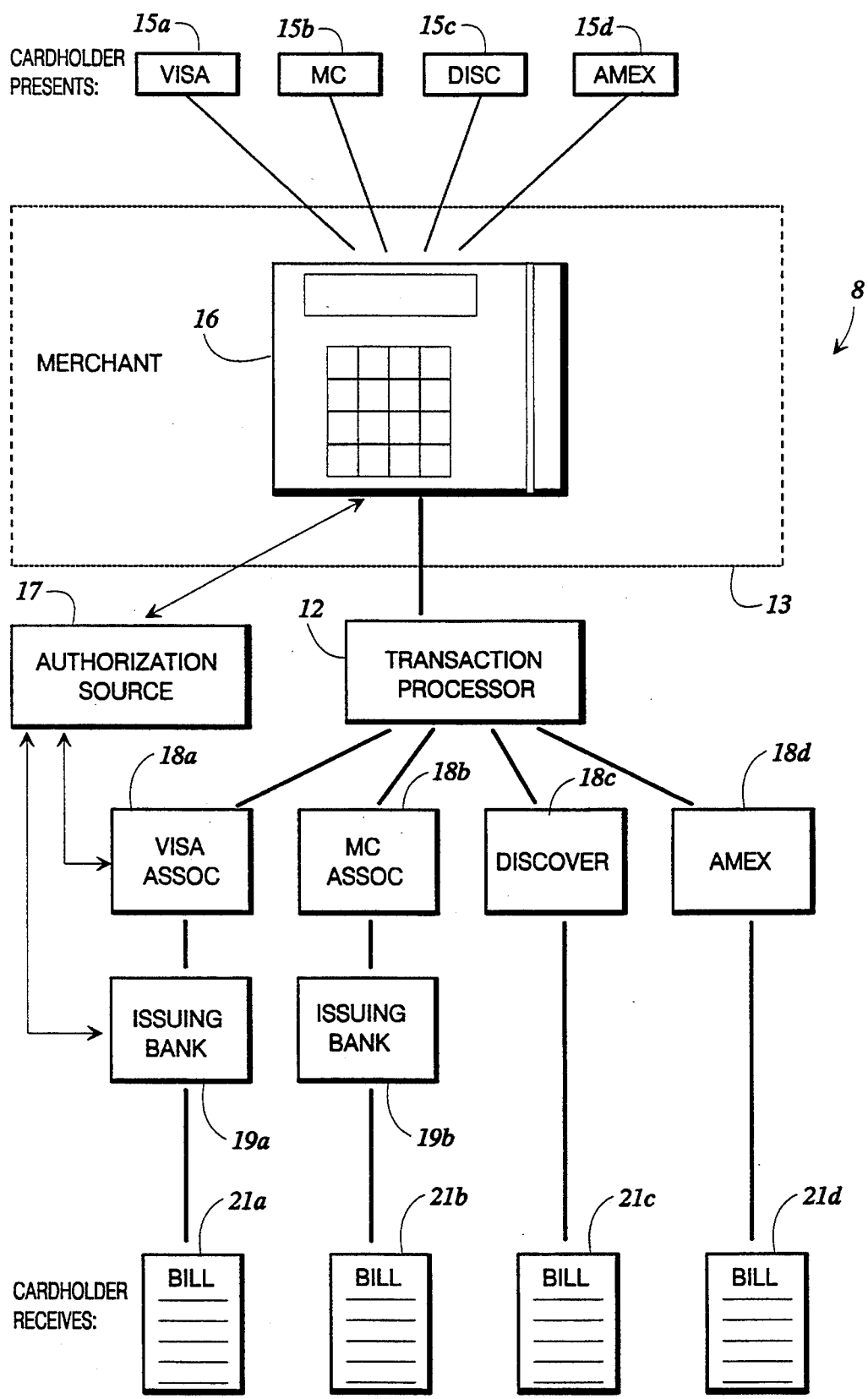

FIG. 1 illustrates generally a typical prior art system 8 used to process and settle data card transactions. The system 8 is known in the art, and is subject to many of the difficulties to which the present inventions are addressed. The system 8 contemplates that a transaction processor 12 (which could be a card issuer or an independent transaction processor) is employed for transaction clearing and settlement. A merchant 13 may transfer transaction data to the transaction processor 12 electronically or in the form of paper sales drafts. The data is typically transferred from the transaction processor to the credit card issuer electronically. Once the card issuer receives the data, the transactions are posted to the appropriate cardholder's account or stored for subsequent posting to the appropriate cardholder's account. Settlement occurs as funds are transferred from the issuing institution to the merchant.

In a typical transaction, a cardholder proposes to purchase goods or services and presents a credit card, such as one of the types 15a–d, to the merchant 13 as the method of payment. In some cases, the merchant communicates with the transaction processor 12 as an authorization source in order to have the proposed transaction authorized prior to completing the transaction. In other cases, the merchant communicates with a separate authorization source 17 for requesting transaction authorization. Either authorization source may communicate with a card issuing association 18 or a card issuer 19 for authorization.

If the transaction is approved, the merchant receives an authorization number or code ("authorization indicia") from the authorization source, which is recorded along with the other transaction data. In response to the authorization request, the merchant may also receive a "decline", in which case the transaction is terminated, or a "referral", in the event the issuer or authorization source desires to speak with the merchant before authorizing the transaction.

The merchant 13 in the system 8 uses an electronic terminal 16 or manual imprinter to record the data pertaining to the transaction. The recorded data includes the account number and expiration date shown on the card, the amount and date of the purchase, the authorization number (if the proposed transaction is approved), and the cardholder's signature.

Periodically (e.g., daily), the merchant transfers the data from all of the credit card transactions to the transaction processor 12 so that the transactions may be processed or "cleared". Some transaction processors handle transactions for different types of credit cards, thereby obviating the merchant's need to communicate separately with different card issuers. In such cases, the transaction processor 12 separates that merchant's transactions according to the type of card used. The transaction processor then combines the transactions for each type of card with those received from other merchants and forwards the data to the respective credit card issuing association 18a–d.

In the case of VISA ® and MasterCard ® card issuing associations, the entities that receive the data from the transaction processor 12 comprise associations 18a–b that are formed by "member banks" 19a–b that actually issue the credit cards. These associations 18a–b accumulate the data and send it to the individual cardholder's bank. In the case of other credit card issuing associations, e.g., DISCOVER ® 18c and AMERICAN EXPRESS ® 18d, the transaction processor 12 transmits data directly to the credit card issuing association. In either case, once the entity that issued the credit card to the cardholder receives the data, each transaction is posted to the appropriate account and a statement or bill 21a–d is subsequently sent to the cardholder.

Although the known transaction processing system 8 provides for authorization of transactions and has served the business community well, the system does not allow for provision of chargeback protection on behalf of merchants to the extent that is desired by merchants, nor does the system allow for adequate handling of transactions in the event that the terminals 16 are unable to communicate with the host computers of the transaction processor, nor does the system allow for handling retrieval requests regarding particular transactions without involvement of the merchant.

Preferred Credit Card Transaction Processing System Employing Present Invention

Figure 2:
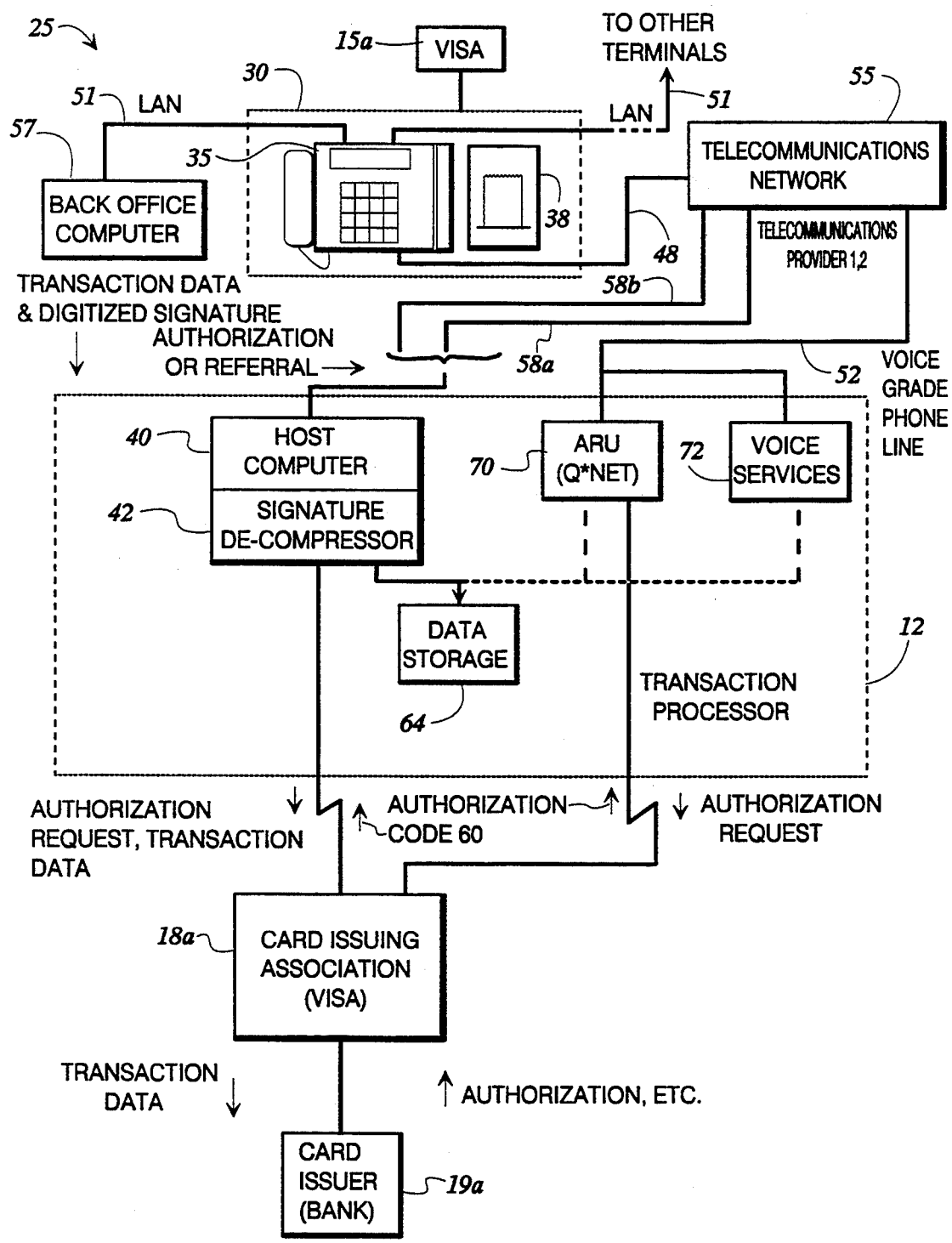
FIG. 2 illustrates a credit card transaction processing system that employs a data card transaction terminal constructed in accordance with the preferred embodiment of the present invention.

FIG. 2 illustrates a preferred data card transaction processing system 25, implemented as a credit card transaction processing system, that incorporates the present inventions, including a data card terminal/printer 30 constructed as described herein. In the preferred system 25, the cardholder purchases goods or services and presents a credit card 15a, for example a VISA card, to the merchant as the form of payment, as in the system 8.

At that point, the merchant uses the preferred data card transaction terminal/printer 30, which includes a transaction terminal 35 and a signature capture printer 38, to record the transaction data. More particularly, the terminal 35 reads the account number and expiration date directly from the card by means of a card swipe interface, and may also obtain information from an embossed card reader. The transaction terminal 35 thereby detects the physical presence of the data card at the terminal, and provides a "card present" signal. The terminal then prompts the merchant to enter the purchase amount via the keyboard. Once the purchase amount is entered, the printer 38 prints a portion of a paper receipt and the transaction terminal 35 prompts the merchant to have the cardholder sign the receipt. The signature capture printer 38 digitizes the signature and transmits the digitized value to the terminal 35, where data signals representative of the signature are processed and stored along with other data pertaining to the transaction. This process is described in more detail below.

Once the terminal 35 has acquired transaction information and signature signals, in the preferred embodiment the terminal is operative for communicating the data to a transaction processor 12 in one or more communications sessions, for requesting an authorization and/or for transmitting transaction information for settlement. Communications from the terminal 35 are effected over a telephone line 48, which is connected to telecommunications network 55.

In preferred methods, the terminal 35 initiates an authorization communications session with a host computer 40 operated by the transaction processor 12 that serves as an authorization source (or as a communications facility to an authorization source), and transmits an authorization request to the authorization source. The host computer 40 preferably includes software 42 for signature decompression, when necessary in connection with a retrieval, in the manner to be described below.

It should be understood at this juncture that authorization sources, for providing authorization indicia in connection with proposed transactions in response to an authorization request, include card issuers as well as transaction processors. In the system 25 illustrated in FIG. 2, the host computer 40 operated by the transaction processor 12 transmits the authorization request to a card issuing institution 18a or a card issuer 19a (bank), or may provide the authorization indicia under certain circumstances.

Communications sessions with the host computer 40 are effected via telecommunication networks 55. In a preferred embodiment, the terminal 35 is operative for automatically attempting to establish a communications link with the host computer 40 via a first telecommunications link 58a by dialing into a packet communications network provided by a major telecommunications provider such as AT&T, MCI, SPRINT, or the like. In the event that the terminal 35 is unable to establish the first telecommunication link 58a, the terminal is automatically operative for attempting to establish a communications link with the host computer 40 via a second telecommunications link 58b by dialing into an independent, separate packet communications network provided by a major telecommunications provider such as AT&T, MCI, SPRINT, or the like.

If the first telecommunications link 58a or the second telecommunications link 58b are established, the terminal communicates with the host 40 by transmitting and receiving signals via an internal modem (not shown), using a conventional but high speed data communications protocol.

If the terminal is unable to establish either the first telecommunications link or the second telecommunications link, the terminal 35 is automatically operative for dialing over the line out 48 via a voice grade telephone line 52 to an ARU 70 operated by the transaction processor 12.

Still referring to FIG. 2, the terminal 35 may be connected to other like terminals (not shown in FIG. 2) via a local area network (LAN) 51. In particular, the terminal 35 may be connected to a separate "back office" computer system 57 that performs accounting functions for the merchant and/or terminal configuration software.

If the telecommunication link with the authorization source (via host computer 40) is successful, the terminal 35 transmits certain predetermined transaction data to the host computer 40. The host computer 40 then relays the transaction data to a credit card issuing institution 18a, for example a VISA ® card association, in order to receive authorization. If the transaction is authorized, an authorization code or indicia 60 is relayed from the credit card issuing institution 18a (or other authorization source) to the host computer 40, and from the host computer to the transaction terminal 35. The host computer 40 stores the transaction data and signature in a data storage facility 64. The terminal 35 also stores all of the transaction data (except the signature in the preferred embodiment, which is not retained in the terminal since the signature is transmitted to the host during the authorization communications session).

As in the general credit card transaction processing system 8 described in conjunction with FIG. 1, the transaction processor 12 separates the transaction data according to the type of card used and periodically transfers the data to the credit card issuing institution 18a, which in mm relays it to the card issuing bank 19a. At that point, each transaction is posted to the appropriate individual cardholder's account.

The preferred system 25 also provides an alternative method for providing "off-line" authorization if the terminal 35 is unable to communicate with the host 40, or if the host 40 responds to the terminal's authorization request with a "referral". Off-line authorization is effected automatically under predetermined conditions, namely, if a primary telecommunications network is unable to connect the terminal 35 to the host terminal 40, if a secondary telecommunications network is unable to connect the terminal 35 to the host terminal 40, or if a call me signal is generated at the host. In the preferred embodiment of the terminal 35, an off-line authorization is sought automatically under the indicated conditions.

This off-line authorization method comprises use of an audio response unit ("ARU") 70, and a voice services department 72. The audio response unit 70 responds to dual tone multiple frequency (DTMF) signals provided by a merchant's standard TOUCH-TONE ® telephone corresponding to the account number, expiration date and purchase amount for the proposed transaction. If the transaction is approved, the ARU's voice synthesizer provides an approval number as the authorization indicia, which the merchant manually enters into the terminal 35 via its keypad. In the preferred embodiment, the manually entered approval number is verified by logic in the terminal 35, to reduce mistakes and fraud.

Since the transaction terminal 35 was unable to obtain an authorization indicia directly (i.e., an electronic authorization) from the host computer 40 if the ARU 70 is reached, the transaction data, including the signature, is stored in the terminal 35 until subsequent communication with the host computer 40 is established.

The voice services department 72 provides conventional "live operator" voice communications on behalf of the transaction processor 12, in the usual manner, in the event that communications were not established with the host and for some reason the ARU 70 was not operative, or a call me referral was received.

After discussion of the features of the preferred terminal/printer 30, those skilled in the art will understand how the present inventions facilitate provision of transaction processing services by a transaction processor 12, including the provision of improved chargeback protection services and offline authorization services on behalf of merchants.

Preferred Embodiment of Terminal/Printer

FIG. 3 illustrates the preferred embodiment of a data card transaction processing terminal/printer system 30 constructed in accordance with the present invention. The terminal/printer system 30 comprises a transaction terminal 35, and a signature capture printer 38. The terminal 35 includes an injection molded plastic housing or case 101. A card swipe slot 103 is formed in the top portion of the case 101. When a card 15, such as a credit card, having a magnetic data stripe 110 is passed through the card swipe slot 103, the terminal 35 reads and decodes the data that is encoded in the card's magnetic stripe.

The preferred transaction terminal 35 also comprises an embossed card reader 112, comprising a tactile imager. When a card 15 having embossed characters 115 is inserted into the embossed card reader 112, the terminal 35 reads and decodes the account number embossed on the card. The embossed card reader 112 is located interiorly of a slot 113 in the housing 101, preferably opening toward the front of the terminal 35 for ease of access by a user.

According to a preferred aspect of the invention, the card is placed in the embossed card reader 112 only if the magnetic stripe is damaged or provides erroneous data, as detected by the terminal software. According to other aspects of the invention, the card may be placed in the embossed card reader 112 as a matter of course immediately after a swipe of the card to read the magnetic stripe.

A card swipe reader in the card swipe slot 103 and the embossed card reader 112, in combination and separately, comprise means for detecting the physical presence of the card during the transaction. When used together, such means provide an even greater confirmation that the card was actually present.

According to the preferred embodiment of the invention, in the event the magnetic stripe 110 is damaged and unable to be read, the card will be placed in the embossed card reader 112 to detect the account number from the embossed area of the card.

According to other aspects of the invention, in the event the magnetic stripe 110 is damaged and unable to be read, the embossed card reader 112 may be used to detect the account number and, under certain circumstances, to restore the account number by utilizing at least a part of the account number read from the embossed area on the card, for the missing or defective account number, or portions thereof, read from the magnetic stripe.

The preferred terminal 35 also includes a keyboard 120 that allows a user, such as a merchant, to enter various information concerning a transaction into the terminal, and a liquid crystal display (LCD) 123 in order to display alphanumeric messages to the terminal user.

In addition to the terminal 35, FIG. 3 also illustrates the preferred embodiment of a signature capture printer 38 constructed in accordance with the present invention. The signature capture printer 38 is connected to the terminal 35 via a cable 145, preferably a serial data link. The signature capture printer 38 includes an injection molded plastic cover 150 that encloses the print engine, a digitizer printed circuit board, and a paper roll (not shown). The signature capture printer 38 is operative for printing a paper receipt 152 of a transaction, which is given to the cardholder, and for capturing the cardholder's signature in connection with the transaction.

After the paper receipt 152 is printed by the print engine, it emerges from the printer through a paper slot 155. The paper slot 155 incorporates a built-in cutting edge 159 that may be used to neatly tear the paper when the transaction is complete.

More particularly described, for a transaction the terminal 35 first collects the card's account number and expiration date, and the proposed purchase amount. Once this data is collected, the signature capturing printer 38 prints the "header" portion of the receipt, which typically includes the date and time of the purchase, the account number, expiration date, purchase amount, and a line for the cardholder's signature. The printer then advances the paper until the line for the cardholder's signature is positioned over a signature capture window 160 located on the printer 38.

At that point, the paper receipt 152 will be pressed against a signature space or window 160 that is formed on the top surface of the printer 38. The cardholder will be instructed to use an attached or tethered magnetic-/ink stylus 165 to sign his or her name in the space provided on the receipt; the stylus 165 preferably contains a ballpoint pen-type cartridge and is tethered by a current-carrying stylus cord 167.

The stylus 165 in the preferred embodiment comprises a pressure sensing switch and a magnetic coil that is positioned within the tip of the pen. The pressure sensing switch is operative to detect when the stylus 165 is in contact with the receipt paper 152. Together, the magnetic coil and the digitizer printed circuit board are operative to produce digital signals corresponding to the position of the stylus as the cardholder signs the receipt. In particular, the pressure sensing switch provides a "stroke started" signal when the stylus comes in contact with the signature capture window 160 and a "stroke completed" signal when the stylus leaves the signature capture window. These signals allow determination of the number of strokes in the signature, which is merely a graphic object, a stroke being determined by an initial starting coordinate provided in response to the stroke started signal and a final coordinate provided in response to the stroke completed signal. This process will be discussed more completely below.

After the signature is captured by the signature capture printer 38, in preferred embodiments the terminal requests a transaction authorization from a host computer. Once the authorization approval is received, the printer prints the remainder of the receipt (typically, a receipt body and a receipt footer), which includes the approval code received from the host computer. The printed and signed receipt 152 is then removed from the printer 38 and given to the cardholder. At the discretion of the merchant, two part paper may be used, with the second copy suitable for retention by the merchant.

FIG. 16 more clearly illustrates the relationship between the paper 152 and the signature space or window 160 in the signature capture printer 38. Once the header of the receipt 152 is printed by the print engine and emerges from the paper slot 155, the paper is pressed down against the signature capture window 160. When the remainder of the receipt is printed, the merchant may simply tear off the receipt by using the serrated cutting edge 159 that is positioned adjacent to the paper slot 155.

Figure 4:
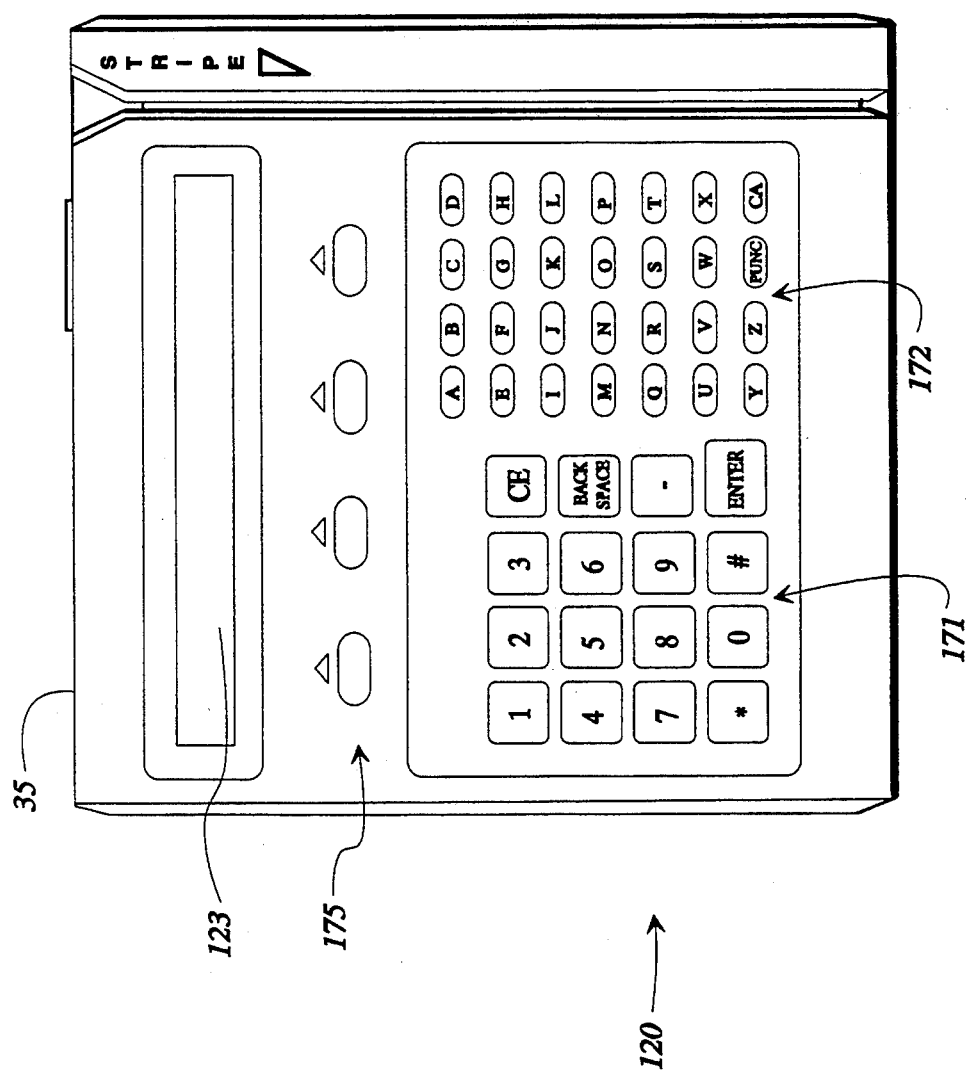
FIG. 4 is a top plan view of the preferred transaction terminal illustrated in FIG. 3.

FIG. 4 illustrates the terminal 35, and in particular, the preferred keyboard 120 that is incorporated into the terminal. The keyboard 120 comprises 48 keys that are arranged in three sections. Twelve keys are grouped together in a first section to provide a standard telephone-type keypad 171 including asterisk (*) and pound sign (#) characters, with the addition of "clear entry", "backspace", "-", and "enter" keys. A second section includes 26 keys and comprises an alphanumeric keypad 172. The alphanumeric keypad includes a key for each letter of the alphabet, a "punctuation" key, and a "clear all" key. The third section comprises four context sensitive, or "soft", keys 175 whose functions vary according to the operation being performed by the terminal. Those skilled in the art will understand that the function assigned to each of the context sensitive keys 175 at any given time is displayed directly above the key on the liquid crystal display 123.

Figure 5:
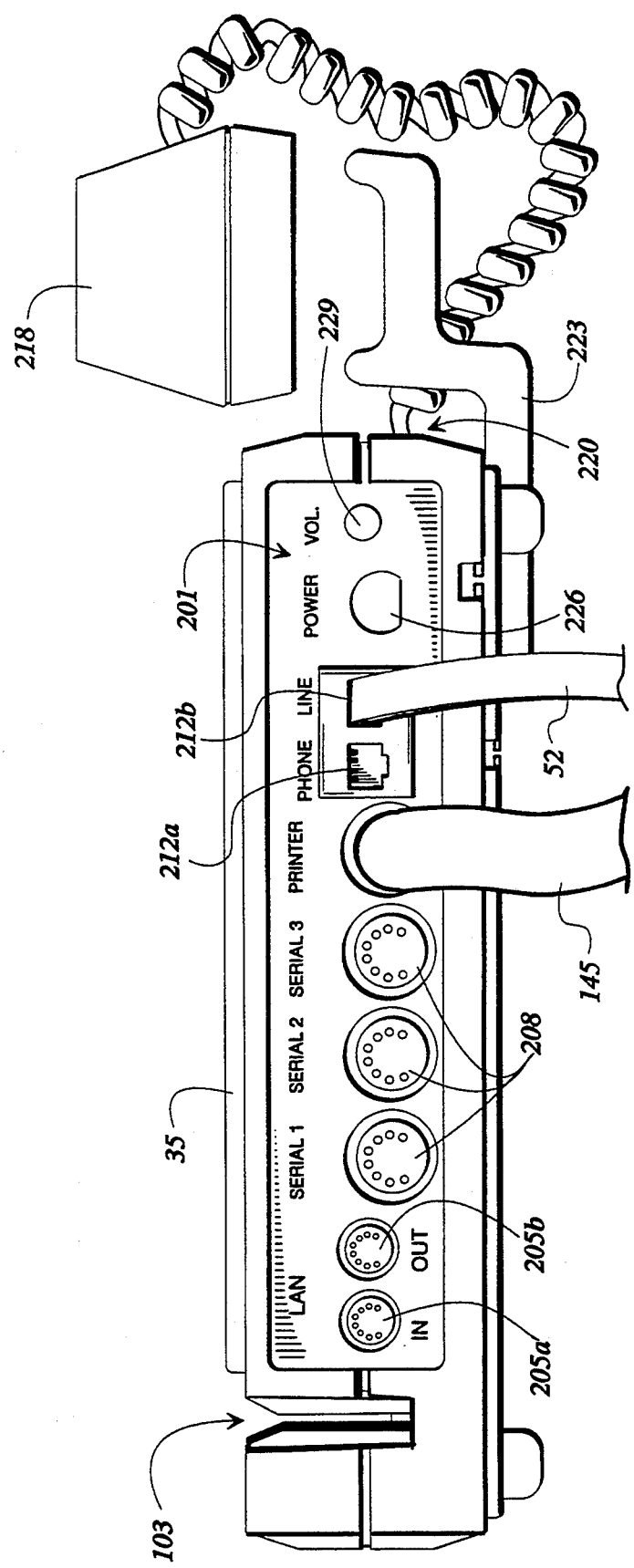
FIG. 5 is a rear elevation view showing the connectors provided in the preferred transaction terminal of FIG. 3.

FIG. 5 depicts the various electrical connectors located on the rear panel 201 of the transaction terminal 35. The rear panel 201 includes two RS-485 ports 205a, b labelled LAN IN and LAN OUT that are used to connect the terminal to a local area network (LAN). Preferably, a multidrop type LAN is employed, where each terminal is connected to a host system as "master" that collects transaction data for the merchant's enterprise as a whole. Such multidrop networks will be known to those skilled in the art, and will not be discussed further herein.

The terminal 35 also includes four serial ports 208, labelled SERIAL 1, SERIAL 2, SERIAL 3, and PRINTER. The ports 208 are RS-232-C compatible and may be used to provide connections to various peripheral devices, including the signature capture printer 38 via the cable 145, an electronic cash register, a bar code reader, and a personal identification number (PIN) pad.

The terminal 35 further includes two RJ-11-type telephone connectors 212a, 212b labelled LINE and PHONE. The LINE 212a connector is used to connect a standard telephone line 48 to the terminal 35. In addition, there are two means by which a telephone or telephone handset may be connected to the terminal 35 in order to allow the terminal user to speak with a credit card processor or issuer. A standard telephone (not shown) may be connected to the PHONE connector 212b on the rear panel 201. Alternatively, a telephone handset 218 may be connected to an RJ-14-type telephone connector 220 located on the terminal's side panel. The handset 218 rests on the detachable cradle 223 when the handset is not in use.

Power is provided to the terminal 35 via a self-locking power connector 226. Finally, a volume control 229 is also provided in order to control the volume of a built-in speaker (not shown).

Transaction Terminal

Turning now to FIG. 6, the electronic components of the preferred transaction terminal 35 will be described. The preferred transaction terminal 35 comprises a terminal circuit board 250, which includes a central processing unit (CPU) 255 and its associated memory 258. The memory 258 comprises read only memory (ROM) for system code storage, and random access memory (RAM) for both applications program storage and data storage, including storage of transaction data and compressed signature signals.

The terminal circuit board 250 receives transactional data in four ways. Firstly, the keypad 120 provides means by which the operator may enter alphanumeric data and/or designate a specific operation for the terminal to perform. Secondly, the card swipe slot includes a magnetic read head 261 that allows the terminal 35 to detect the data encoded on both track 1 and track 2 of a data card. This analog signal is then amplified and conditioned by the card swipe interface circuit 265, before it is decoded by an I/O processor 270. Thirdly, an embossed card reader 112 employs tactile sensing elements to detect and decode the account number as represented by the embossed numerals located on a payment card. Fourthly, compressed signature signals are provided to the transaction terminal 35 from the signature capture printer 38 via a serial data link 145.

In the preferred transaction terminal 35, data from the card swipe interface 265, the keypad 120, and the embossed card reader 112 are decoded by the I/O processor 270. The I/O processor 270 then conveys the data to the central processing unit 255 as clocked serial data.

The preferred terminal 35 further includes a liquid crystal display (LCD) 123 that is used to display alphanumeric messages to the terminal user. The LCD 123 is preferably driven directly from one of the input/output ports of the CPU 255.

The transaction terminal 35 further comprises a communications subsection 275 by which the terminal communicates with other electronic devices. In the preferred embodiment, the communications subsection 275 comprises four serial ports 208, a local area network (LAN) interface 205, a modem circuit, and the associated interface electronics. The communications subsection 275 also includes ports for connecting a telephone or telephone handset 218 to the terminal 35 in order to facilitate voice communications.

The signature capture printer 38 is connected by a cable 145 to one of the serial ports 208 (preferably the PRINTER port) that is operatively connected to the terminal's communications subsection 275. Serial data from the printer 38 is assembled and transmitted by the printer controller printed circuit board 280, located in the signature capture printer 38. The preferred signature capture printer 38 also includes a print engine 285, and signature capture circuit comprising the printer controller board 280 operating together with a digitizer printed circuit (PC) board 300.

Inasmuch as many of the functions of the preferred terminal/printer 30 are common to data card transaction terminals known in the art, for example reading data from the magnetic stripe of a data card, receiving transaction information from a keypad, displaying transaction information on a display, assembling transaction data in a memory, attempting and conducting data communications with a host computer via modem, obtaining electronic authorization from an authorization host computer system, continuing or terminating a transaction according to signals received from an authorization source, printing transaction information on a printer, etc., no further discussion of such basic operations of the preferred card transaction terminal and printer will be provided. However, to the extent required for a complete understanding of the present invention, after a general description of the circuitry, there will be a discussion of the operation of the methods carried out in the present invention.

Terminal Circuitry

Figure 7:
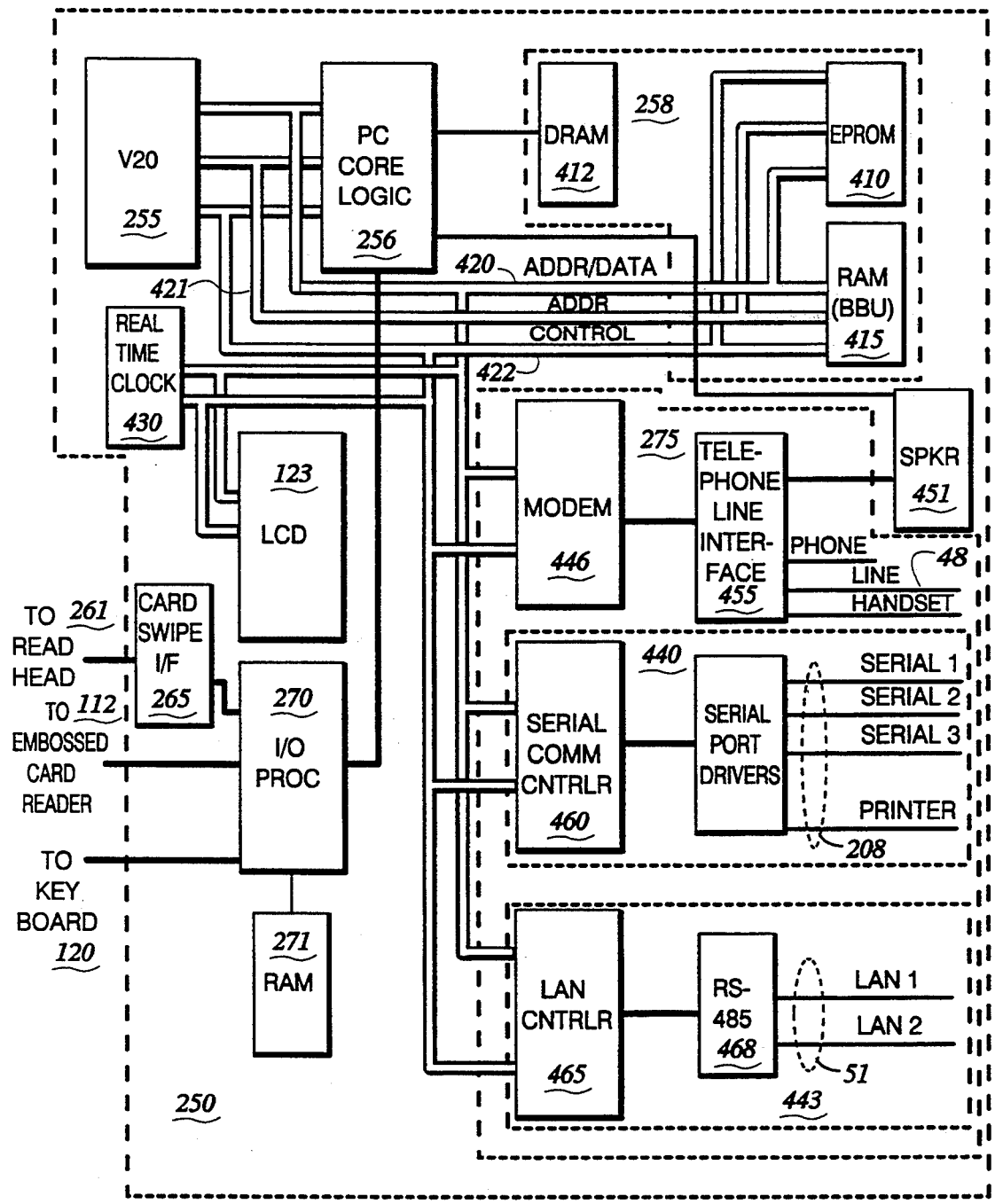
FIG. 7 is a schematic diagram of the circuitry employed in the preferred transaction terminal forming a part of the terminal/printer of FIG. 6.

FIG. 7 is a detailed schematic representation of the circuitry implemented on the preferred terminal circuit board 250. The terminal circuit board 250 is located in the terminal 35, and comprises the CPU 255, memory 258, I/O processor 270, card swipe interface circuit 265, and liquid crystal display 123. The terminal circuit board 250 is directly connected to the embossed card reader 112, the keypad 120, and the magnetic read head 261, which are also located in the preferred terminal 35.

The preferred central processing unit or CPU 255 is a type V-20 microprocessor manufactured by NEC Electronics, Mountain View, Calif. Details of the preferred microprocessor are available in the literature supplied by the manufacturer.

In addition to the microprocessor 255, terminal circuit board 250 includes a PC core logic circuit 256. The PC core logic circuit 256 is a type 82C100 manufactured by Chips and Technologies, San Jose, Calif. Those skilled in the art will understand that the PC core logic circuit 256 provides the signals that are required in order for the preferred terminal 35 to operate as an MS-DOS-compatible computer system. Details of the PC core logic circuit 256 are available in the literature supplied by the manufacturer.

The memory 258 on the terminal circuit board 250 comprises an erasable programmable read only memory (EPROM) 410, a dynamic random access memory (DRAM) 412, and a battery backed-up random access memory 415. The central processing unit 255 is connected to the EPROM 410 and the battery backed-up random access memory 415 memory 258 by an address-/data bus 420, an address bus 421, and a control bus 422. The DRAM 412 is connected directly to the PC core logic circuit 256.

The address/data bus 420, address bus 421, and control bus 422 are operative for conducting address signals, data signals, and control signals from the preferred microprocessor 255 and core logic circuit 256 to the various peripheral devices connected to such buses, in the manner known to those skilled in the art and as described in the literature supplied by the manufacturer. In particular, these buses 420, 421, 422 are connected to the memory 258, communications subsection 275, and LCD 123.

The EPROM 410 is a preferably a type 27C010 manufactured by Atmel. San Jose, Calif. The EPROM 410 is operative to store the software programs that are executed by the microprocessor 255. Those skilled in the art will appreciate that the software programs stored in the EPROM include a basic input/output system (BIOS), a MS-DOS compatible disk operating system program (ROM DOS), and a boot disk emulator (ROM DISK).

The dynamic random access memory (DRAM) 412 provides memory that the microprocessor 255 uses to manipulate data and to store application-type code that is read from the battery backed up RAM 415 during the operation of the terminal. The preferred DRAM 412 comprises four 256 k×4 memory chips, type 81C4256, manufactured by Fujitsu Microelectronics of San Jose, Calif., and two 256 k×1 memory chips, type 53C256, manufactured by Hyundai Electronic Industries of Kyungki-Do, Korea. Those skilled in the art will appreciate that this configuration provides a total of memory of 512 k bytes of RAM with 1 parity bit.

Finally, the memory 258 includes battery backed-up random access memory 415 that is used to store terminal application software, terminal parameters, and transaction data in what those skilled in the art have denominated a "RAMDISK". In the preferred embodiment, the battery backed-up RAM 415 comprises two, three, or four 128 k×8 devices, type AM628128, manufactured by Hitachi America of Brisbane, Calif. The implementation herein described provides a minimum of 256 k bytes of battery backed up RAM, which may be expanded to 512 k bytes in 128 k increments.

The terminal circuitry also includes a realtime clock circuit 430 that is operative to provide the date and time signals to the microprocessor 255. The realtime clock 430 is preferably a type DS1285, manufactured by Dallas Semiconductor, Dallas, Tex., details of which are available in the literature supplied by the manufacturer.

Those skilled in the art will appreciate that the realtime clock 430 allows the terminal 35 to determine and transmit the date and time of the transactions during normal operation.

The preferred liquid crystal display (LCD) 123 is a type LBN 242F-90 manufactured by Philips Components, Slatersville, R.I., that is operative to display alphanumeric characters provided by the microprocessor 255, in a manner that may be read by the operator. Details of the operation and interface requirements for the preferred LCD 123 are available in the literature supplied by the manufacturer.

An I/O processor 270 receives input from the embossed card reader 112, the card swipe interface 265, and the keyboard 120. In the preferred embodiment, the preferred I/O processor comprises a type 80C51 eight-bit microcontroller manufactured by Intel Corporation, Santa Clara, Calif., programmed and configured for input/output functions. Details of the preferred microcontroller are available in the literature supplied by the manufacturer. The card swipe interface 265 and the embossed card reader 112 will be described in more detail in conjunction with other figures.

In particular, however, it should be understood that the I/O processor 270 includes on-board ROM for program storage and for storage of pattern data for purposes of decoding characters read by the embossed card reader 112, and is connected to external static random access memory 271 for storing character data provided by the embossed card reader. In the preferred terminal, the static RAM 271 is a type 6264, manufactured by Hitachi America, Brisbane, Calif.

Still referring to FIG. 7, the preferred communications subsection 275 includes serial port circuitry 440, a local area network interface circuit 443, and a modem circuit 446. The preferred modem circuit 446 is a 2400 baud modem comprising a type SC11011 modem controller, and a type SC11024 modem device, both manufactured by Sierra Semiconductor, San Jose, Calif. The modem circuit 446 operates in the known manner, under control of microprocessor 255, to permit the transaction terminal 35 to communicate with other computing devices, such as an authorization host or transaction processor's host, via standard dial-up telephone lines, using the telephone line out 48.

It will be understood that the preferred terminal 35 is capable of communicating with a remote host computer, an audio response unit responsive to dual tone multiple frequency (DTMF) signals, or a live operator. Thus, the preferred modem 446 is capable of transmitting data at up to 2400 baud to a remote host via line 48. In addition, the preferred modem 446 is responsive to the keyboard 120 to provide standard DTMF signals via line 48 for communication with an audio response unit. Moreover, the telephone line 48 may be switched to the handset 218 for live talk or for provision of synthetic speech to the merchant, or to a speaker 451 for provision of speech.

Thus, the preferred terminal 35 also includes an audio speaker 451. The speaker 451 is connected to a telephone line interface circuitry 455 in order to monitor call progress. It is also operative to provide beeps and other audible tones generated by the PC core logic 256 and is operative for generating audible tones to attract the attention of the terminal operator.

The preferred modem 446 connects to the telephone line out 48 via the telephone line interface circuitry 455. Those skilled in the art will appreciate that the telephone line interface circuitry 455 includes hook switch relays, isolation transformers and other known circuit components, utilized in the known manner to connect for data and voice communications to a conventional telephone line.

The preferred serial port circuitry 440 is RS-232-C compatible and is operative for driving the four serial ports 208. The serial ports 208 are controlled by two serial communications controllers 460a, 460b. The preferred serial communications controllers 460a, 460b are type 82C452 controllers, manufactured by United Microelectronics, Hsinchu City, Taiwan.

The serial communications controllers 460 receive data from the microcomputer 255 via the address/data and control buses 420, 421, 422 and operate in the known manner to convert parallel data from the microcomputer into serial data for provision via the ports 208. In addition, the serial communications controllers 460 are operative to control the baud rate, parity, number of stop bits, etc., associated with the serial data. When serial data is received from a connected serial device (for example, from the signature capture printer 38), the serial communications controllers 460 are operative to convert the serial data into parallel data and to convey that data to the microcomputer 255.

In addition to the serial communications controller 460, the serial interface 440 includes serial port drivers 462. The serial port drivers 462 comprise two type 145406 drivers, and two type 145407 drivers, both manufactured by Motorola, Schaumberg, Ill., and one type 1489 driver manufactured by National Semiconductor, Santa Clara, Calif. The serial port drivers 462 are operative to convert the signals from the serial communications controllers 460 to a voltage level compatible with the RS-232-C standard. Finally, the serial port drivers 462 are connected to four 8 pin DIN connectors comprising the serial ports 208.

Still referring to FIG. 7, the preferred terminal 35 may also be connected to a local area network (LAN) 51 via a LAN interface circuit 443. The preferred LAN interface circuit 443 includes a serial controller 465 and an RS-485 driver 468. The preferred serial controller 465 is a type 16C450/16C550 Universal Asynchronous Receiver/Transmitter (UART) manufactured by Texas Instruments, Dallas, Tex. The serial controller 465 is connected to the RS-485 driver 468, preferably a type DS75176, manufactured by National Semiconductor, Santa Clara, Calif. The RS-485 driver circuit 468 is operative to convert the signals from the LAN controller 465 to a signal level compatible with the RS-485 standard.

Card Swipe Interface Circuitry

As will by now be understood, information contained on the magnetic stripe of a data card is read from the card in a transaction terminal 35 when a data card transaction is initiated. The information on the magnetic stripe 110 includes the card's account number, expiration date, and other information, in a format specified by ANSI Standard X4.16-1983. This standard is published by the American National Standards Institute, Inc., 1430 Broadway, New York, N.Y., and is incorporated herein by reference.

The information is obtained from the magnetic stripe by swiping the card through a swipe slot 103 in the transaction terminal 35 (FIG. 3) of the terminal/printer combination 30. The swipe slot 103 includes a magnetic read head 261 that is connected to the card swipe interface circuitry 265 (FIG. 6). Together, the read head and card swipe interface circuitry are operative to read signals from a swiped card's magnetic stripe, and to provide these signals for interpretation by the CPU 255.

Figure 8:
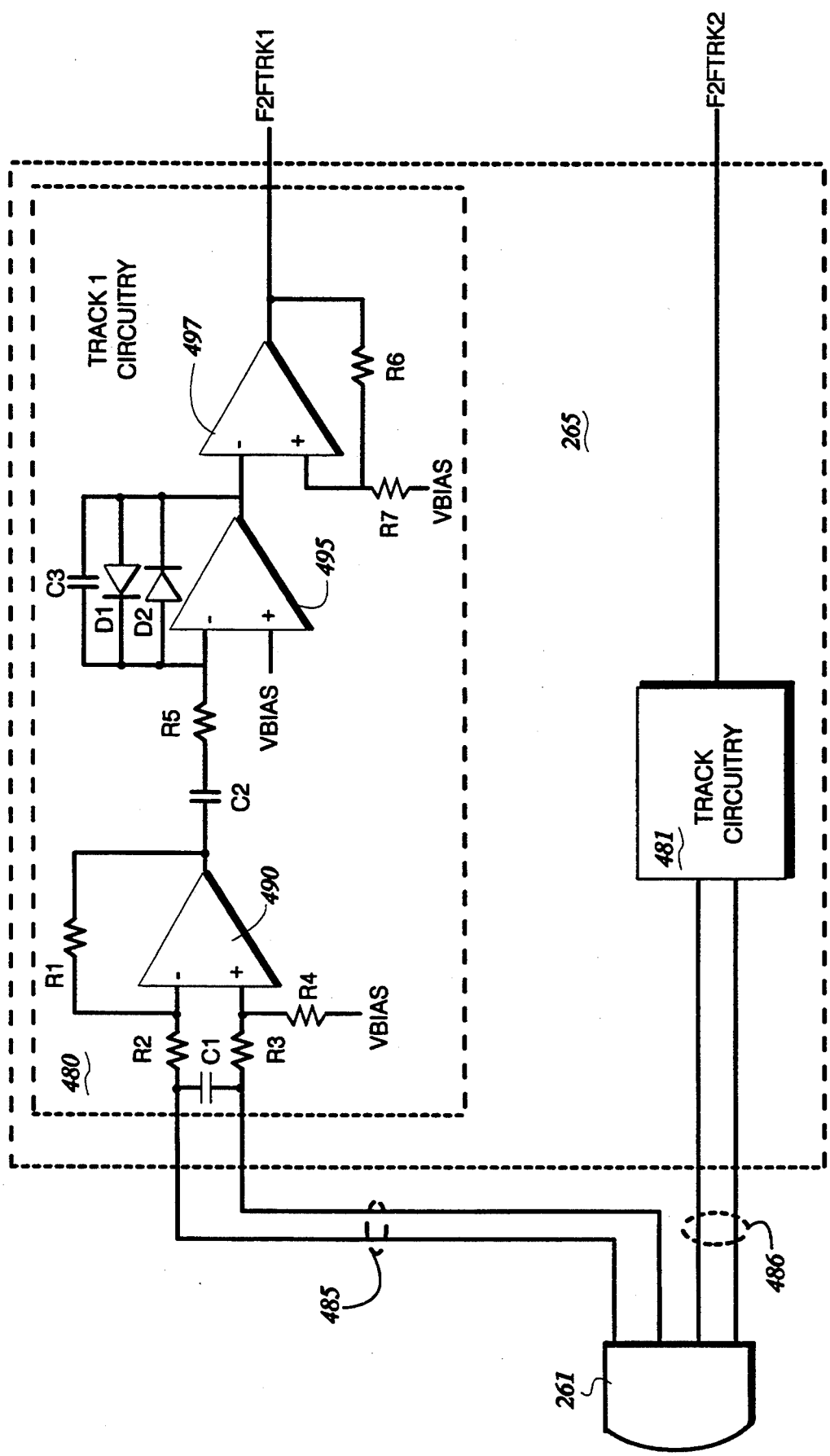
FIG. 8 is a schematic diagram of the card swipe interface circuitry employed in the preferred transaction terminal of FIG. 6.

Turning now to FIG. 8, the preferred card swipe interface circuit 265 comprises a Track 1 circuit 480 and a Track 2 circuit 481, and is connected to a magnetic read head 261. The preferred read head 261 is configured to read the data recorded on both track 1 and track 2 of the magnetic stripe on a data card simultaneously. The signal corresponding to track 1 data is provided on a first pair of terminals 485, and the signal corresponding to track 2 data is provided on a second pair of terminals 486.

The first pair of terminals 485 is connected to a Track 1 circuit 480, which provides an output signal F2FTRK1 to the I/O processor 270. The second pair of terminals 486 is connected to a Track 2 circuit 481 which provides an output signal F2FTRK2 to the I/O processor 270 (FIG. 6). Since the Track 1 circuit 480 and Track 2 circuit 481 are substantially identical, only the Track 1 circuit 480 will be described in detail.

As shown in FIG. 8, the Track 1 circuit 480 is connected to the read head 261, and is operative to condition signals generated by movement of a magnetic card stripe past the read head 261 during a card swipe. The circuit 480 is operative to provide these signals to the I/O processor 270 as a self-clocking synchronous signal, F2FTRK1.

The preferred Track 1 circuitry 480 includes a first amplifier 490, having its inverting and non-inverting inputs connected through input resistors R2, R3, respectively, to the two terminals 485 of the read head 261. A feedback resistor R1 connected between the output of the amplifier 490 and the inverting input determines the amount of gain, together with other components, in the manner which will be understood by those skilled in the art. A bias voltage VBIAS is connected through resistor R4 to the non-inverting terminal, to bias the output voltage level of the amplifier 490.

The output of the first amplifier 490 is connected to a differentiating amplifier 495, which is operative to detect peaks in the signal received form the amplifier 490. The differentiating amplifier 495 includes a pair of diodes D1, D2 connected in opposite bias directions between the output and inverting input. The diodes, in conjunction with a capacitor C3, operate in the known manner to conduct sharply when the voltage across the output and the non-inverting input of the differentiating amplifier 495 rises to a predetermined level.

The output of the differentiating amplifier 495 is then connected to a zero crossing detector 497 that provides TTL level buffering for the signal and generates the F2FTRK1 signal at its output. Resistors R6 and R7 are connected between the output and non-inverting input of the zero crossing detector 497 in order to provide hysteresis as the voltage level changes at the input of the zero crossing detector 497.

The Track 2 circuitry 481 is substantially identical to the Track 1 circuit 480, but instead provides a self-clocking synchronous signal, F2FTRK2, to the I/O processor 270.

As discussed more fully herein, the present invention is operative under certain circumstances to read the account number information from track 2 as an alternative source of information concerning the account number, expiration date, etc. In preferred embodiments of the invention, the terminal 35 may be made operative to restore defective or erroneous information read from track 1, in whole or in part, by substituting, in whole or in part, the account number and/or expiration date, to form a complete account number that satisfies the known account number checksum operations. This operation, in addition to providing a signal indicative that a card was physically present during a transaction, ensures that a complete account number can be obtained from the card, and cross-checked against the various sources of the account number information, as further checks on the accuracy of the account number and validity of the card.

Embossed Card Reader

As has been discussed in general earlier, preferred embodiments of the transaction terminal 35 include a tactile imager operating as an embossed card reader 112, shown in FIG. 9 and FIG. 10. The embossed card reader 112 is operative to tactilely sense the raised or embossed characters on data cards and provide signals corresponding to the characters thereformed. These characters are then utilized to form an account number associated with the data card.

According to a preferred aspect of the present invention, the account number formed with the embossed card reader 112 is utilized as an electronically captured account number only when the account number cannot be obtained from reading the magnetic stripe on the card.

According to another aspect of the invention, the account number obtained from the embossed card reader may be used to restore a defective or erroneous account number, in whole or in part, by substitution of the account number, or selected characters thereof, where the magnetic stripe is damaged or is producing read errors. In yet another alternative embodiment, the data read from the embossed card reader may be used to compare against the account number obtained from the magnetic stripe as a further check on the validity of the card.

FIGS. 9A–9E are a series of partial diagrammatic end views of the preferred embossed card reader 112, illustrating the operation of insertion and reading of a card 15. The embossed card reader comprises an embossed sensor board 505 including a two-dimensional tactical imaging array 538, a control circuit 510 connected to the embossed sensor board via a zebra strip 540 (an electrical connector), a switch for detecting the insertion of a data card, a switch for detecting the completion of the read cycle, and means for moving an inserted card into operative contact with the tactile imaging array.

Figure 9A:
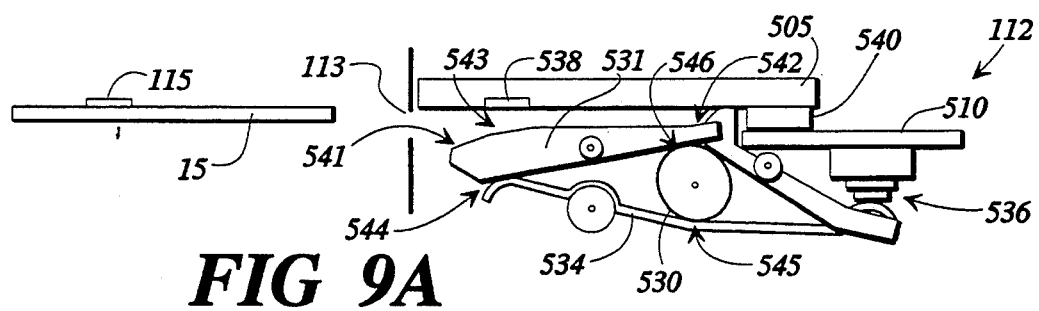

As illustrated in FIG. 9A, the means for moving the inserted card into operative contact with the tactile imaging array comprises a cam shaft 530 that releases a pressure plate 531 to be urged by a pressure spring 534 to bias an inserted card against the tactile imaging array. The pressure plate 531 is pivotably mounted and comprises an entry edge 541 for receiving the inserted card, a pressure plate actuating arm 542, and a pressure applying area 543 that corresponds to the embossed region 115 of the inserted card and is adjacent the imaging array 538. The pressure spring 534 is also pivotably mounted and comprises a pressure applying surface 544, a cam contact region 545, and a pressure spring actuating arm 536.

An inserted card is read during a read cycle, in which the cam shaft 530 completes an entire rotation. At the beginning of each cycle (i.e., before the card is inserted), the cam is in an initial position, with the lobe 546 on the cam shaft 530 is at its highest position. At this initial position of the cam, the pressure plate actuating arm 542 is held upward, so that the entry edge 541 and pressure applying area 543 are forced downward in order to facilitate insertion of the card 15 into the slot 113.

Figure 9B:
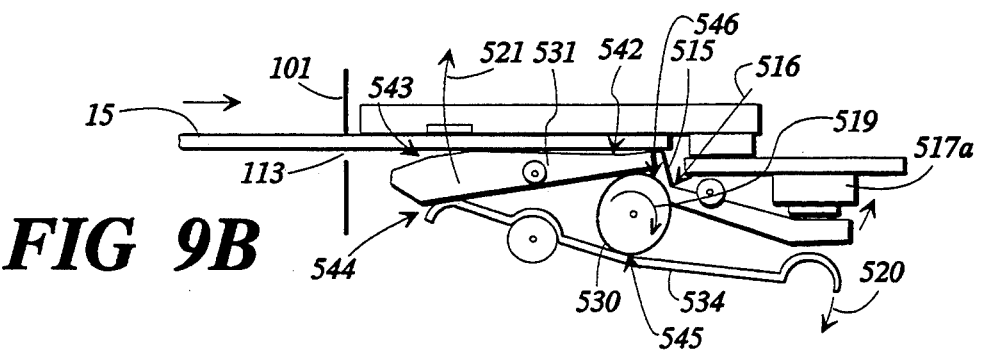

FIG. 9B illustrates the insertion of a card 15 into the slot 113 formed in the plastic terminal case 101. When a credit card 15 is completely inserted into the slot 113, it strikes a first switch actuating arm 515 positioned at the rear of the reader 112, causing it to move downwardly in the direction of arrow 516. The first switch actuating arm 515 pivots about an axis and its opposite end actuates a first switch 517a located on the control circuit 510, which produces a CARD INSERTED signal indicating that a card has been inserted into the embossed card reader.

With the card completely inserted to cause actuation of the first switch 517a, the embossed characters 115 on the card 15 are positioned in operative juxtaposition, but not contacting with, the tactile imaging array 538 on the board 505.

The CARD INSERTED signal is provided to the I/O processor 270. At that point, the I/O processor 270 causes electrical power to be applied to a drive motor 547 (not shown; see FIG. 11). The drive motor is operatively connected to the cam shaft 530 by a reduction gear train 549 (not shown; see FIG. 11 ). The action of the motor and gear train causes the cam shaft 530 to rotate in the direction of the arrow 519.

As the cam shaft 530 rotates, the lobe 546 leaves it highest position, thus rotating away from the pressure plate 531 and toward the pressure spring 534. This allows the pressure plate actuating arm 542 to fall as the pressure spring's cam contact region 545 is forced downward in the direction of the arrow 520, thus causing the pressure applying surface 544 and pressure applying area 543 to be forced upward in the direction of the arrow 521.

Figure 9C:
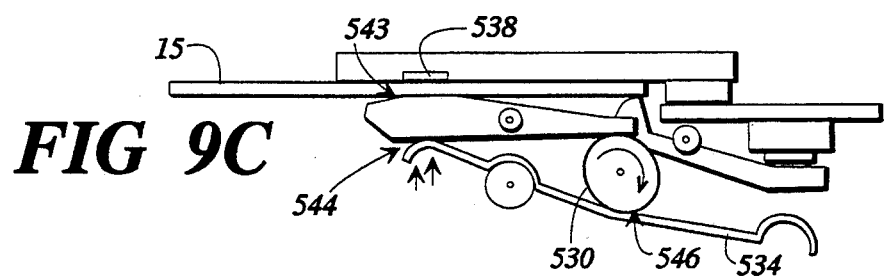

As illustrated in FIG. 9C, when the cam shaft 530 is halfway through its rotational cycle, the lobe 546 is at its lowest point, pressing against the pressure spring 534. This causes pressure applying surface of the pressure spring 534 to pivot upwardly and reach its highest point. This, in turn, biases the pressure applying area 543 of the pressure plate 531 to its maximum upward position.

At this position, shown in FIG. 9C, the embossed characters are pressed firmly into the imaging array 538. The embossed card reader 112 then is operative to sense the signals from the imaging array, in the manner described, and decode the characters associated with embossed region 115 of the card. The process of detecting and decoding the embossed characters is accomplished as the cam continues to rotate, and is completed by time the cam lobe leaves its lowest position.

Alternatively, the terminal could cause the motor 547 to stop, and the cam shaft 530 and pressure plate 531 to maintain pressure on the card until the read process is complete. At that time, the motor would be restarted and the cycle completed. Such an alternative embodiment would provide additional time for the electronics to complete the reading of the embossing, or time for repeated readings of the embossing for error checking, if desired or needed.

Figure 9D:
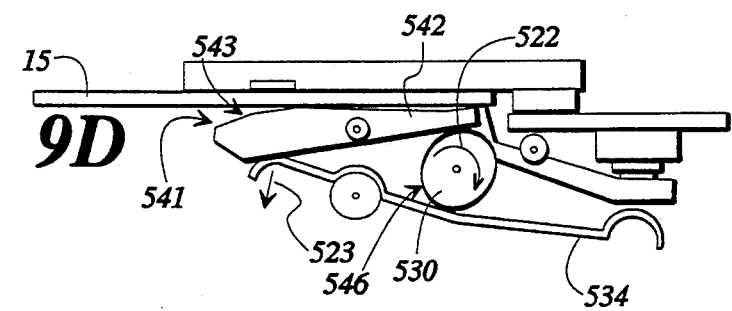

In FIG. 9D, the lobe 546 has left its lowest position and is rotating towards completion of a reading cycle. As the cam 530 rotates in the position of the arrow 522, the pressure plate actuating arm 542 is now driven upward back toward its initial position, forcing the entry edge 541 and pressure applying area 543 of the pressure plate 531 downward in the direction of the arrow 523, for release of the card.

Figure 9E:
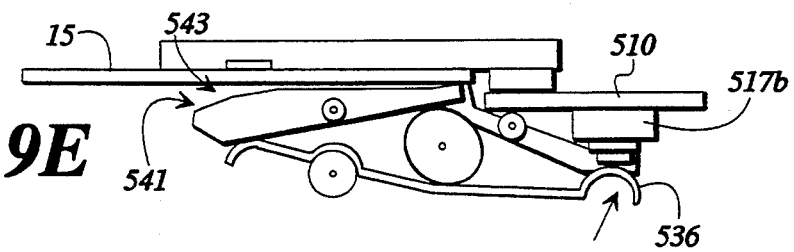

The final portion of the embossed character read cycle is illustrated in FIG. 9E. The read cycle is complete when the entry area 541 and pressure applying area 543 have returned to their initial, downward position. At this point, the cam shaft has completed one revolution, allowing the pressure spring actuating arm 536 to actuate a second switch 517b associated with the control circuit 510. The actuation of the second switch 517b produces a CYCLE COMPLETE signal to the I/O processor 270, which then causes power to be removed from the drive motor 547. Once the entry edge 541 and pressure applying area 543 have returned to their original position, the card 15 may be easily removed from the slot 113.

FIG. 10 illustrates the circuitry incorporated into the embossed card reader 112. As described earlier, the embossed card reader 112 comprises an embossed sensor board 505 and an embossed reader electronics board 510. The preferred sensor board 505 mounts a two-dimensional silicon imaging array 538 and is connected to the electronics board 510 by means of an electrical connector known to those skilled in the art as a "zebra strip" 540. The electronics board 510 includes all of the electronic components necessary to decode data from the imaging array. Those skilled in the art will understand that the embossed sensor board 505 and electronics board 510 together operate in accordance with the silicon tactile imaging array described in U.S. Pat. No. 5,055,838 to Wise et al., the disclosure of which is incorporated herein by reference and made a part hereof. The reader should refer to U.S. Pat. No. 5,055,838 for specific information regarding the operation of the tactile imaging array 538.

Generally described, the imaging array 538 of the embossed sensor board 505 includes a plurality of elements arranged in rows and columns, to form a two dimensional array. The rows and columns are connected at each intersection by pressure sensitive capacitive elements. The capacitance of these elements varies in proportion to the amount of force applied to the sensor. Thus, those capacitive elements that come in contact with the raised surfaces of the characters formed in the embossed region 115 will display different characteristics than those elements that are adjacent to the spaces between the characters.

As is more fully described in the above referenced patent, the electronics board 510 causes each of the rows to be strobed with an electrical pulse. As each of the rows is strobed, the device detects the signal present at each of the columns. The amplitude of the output voltage pulse is proportional to the capacitance, which is in turn proportional to the local force applied. Those skilled in the art will appreciate that the process employed in the present invention is analogous to those methods known in the art by which keyboards are polled. Time signals thus detected are representative of the standard numeric characters formed in the embossed region 115 of the credit card 15, and may be decoded by the terminals I/O processor 270.

In the preferred embodiment, each intersection of a row and column in the array 538 is spaced apart by 0.5 millimeters, thereby providing a resolution of 50.8 dots per inch. It will be understood that the form of the characters in the embossed region is governed by the Farrington 7B standard, such that each character is 0.1 by 0.17 inches, and has a distinctive shape (font). The Farrington font is described in ANSI Standard X4.13-1983, which is published by the American National Standards Institute, Inc., 1430 Broadway, New York, N.Y., and is incorporated herein by reference.

After strobing all rows of the imaging array 538, there will stored in an imaging array RAM associated with the I/O processor 270 as an array of digital signals corresponding to the raised and flat areas of the data card, comprising 1680 data elements or pixels. In the preferred embodiment, these data elements are then examined utilizing a simple "pattern recognition" algorithm to determine the identity of the characters forming the account number, by comparing the data in the imaging array RAM associated with the I/O processor 270 to patterns associated with the Farrington 7B characters stored in the Farrington character pattern ROM associated with the I/O processor 270. For example, data representing a single Farrington character comprises 9 words of 8 bits each, which are compared row by row to the rows of data elements stored in the imaging array RAM. It will thus be appreciated that storage of all Farrington characters (10 numerals) only requires 90 bytes.

In the same manner, other information found in the embossed area such as expiration date, etc., can be decoded if desired.

The exploded view of FIG. 11 of the embossed card reader 112 illustrates the juxtaposition of the tactile imaging array 538 relative to the pressure plate 531. An electric motor 547 drives the reduction gears 549 that rotate the cam 530.

As best seen in FIG. 12, the first switch actuating arm 515 is operatively positioned with respect to the first switch 517a on the side of the reader 112 closest to the motor 547, while the pressure spring actuating arm 536 is operatively positioned on the opposite side of the reader 112 with respect to the second switch 517b.

Method for Decoding Embossed Characters

FIG. 14 illustrates the imaging array 538 and exemplary embossed Farrington characters 550a, 550b. In the preferred embodiment of the present invention, the imaging array 538 measures 6 millimeters × 70 millimeters and has a resolution of 0.5 millimeters. Thus, the preferred array measures 12 × 140 data elements or pixels 552, and has a total of 1,680 elements or pixels. An embossed Farrington character 550 on a typical data card will fit within a 5 × 9 pixel array, thereby defining a character cell 551. Thus, it will be appreciated that the pattern data defining a data card Farrington character requires 45 bits of information.

As can be seen in FIG. 14, if a typical character is 9 pixels high, and given that the preferred array is 12 pixels high, there is tolerance for movement of the embossing on the data card of ±3 pixels with respect to the imaging array 538.

Once a data card 15 is read by the embossed card reader 112, the 45 bits of data representative of the embossed region 115 are temporarily stored in random access memory associated with the I/O processor 270 until a complete account number is formed and provided to CPU 255.

Turning now to FIG. 15, a method 553 by which the data representative of the embossed characters is decoded will be described. The preferred embossed character decode method 553 is implemented as software for the I/O processor 270, and begins at step 554, when the imaging array 538 is scanned and 1,680 bits of digital data representative of the embossed character region 115 of the card 15 is formed. Once this data is formed, it is temporarily stored in the random access memory provided in the I/O processor 270.

At step 555, the I/O processor 270 scans the data representative of the embossed characters and locates the pixel that forms the upper/left corner of the first character, such as the corner 556 in FIG. 14. Once this corner 556 is located, the method advances to step 557, whereupon a character cell 551 is defined about the first character. Those skilled in the art will understand that the upper left corner of the 9×5 character cell 551a will coincide with the upper left corner of the character 550a, and this defines the top and bottom, and left and right boundaries of the cell 551.

At step 559, the I/O processor 270 begins the process of decoding the character contained within the cell 551. In the preferred embodiment of the present invention, this is accomplished by comparing the 45 bits of data in the cell 551 with pattern data or reference characters representative of each of the Farrington characters that is stored in a portion of the read only memory provided in the I/O processor 270.

Generally described, the step of comparing the character read by the imaging array with the reference characters involves comparing the pixels 552 that form the character read from the card with the pixels that would form each of ten reference characters, the numerals 0 through 9. The preferred comparison step comprises performing a logical exclusive-OR operation upon each of the 45 bits of the cell 551 with the corresponding 45 bits of each of numeral stored in ROM. The number of matches is then added up to obtain a comparison count. A "match" is deemed to have occurred if there is a complete correspondence between each bit in the cell 551 and each bit in the pattern stored in ROM.

However, it will be appreciated that the characters may also be decoded by deeming a "match" to occur for the particular character that produces the greatest number in the comparison count. Moreover, it will be appreciated that a "match" could be deemed to occur if a comparison count for a particular character exceeds a selectable predetermined threshold, or if the comparison count exceeds the next closest comparison count by a predetermined amount. Those skilled in the art will appreciate that a selectable threshold may be established for the number of matches required to identify the character in question. This threshold may be adjusted according to a desired tolerance.

It should also be understood that the threshold of the number of matches also determines whether the characters read from the card are "acceptable", that is, generally within the specifications prescribed for embossed characters on data cards. Those skilled in the art will appreciate that the embossed characters on a credit card comply with the Farrington 7B standard. However, the resolution of the disclosed embossed card reader 112 does not allow determination whether the characters of the embossing are within the precision set forth in the Farrington 7B standard. Nonetheless, this resolution is sufficient to permit determination as to whether the characters are grossly out of proportion, size, alignment, spacing, etc., and can detect badly worn cards or certain fraudulent cards. Thus, the determination of whether the embossed characters are "acceptable" will vary with the resolution of the embossed card reader and the degree to which the transaction processor decides to set parameters of acceptability.

For purposes of the present invention, characters may be deemed acceptable if the size and spacing of the characters is within the tolerance of the tactile imager, that is, about 0.5 millimeters, and/or the comparison count exceeds a predetermined threshold which is empirically determined.

Once the character is decoded at step 559, the method proceeds to step 561. At this step, the character that was decoded in step 559 is temporarily stored in the I/O processor's memory. At step 563, the I/O processor 270 determines whether the last character decoded represents the end of the character array 538. If not, the method returns to step 555 whereupon the character cell 551b (FIG. 14) is moved to the position of the next character. This may be accomplished by simply repositioning the character cell at a new position a fixed number of pixels away from the original position due to the fact that the Farrington standard specifies a predetermined spatial separation between characters. Once the next character cell is established at step 565, the method repeats the step 559 and decodes the next character.

If at step 563 the I/O processor 270 determines that the last character decoded represented the end of the embossed character region 115 of the card, the method advances to step 567, whereupon the I/O processor 270 assembles each of the individual characters decoded to form an account number, and provides this number to the terminal's main CPU 255 for subsequent use.

Signature Capture Printer

The preferred signature capture printer 38, as discussed above, is operative for printing a receipt of a transaction conducted with the combination terminal/printer 30, capturing the signature of the cardholder as a plurality of digital signature signals corresponding to the (X,Y) coordinates of the stylus 165 relative to a signature window 160, compressing the signature signals to provide compressed signature signals, and transmitting the compressed signature signals to the terminal 35 so that the signature signals can be associated with other transaction data and transmitted to the transaction processor host.

It should be understood, however, that while the signature capture printer 38 is especially suited for operation in combination with the terminal 35 to perform certain methods for chargeback protection in accordance with methods disclosed herein, the signature capture printer may be considered a "stand alone" item that can be connected to other types of data transaction terminals, as well as other data communications and processing devices such as personal computers, for providing printing and/or signature capturing functions.

Mechanical Construction of Signature Capture Printer

Referring now to FIG. 16 and FIG. 17, the preferred signature capture printer 38 comprises a print engine 285 for printing a paper receipt 152 of a transaction, a signature capturing window 160 in which a cardholder's signature is impressed, a tethered stylus 165 to be used by a cardholder in signing his or her name in the signature window in connection with the transaction, a signature capturing circuit 280, 300 for obtaining signature signals corresponding to the cardholder's signature from the signature capturing window, means for compressing the signature signals to obtain compressed signature signals, and means for transmitting the compressed signature signal to an external source (such as the terminal 35 or other utilization means).

A paper roll 570 in the signature capture printer 38 is stored in a covered rear housing 571 of the printer. Paper from the paper roll is fed along a paper path 575 into a print engine 285. The preferred print engine 285 is a model M-267 dot matrix printer manufactured by Epson America, Inc., Torrance,-Calif.

As the print engine 285 prints on the paper, the paper is fed out of the print engine 285 and up through the paper slot 155 that is formed in the top of the printer case 150. As the paper emerges from the paper slot 155, it rests on the top surface of the cover 150 and the signature capture window 160.

The printer controller board 280 is positioned in the bottom interior of the printer 38. The printer controller board controls the operation of the printer, including the print engine 285 and paper feed mechanism (not shown).

In addition, the printer controller board 280 includes circuitry in the form of a programmed microcomputer that receives digital values for the X and Y coordinates in the form of STYLUS POSITION signals corresponding to the signature from a digitizer printed circuit board 300 and compresses these signals to obtain compressed signature signals. This signature capture circuitry compresses the digital X-Y coordinate signals with a compression algorithm before the signature data is transmitted to the transaction terminal 35 or other utilization means.

The printer controller board 280 also controls the transfer of the compressed signature signals to, and printer commands from, the preferred terminal 35.

Printer Controller and Signature Digitizer Printed Circuit Boards

Turning now to FIG. 18, the printer controller circuit board 280 and digitizer printed circuit board 300 will be described. As discussed earlier, the printer controller board 280 is electrically connected to the terminal 35, print engine 285, and digitizer PC board 300. In particular, the printer controller board and digitizer PC board 300 comprise a signature capture means implemented as a circuit and software. Generally described, the printer controller board 280 is operative to receive serial data and control signals from the terminal 35 and the digitizer PC board 300 and to transmit serial data and control signals to the terminal 35 and print engine 285.

The printer controller board 280 comprises a printer central processing unit (CPU) 580 and associated memory 581. The preferred printer CPU 580 is a type 80C52, manufactured by Signetics, Sunnyvale, Calif. Those skilled in the art will appreciate that the printer controller function itself is implemented in software that is stored in the printer CPU's integrated read-only memory (ROM). The printer controller board 280 also includes random access memory (RAM) 581. The printer RAM is used to temporarily store data as it is manipulated by the printer CPU 580, or as it is transferred between the printer controller board and other devices. The preferred printer RAM 581 provides 32K bytes of storage, and is a type 58256, manufactured by Hitachi America, Brisbane, Calif.

In the preferred printer controller board 280, the printer CPU 580 is connected to the terminal via a serial interface 585. The serial interface 585 comprises a serial communications device and an RS-232 compatible buffer. The serial communications device operates in the known manner to convert serial data into parallel data, and vice versa. The preferred serial communications device is a type 82C50 serial communications controller, manufactured by VLSI, Tempe, Ariz. The preferred RS-232 buffer is a type MAX 232, manufactured by MAXIM, Sunnyvale, Calif.

The printer controller board 280 is connected to the digitizer PC board 300 by means of a simple serial data connection. Buffered serial data from the digitizer PC board 300 is fed directly into the printer CPU 580. This serial signature data, comprising a signature signal, is in the form of (X,Y) coordinate pairs representative of the signature provided by the cardholder. This data is then compressed by the printer controller board 280 before it is transmitted to the terminal 35. The compression algorithm utilized by the printer controller board is described in greater detail below.

Finally, the printer controller board 280 is operative to control the print engine 285. The data that is to be printed on the receipt by the print head is transferred from the printer CPU 580 to the print engine 285. Inasmuch as those skilled in the art will understand that the print engine 285 is operated in the manner of dot matrix printers known in the art, the details of its operation will be omitted.

Turning now to FIGS. 19 and 20, the digitizer PC board 300 will be described. The digitizer PC board 300 is operative in conjunction with and in response to a magnetic/ink stylus 165, connected via a stylus cord 167. The digitizer printed circuit board 300 includes an X- and Y- grid 601, 602, a digitizer central processing unit 610, and analog circuitry 612 to amplify and condition the signals received from the stylus 165.

The digitizer PC board 300 and stylus 165 operates in the manner described in U.S. Pat. No. 3,873,770 to Ioannou, which is incorporated herein by reference and made a part hereof, and provides data corresponding to the (X,Y) coordinate pairs that are representative of the signature provided by the cardholder. The preferred digitizer comprises 11 horizontal wires and 21 vertical wires on the top surface, called grid wires. When any one of these grid wires is pulsed, the wire transmits electromagnetic energy to the space above it. The pickup coil in the stylus captures some of this energy in a fashion similar to that of an antenna in a radio receiver. This energy is amplified and processed by a microprocessor or CPU 610 associated with the digitizer PC board 300. The microprocessor is programmed to pulse a grid wire and then listen for a response from the stylus. It pulses each wire in rapid sequence and stores each response from the stylus in a memory array corresponding to the coordinates of the window. By interpreting the stored data and performing mathematical calculations on it, the microprocessor can pin point the location of the stylus to a resolution better than 0.004 inches.

A pressure sensitive switch within the stylus 165 (not illustrated) generates a CONTACT signal on line 615 to the digitizer CPU 610 that indicates the stylus is in contact with the paper. This CONTACT signal is asserted when the stylus comes into contact with the signature capture window 160 (and may be considered a stroke started signal) and is negated when the stylus is lifted from the window (and may then be considered a stroke completed signal).

The elements of the X and Y grids 601, 602 are energized in a sequential manner as the stylus is used to sign the receipt. As the stylus is used in the vicinity of the energized grids, an electric current is induced in the magnetic coil in the stylus. This signal is carried back to the digitizer printed circuit board 300 and is amplified and conditioned by the analog electronics 612. The conditioned signal is then supplied to the digitizer CPU 610, which is operative to derive X and Y coordinate data from the induced signal.

Once the digitizer CPU 610 creates the signature signals representative of the signature, the digitizer PC board 300 transmits the data to the printer controller board 280 in the form of (X,Y) coordinate pairs, at predetermined sample times. The printer controller board 280 is thereafter operative to compress the signature signals to form compressed signature signals before they are transmitted to the transaction terminal 35 via the serial data link 145 from the signature capture printer 38.

Details of the preferred method of compressing the signature signals to form compressed signature signals are provided in greater detail below. Those skilled in the art will appreciate that the process of compressing the data reduces the amount of memory required to store the signature and thus facilitates more efficient use of the terminal hardware.

Signature Window of Signature Capture Printer

Referring for a moment to FIG. 16, the relationship between the top part of the plastic cover 150, the receipt paper 152, and the digitizer printed circuit board 300 will be described. As discussed earlier, the receipt paper 152 emerges from the printer through the paper slot 155 after it is printed on by the print engine contained internally to the signature capture printer 38. As the paper emerges from the paper slot 155, it is directed upward so that it lies flat on the top portion of the plastic cover 150.

Turning now to FIG. 19, the signature capture window 160 is located just above the paper slot 155. The printer will advance the paper 152 until a printed signature line 625 is positioned directly above the signature capture window 160. At that point, the cardholder will be instructed to sign the receipt paper 152 with the magnetic/ink stylus 165. The signature capture window 160 is positioned immediately above the digitizer printed circuit (PC) board 300 that translates movement of the stylus 165 into digital signals indicative of the X-Y position of the stylus relative to the window, where X is the elongate dimension of the window and Y is the height of the window.

In the preferred embodiment, the digitizer printed circuit board 300 is a six layer printed circuit board comprising an X-Y coordinate grid. An X-grid 601 is formed on a first layer of the digitizer printed circuit board 300. A Y-grid 602 is formed on a second layer of the digitizer printed circuit board 300. As the elements of the X- and Y-grids are selectively energized, electromagnetic fields are established. The magnetic coil in the stylus 165 acts as an antenna and detects these electromagnetic fields as the cardholder uses it to sign the receipt. The electrical currents induced in the coil by the electromagnetic fields provide signals from which the position of the stylus can be derived.

Two shield layers 630, 631 form the third and fourth layers of the digitizer printed circuit board 300. The shield layers 630, 631 are provided in order to isolate the electronic components mounted on the bottom surface 635 of the circuit board from the electromagnetic fields that are induced by the X- and Y-grids 601, 602, which form the first and second layers of the digitizer printed circuit board 300. As was described above, these fields are intentionally induced in order to be detected by the stylus as it is used by the cardholder to sign the receipt 152.

A trace layer 638 is formed on the fifth layer of the digitizer printed circuit board 300. The electrical traces etched on the trace layer 638 provide electrical connections between the X grid 300, the Y grid 602, and the components layer 635. Finally, the component layer or surface 635 is formed on the bottom surface of the digitizer printed circuit board 300. The component layer 635 provides a surface upon which to mount all of the analog and digital electronic components necessary to detect and digitize the analog signal induced in the magnetic/ink stylus as the X- and Y-grids 601, 602 are energized. The output of the signature capture circuit board 300, from the board 300, in the form of X-Y coordinate pairs, are provided in the form of digital STYLUS POSITION signals that are compressed, stored, and transmitted in the manner described herein.

Method for Compressing and Decompressing Signature Signals

Turning now to FIGS. 20-24, the method by which the signature signals are compressed and decompressed by the signature capture circuit will be described. FIG. 16 generally illustrates the boundaries of the preferred signature capture window 160, which is positioned over the X- and Y-grids 601, 602 that are formed on the digitizer printed circuit board 300. As described above, the X- and Y-grids are formed on the top two layers of the digitizer printer circuit board 300 and are operative to emit an electromagnetic pulse which is detected by the magnetic/ink stylus 165, as it is used to sign the receipt. As the magnetic field is detected, the digitizer printed circuit board 300 produces serial data corresponding to the (X,Y) coordinates of the cardholder's signature.

In the preferred embodiment of the present invention, the resolution of the X- and Y-grids is 300 dots per inch (dpi). Inasmuch as the preferred signature capture window 160 measures 2.75 inches by 1 inch, there are 825 pixels arranged in the X direction, and 360 pixels arranged in the Y direction. This arrangement is illustrated in FIG. 16.

As described above, the digitizer printer circuit board 300 provides serial data representative of the signature in the form of (X,Y) coordinate pairs, at predetermined sample times, every 10 milliseconds in the preferred embodiment. Generally, a signature is made up of a number of strokes. Each stroke is measured from the time the stylus 165 comes in contact with the paper to the time the stylus is removed. This is determined by the pressure sensitive switch in the stylus and the CONTACT signal 615 that is provided to the digitizer CPU 610.

Once the pressure sensitive switch in the stylus indicates that the cardholder has began a new stroke, the digitizer printer circuit board 300 provides an (X,Y) coordinate representative of the starting location of the stylus, and subsequently provides additional (X,Y) coordinates at predetermined intervals or sample times until the stroke is completed. This process is repeated for each stroke until the signature is complete.

Those skilled in the art will understand that the amount of data used to represent the cardholder's signature directly affects the amount of memory required to store the data related to each transaction, and the time required to transmit the data from the transaction terminal 35 to the transaction processor's host computer 40. The present inventors believe that the amount of memory required to store the signature data can be significantly reduced by storing each stroke as a starting coordinate and data indicating the change from each coordinate to the next. Thus, small changes between two coordinates may be represented by fewer bits than large changes between two coordinates.

FIG. 21 illustrates the format that is employed by the present invention to store the data representative of a cardholder's signature. The compressed data for each digitized signature comprises (1) the number of strokes in the signature, and (2) data associated with each stroke. The data pertaining to each stroke specifies the stroke's point of origin in relation to both the X- and Y-grids 601, 602, the number of (X,Y) pairs required to describe the stroke, and the (X,Y) pairs themselves. Each of the (X,Y) pairs indicates the distance and direction from the last coordinate in the signature to the current coordinate. Each of the elements of the compressed signature data is described below:

| | | |
|---|---|---|
| LSB | 651 | Least significant byte of 16 bit value indicating number of strokes in signature. |
| MSB | 652 | Most significant byte of 16 bit value indicating number of strokes in signature. |
| STROKE 0 | 655a | Data describing the first of n strokes that make up signature (see Stroke n Format, below). |
| STROKE 1 | 655b | Data describing the second of n strokes that make up signature (see Stroke n Format, below). |
| . | | |
| . | | |
| STROKE n | 655n | Data describing the last of n strokes that make up signature (see Stroke n Format, below). |
| Stroke n Format | | |
| XLSB | 661 | Least significant byte of offset from origin in X direction. |
| XMSB | 662 | Most significant byte of offset from origin in X direction. |
| YLSB | 671 | Least significant byte of offset from origin in Y direction. |
| YMSB | 672 | Most significant byte of offset from origin in Y direction. |
| COUNT LSB | 681 | Least significant byte of number of (X, Y) pairs in stroke. |
| COUNT MSB | 682 | Most significant byte of number of (X, Y) pairs in stroke. |
| (X, Y) PAIRS | 690 | Pairs of data related to each of the successive coordinates required to represent stroke; a value 691 relating to the X-coordinate appears first, and is followed by a value 692 pertaining to the Y-coordinate. |

In order to reduce the amount of data required to store each signature, the (X,Y) PAIRS 690 will include data in one of four formats, depending on the magnitude of the change between the previous point and the current point. Each of the four formats comprises a two-bit "type" code or identifier, followed by a string of bits corresponding to the type of change.

When there is no change in either the X- or Y-direction, the value 691, 692 of the (X,Y) PAIR 690 pertaining to that direction will be represented by two bits, which indicate a "no change" type identifier. If the change in either the X- or Y-coordinate is only 1 pixel, the data will be represented by three bits—two bits indicate a "one pixel" change type identifier, with one bit indicating the direction of the change, plus or minus. Larger changes between two coordinates will be stored in formats requiring six or nine bits. Thus, it will be understood that the data represented by the (X,Y) PAIRS 690 will be 2, 3, 6, or 9 bits long, and will cross byte (i.e., 8-bit) boundaries. Each of the four formats or types is described below in TABLE I:

TABLE I

| | |
|---|---|
| 00 | No change from the previous coordinate. |
| 01S | A change of +/− 1 pixel from the previous coordinate; S = 0 if positive; S = 1 if negative. |
| 10SXXX | A change of +2 to +9 or −2 to −9 pixels; S = 0 if positive; S = 1 if negative; (XXX + 2) = change from previous coordinate. |
| 11SXXXXXX | A change of +10 to +73 or −10 to −73; S = 0 if positive; S = 1 if negative; (XXXXXX + 10) = change from previous coordinate |

Once the signature data is encoded in the above-described compressed format by the printer CPU 580, it is transmitted to the terminal 35 as serial data. At that point, the signature data is used to process the proposed credit transaction along with the other data collected by the terminal. In the preferred system 25 (illustrated in FIG. 2), the signature data (compressed signature signals) are stored by the merchant's transaction processor 12.

Method for Compressing Signature Signals

Turning now to FIG. 22, a signature compression method 710 will be described. The signature compression method 710 in the preferred embodiment is implemented as computer software for the printer CPU 580 in the printer controller board 280 (FIG. 18), in response to receipt of STYLUS POSITION signals from the digitizer printed circuit board 300. Each of such signals consists of a pair of digital values representative the X and Y coordinates of the stylus at the time the sample is obtained. In the preferred embodiment, these samples are provided every 10 milliseconds.

Once the signature compression method 710 is invoked, it is operative to receive data associated with the cardholder's signature until the signature is complete, and to provide COMPRESSED DATA 703 signals as an output. This is determined by allowing a brief period of time between strokes during which the cardholder would lift the magnetic/ink stylus 165 from the signature capturing window 160. If the stylus is not returned to the signature capturing window within a predetermined period of time, the method 710 times out and determines that the signature has been completed. At this point, the method 710 is operative to provide a compressed signature signals as COMPRESSED DATA signals 703 from the printer controller board 280. As described earlier, the compressed signature signals contain all of the compressed data required to accurately store and reproduce a cardholder's signature.

The method 710 begins at step 712, where the printer CPU 580 clears a stroke counter STRKCNTR, which is used to count the number of strokes that constitute the signature. The method 710 then proceeds to step 714, whereupon a timer STRKTMR is reset. As described more completely below, this timer times out after a predetermined period of time and therefore indicates that a signature is complete.

At step 716, the method determines whether the CONTACT signal is being asserted by the digitizer printed circuit board 300. The receipt of the CONTACT signal indicates that the magnetic/ink stylus 165 is in contact with the signature capture window 160, and that STYLUS POSITION signals will be expected at predetermined sample intervals. If, at step 716, it is determined that the stylus is in contact with the signature capture window, the method proceeds to step 718.

At step 718, a pairs counter PRCNTR is reset. This counter is used to count the number of pairs of coordinate signals required to represent each of the strokes that constitute the signature. As discussed earlier, the pair counter will be used to provide the COUNT LSB 681 and COUNT MSB 682 data.

At step 720, the stroke counter STRKCNTR is incremented to indicate a new stroke. At step 722, the first coordinate pair is received from the digitizer printed circuit board 300. At step 724, this coordinate is stored as the origin for that particular stroke. At step 726, the same coordinate pair is stored in a temporary storage location or register and labeled coordinate "A".

At step 728, a next coordinate is received. At step 730, this coordinate is stored in a temporary storage location or register "B". At step 732, the printer controller board determines whether the first coordinate "A" is the same as the second coordinate "B". Those skilled in the art will understand that, at the sampling rate of 100 samples per second, oversampling will occur and a plurality of coordinate pairs may be produced while the magnetic/ink stylus is in the same position, as when the cardholder holds the stylus against the window preparatory to signing his or her name, or pauses for some reason. If this is determined to be the case at step 732, the method returns to step 728 and receives the next coordinate. If at step 732 it is determined that the coordinate "B" is not identical to coordinate "A", the method proceeds to step 734.

At step 734, the printer CPU 580 receives the next coordinate pair from the digitizer printed circuit board 300. At step 736 this coordinate pair is stored in a temporary storage location or register "C". At step 738, the printer CPU again determines whether oversampling has occurred by determining whether the coordinate "B" is identical to the coordinate "C". If so, the method returns to step 734 and receives the next coordinate. If at step 738, the printer CPU determines that the coordinates "B" and "C" are not identical, the method proceeds to step 740.

At step 740, the method 710 is operative to further compress the data by removing data corresponding to extra coordinate pairs that may be located in horizontal or vertical lines. Generally described, the method of removing lines is accomplished by determining whether a plurality of points form a line and, if so, simply subsequently specifying the line by its end points and deleting any coordinates located in the center section of the line. Thus, at step 740 the method 710 determines whether the portion of the stroke represented by the three points "A", "B", and "C" form a vertical or horizontal line. If not, the method advances to step 742.

At step 742 the printer CPU determines the difference between the first coordinate position signal "A" and the second coordinate position signal "B", inasmuch as it has now been determined that there is a change in position of the stylus. As was described above, the data format representative of the change between the points "A" and "B" is determined by the difference between the two points. Thus, this method is operative to form the data denominated (X, Y) PAIRS 690 by determining the magnitude of the change for each coordinate X and Y for the data pair "A" and "B", and assigning the appropriate code as set forth above in TABLE I.

Once the data representative of this pair is determined, the method proceeds to step 746 whereupon the pair counter PRCNTR is incremented. At step 748 the method prepares to determine the next segment of the line by replacing the value in the "A" register with the value in the "B" register. Then at step 750 the value in the "B" register is replaced with the value in the "C" register.

At step 752, the printer CPU 580 is operative to determine whether the magnetic/ink stylus 165 remains in contact with the signature capture window 160 by monitoring the CONTACT signal and the STYLUS POSITION signals. If at step 752, the printer controller board determines that the stylus is still in contact with the signature capture window, the method returns to step 734 and receives the next coordinate.

Returning now to step 740, if the printer controller board determines that the portion of the signature stroke formed by the points "A" and "C" form a line, the method advances to step 754. At this step, the compression method 710 effectively deletes the midpoint in the line and replaces it with the current end point by replacing the value in the register "B" with the value stored in register "C".

If at step 752, the printer CPU determines that it is no longer receiving coordinate values from the digitizer printed circuit board, the method 710 finalizes and stores the data associated with the current stroke and prepares to receive coordinate values associated with any subsequent strokes.

At step 756 the method 710 determines the difference between the points represented by the current values of the registers "A" and "B". At step 758, this data is stored as (X, Y) PAIRS 690 according to TABLE I. At step 760, the method increments the counter PRCNTR. The value of the counter PRCNTR represents the number of (X, Y) PAIRS 690 required to represent that stroke.

The method then proceeds to step 762, whereupon the printer controller board is operative to provide all data associated with that stroke in the form prescribed for each stroke 655 of the compressed signature signals. At this step, the method returns to step 714 and prepares to receive any coordinate data associated with subsequent strokes. As discussed earlier in conjunction with this step, the timer STRKTMR is cleared and is therefore operative to determine whether the signature is complete. At step 716, the printer CPU determines whether the stylus has again come in contact with the signature capture window. If not, the method proceeds to step 764. If at step 764, the timer STRKTMR has not yet reached the predetermined value, the method returns to step 716. However, it at step 764 the timer has reached the predetermined value, the method proceeds to step 766.

At step 766, the printer CPU 580 has determined that the signature is complete and that data pertaining to each of the strokes that constitute the signature has been received. Thus, at step 766, the printer CPU is operative to provide the compressed signature signal as COMPRESSED DATA signals consistent with the format described hereinabove. Once this is accomplished, the method terminates.

Method for Decompressing Signature Signals to Retrieve and Reproduce Signature

It will now be understood that the compressed signature signals are associated with other transaction information and transmitted to the transaction processor's host computer system 40 when the preferred terminal communicates with the host for requesting an authorization. The host system 40 stores the transaction information and compressed signature signals for later use and retrieval in the data storage facility 64.

Should it become necessary for the transaction processor to provide a facsimile of the cardholder's signature, the signature may be reconstructed by decompressing the signature data and thereby reversing the process described above. Those skilled in the art will understand that the process of decompressing the compressed signature data comprises steps similar to those employed for compressing the signature signals, except that the steps are taken in the reverse order. Thus, each stroke of the signature will be drawn by starting at an offset from the origin as represented by the data XLSB 661, XMSB 662, YLSB 671, YMSB 672 (FIG. 21), and providing the subsequent points as represented by the data COUNT LSB 681, COUNT MSB 682, and (X,Y) PAIRS 690. Each stroke is re-drawn in this manner until the facsimile of the desired signature is complete.

As an aid to understanding the method carried out in the present invention for compressing and decompressing the signature signals, refer now to FIGS. 23A–D for an illustrative example. FIG. 23A illustrates the signature capture window 160 with two exemplary strokes 655a, 655b superimposed thereon. The beginning and ending of each segment of the strokes 655a, 655b corresponds to the points labeled P1 through P5, and P6 through P11, respectively. A string of hexadecimal-coded COMPRESSED DATA 703 represents the two strokes 655a, 655b after the two-stroke "signature" in the window 160 has been subjected to the preferred signature compression method. The data values 651,652 (0200H, least significant byte first) represent the number of strokes in the "signature" (which is two), as per FIG. 21, while the data values 661, 662, 671, 672, 681, 682 and 690 represent the other data parameters discussed in connection with FIG. 21, with the (X, Y) pairs for the two strokes represented by 690a and 690b.

FIGS. 23C–D also illustrate the binary equivalent values 707a,707b corresponding to the hexadecimal compressed data 690a and 690b, representative of the two strokes 655a, 655b after they have been compressed according to the method described above.

Turning now to FIG. 24, the method 800 by which the preferred system decompresses the compressed signature data will be described. This method will be described in the context of the strokes 655a, 655b and corresponding compressed data string 703, 707 appearing in FIGS. 23C–D. It will be understood that the steps of the method for decompression are preferably carried out as steps of a computer program 42 for the host computer 40 of a transaction processor 12 in the preferred data card transaction system 25 (see FIG. 2), inasmuch as signature decompression and reproduction will most often take place at a transaction processor when it is necessary to extract a signature associated with a given transaction. Thus, for purposes of discussing FIG. 23, it will be assumed that the decompression is taking place at a decompressor 42, which will typically will be a host computer 40 of a transaction processor.

The method begins at step 802 in FIG. 24. As an initial step, the decompressor 42 determines the number of strokes that make up the facsimile of the cardholder's signature. This is accomplished by reading the values LSB 651 and MSB 652 from the data string 703 of FIG. 23B. In the example, the first four hex characters 651, 652 indicate that the number of strokes is 02 00 (hex, LSB first). Once the number of strokes included in the signature is determined, the method proceeds to step 805.

At step 805, the decompressor 42 clears a stroke counter STRKCNTR and proceeds to step 807. At this step, the decompressor 42 reads the first data segment 655a associated with the first stroke, STROKE 0. The first data element recorded for each stroke is an X offset, which is represented by the variables XLSB 661 and XMSB 662. Together, these variables prescribe the offset from the X origin. In the example, the next four hex characters 661, 662 indicate that the first coordinate is located at a point 0A00 (hex, LSB first) pixels from the X origin. At step 810, the decompressor 42 reads the values that specify a Y offset, YLSB 671 and YMSB 672. The data of the example 655a places the first coordinate at a point 0001 (hex, LSB first) from the Y origin. Once the starting origin for the initial stroke STROKE 0 is determined, the method proceeds to step 812.

At step 812, the decompressor 42 looks to the variables COUNT LSB 681 and COUNT MSB 682 to determine the number of (X,Y) pairs that are stored to represent that particular stroke. The hex characters 681,682 of the example in FIG. 23B indicate that there are 0400 (hex, LSB first) pairs of (X,Y) coordinates associated with the first stroke 655a. Once the number of pairs is determined, the method proceeds to step 815 and moves to the initial stroke's origin point as determined at steps 807, 810. In FIG. 23, the first coordinate of the stroke 655a is at the point labeled P1.

At step 817, the decompressor 42 clears a pair counter PRCNTR, and proceeds to step 820, where the decompressor reads the first (X,Y) pair 690a. Once the (X,Y) pair is read, the method is operative at step 822 to cause a line to be drawn between the starting point P1 and the point represented by the (X,Y) pair, which is P2. In the example, the X element 691 of the (X,Y) pair 690 is 00, thus indicating that there is no change in the X coordinate. The Y element 692 is 011, indicating that the second coordinate is (−1) from the first coordinate. Thus, the second point, which is labeled P2 in FIG. 23, is directly above the first coordinate P1.

Those skilled in the art will understand that the "drawing" of the line from point P1 to P2 associated with step 822 may be on a display device such as a CRT (cathode ray tube) or other screen associated with a terminal connected to the host computer or other decompressor 42, or may be on a printer so as to obtain a hard copy of the reproduced signature.

Once a point is read and drawn, the method advances to step 825, where the counter PRCNTR is incremented. At step 827, the value of PRCNTR is compared to the number of (X,Y) pairs read from the variables COUNT LSB and COUNT MSB 681, 682. If the PRCNTR is less than the number of pairs expected, the method returns to step 820, where the decompressor 42 reads the next (X,Y) pair 690. The steps 820, 822, 825, 827 are repeated until all of the (X,Y) pairs associated with the initial stroke STROKE 0 are read and drawn. Once this is accomplished, the value of the variable PRCNTR will be equal to the number of (X,Y) pairs expected in the initial stroke STROKE 0 655a, and the decompressor 42 will branch to step 830 from step 827.

At step 830, the decompressor 42 increments the stroke counter STRKCNTR, which counts the number of strokes drawn. The incremented value of this counter STRKCNTR is tested at step 832. If the value is less than the number of strokes in the signature, the method returns to step 807, where the data associated with the next stroke, STROKE n, is read and the stroke is drawn. When, at step 832, the value of the stroke counter variable STRKCNTR equals the number of strokes expected, as represented by the data values 651, 652, the method proceeds to step 835 and terminates.

It will now be understood that there has been described a method for digitally encoding a graphic object, such as a signature, provided in the form of coordinate position signals from a graphic digitizer and for providing compressed graphic object signals, comprising first determining a number N of strokes in the graphic object, a stroke being determined by an initial starting coordinate provided in response to a stroke started signal and a final coordinate provided in response to a stroke completed signal. For each stroke of the N strokes in the graphic object, output signals are determined by receiving a first coordinate position signal corresponding to a first sample time, receiving a second coordinate position signal corresponding to a second sample time subsequent to the first sample time, and determining the difference between the first coordinate position signal and the second coordinate position signal. The COMPRESSED DATA output comprises providing an a bit digital code as the output signal if the difference is less than a first predetermined value, and providing a b bit digital code as the output signal if the difference is greater than the first predetermined value but less than a second predetermined value, where a is less than b.

The foregoing steps are repeated for a plurality of sample times, thereby providing a plurality of coordinate position signals between the initial starting coordinate and the final coordinate. The COMPRESSED DATA signals comprise the number of strokes N and the digital codes for each stroke.

More particularly, there has been described a method for digitally encoding a graphic object, such as a signature, provided in the form of coordinate position signals from a graphic digitizer and for providing compressed graphic object signals, comprising the steps of first determining the number of strokes in the graphic object, a stroke being determined by an initial starting coordinate provided in response to a stroke started signal and a final coordinate provided in response to a stroke completed signal. An X offset from the origin of a coordinate system to the initial starting coordinate of a given stroke of the graphic object is then determined. A Y offset from the origin of the coordinate system to the initial starting coordinate of the given stroke of the graphic object is then determined.

Next, the number of (X,Y) pairs in the given stroke is determined, each (X,Y) pair corresponding to a coordinate position signal provided at one of a plurality of sample times between the stroke started signal and the stroke completed signal. An X-output signal and a Y-output signal are provided corresponding to the difference between a first (X,Y) pair at a first sample time and a second (X,Y) pair at subsequent second sample time, each output signal comprising:

- an a bit code if there is no change in the respective coordinate between the first (X,Y) pair and the second (X,Y) pair;
- a b bit code if there is a change of g picture elements in the respective coordinate between the first (X,Y) pair and the second (X,Y) pair;
- a c bit code if there is a change of between g+1 and h picture elements in the respective coordinate between the first (X,Y) pair and the second (X,Y) pair; and
- a d bit code if there is a change of between h+1 and i picture elements in the respective coordinate between the first (X,Y) pair and the second (X,Y) pair.

Next, for each stroke, the X-offset, the Y-offset, a count of the number of (X,Y) pairs, the X-output signal, and the Y-output signal are provided to represent the graphic object. Preferably, $a<b<c<d$, and in the preferred embodiment $a=2$, $b=3$, $c=6$, and $d=9$, and $g=1$, $h=9$, and $i=73$.

Methods of Operation of Preferred Terminal/Printer
General Method for Operation of the Preferred Terminal—Main Program Flow It will be recalled that one of the principal objects of the present invention is to provide improved methods and apparatus for facilitating the provision of chargeback protected data card transaction services, from a transaction processor to a merchant. In the preferred embodiments, the provision of such chargeback protection services is facilitated by detecting predetermined characteristics of a given data card transaction indicative of the validity of the transaction, in particular, detection of the physical presence of a data card in connection with the given transaction. Transaction processors who utilize terminals such as the preferred terminal/printer 30 may elect to provide chargeback protection services to merchants who contract for transaction processing services, since use of the preferred terminal provides additional information concerning the data card used in connection with a transaction. This additional information, namely, information from both tracks of the data card, information from the embossing on the card, and digitized information corresponding to the signature of the cardholder in connection with a transaction, provides the transaction processor with a greater degree of confidence that a given transaction is a valid one, so that the transaction processor may elect to assume the risk of the particular transaction on behalf of a merchant.

It will therefore be understood that the present invention includes novel methods for providing chargeback protection in connection with particular data card transactions. In order to provide a transaction processor with the greatest confidence of the validity of a given transaction, it is of course preferable that all information that can be obtained from the card itself and from the cardholder be captured and electronically associated with the transaction data in a convenient, compact, and readily transmissible form. However, it will be understood that not all items of information may be required by a given transaction processor for all its transactions. For example, a transaction processor may decide to assume greater risk in connection with certain types of transactions.

Thus, for purposes of explaining the preferred modes of the present invention, the operation of the preferred terminal/printer 30 will be described in connection with obtaining information from both tracks of the magnetic stripe of a data card, information from the embossed area on the data card, authorization indicia from an authorization source, and a signature associated with the transaction. It will then be understood that these various items of information may be combined in a manner chosen by the transaction processor, in implementing chargeback protection and other services as desired.

Those skilled in the art will appreciate that in the preferred terminal 35, as in prior art terminals, the specific terminal operations are governed by a variety of parameters that are stored within the terminal, and software that is operative on the terminal. Generally, these parameters and their corresponding operations fall into two categories—those which may be changed or altered by a user (typically a merchant), and those that may be altered only by the transaction processor 12. For example, in the preferred terminal, the merchant may utilize a terminal set-up routine to control the types and format of reports that are printed regarding the merchant's transactions. In addition, the terminal allows the merchant determine greetings and other information that will be printed on the receipt.

Examples of parameters that are controlled exclusively by the transaction processor include the types of data cards that the terminal will accept, the telephone numbers that the terminal will dial to reach various transaction processor host computers, authorization sources, the ARU, etc.

Those skilled in the art will appreciate that a terminal constructed in accordance with the preferred embodiment of the present invention will include at least three unique parameters that are controlled exclusively by the transaction processor. In the preferred embodiment, these parameters are indicated by the state of certain transaction processor data items or flags stored in the terminal's memory. These flags may set remotely during a download routine for configuring the terminal for operation, or alternatively may be set "at the factory" prior to delivery of the terminal to the merchant.

The preferred transaction processor flags include a "signature capture flag" which is operative to determine whether the signature will be captured by the preferred signature capture printer 38. The transaction processor flags also include an "embossed reader flag" and a "chargeback protection flag". When set, the embossed reader flag indicates that the embossed card reader 112 of the preferred terminal 35 is activated and operable.

Likewise, the chargeback protection flag is operative to indicate that the merchant has engaged the transaction processor to provide transaction processing services that include the chargeback protection services. However, unlike the signature capture flag and the embossed data reader flag, a separate chargeback protection flag exists within the terminal for each of the credit cards that may be accepted by the terminal. Thus, it is possible for the transaction processor to provide chargeback protection to a merchant in conjunction with some specified data cards, and to provide conventional transaction processing services to the same merchant with respect to other data cards.

Those skilled in the art will understand that the terminal parameters uniquely configure the terminal. As a result, the terminal parameters, in conjunction with a specific transaction, are operative to determine the specific data that are sent to the transaction processor host computer during a credit card processing transaction. In the preferred terminal, the state of the embossed reader flag and chargeback protection flag, in conjunction with the nature of the data used to process the transaction, determine whether a "guarantee" or "transaction protected" flag is set when the transaction data is sent to the host for processing. The presence of the transaction protected flag indicates that the transaction data relates to a transaction that is chargeback protected.

In the preferred embodiment, the states of each of the aforementioned flags may be illustrated by the following TABLE II:

TABLE II

| | ERF | CPF | GUAR | |
|---|---|---|---|---|
| Group 1 | Y | Y | Y | Magnetic stripe data entry |
| | Y | Y | Y | Embossed reader data entry (when magnetic stripe reading fails) |
| Group 2 | N | Y | Y | Magnetic stripe data entry |
| | N | Y | Y | Manual data entry (when magnetic stripe data entry fails) |
| Group 3 | Y | N | N | Magnetic stripe data entry |
| | Y | N | N | Embossed reader data entry (when mag stripe fails) |
| | Y | N | N | Manual data entry (when magnetic stripe and embossed reader fail) |
| Group 4 | N | N | N | Magnetic stripe data entry |
| | N | N | N | Manual entry (when magnetic stripe data entry fails) |

ERF = Embossed Reader Flag (set or cleared by transaction processor)
CPF = Chargeback Protection Flag (set or cleared by transaction processor for each card type)
GUAR = Transaction Protected Flag, indicated transaction is guaranteed (based on ERF, CPF and type of transaction) - (set or cleared for each transaction in the terminal)

In the preferred terminal, as in terminals constructed according to the prior art, the parameters that are within the exclusive control of the transaction processor are downloaded from the transaction processor to each terminal. This may be accomplished in one of two ways; it may be accomplished before the terminal is deployed to the merchant, or the data may be downloaded from the transaction processor to the terminal via a telephone line.

From the information included in TABLE II, it should be understood that when a merchant has engaged a transaction processor to provide only conventional non-chargeback protected transaction processing services, the chargeback protection flag will be cleared (set to "N") by the transaction processor, either during configuration of the terminal or remotely during a configuration download. As a result, none of the merchant's transactions will be flagged as chargeback protected (i.e., the terminal will never set the transaction protected flag to "Y").

In the same manner, whenever a merchant has engaged a transaction processor to provide chargeback protected transaction processing services, the chargeback protection flag will be set to "Y" by the transaction processor. In order to more completely understand the present invention, a discussion of the two portions of TABLE II where the chargeback protection flag is set to "Y" is appropriate.

In the first group (Group 1), the chargeback protection flag and embossed card reader flag are both set to "Y". When this is the case, the merchant is expected to obtain the card identifying data directly from the card's magnetic stripe or embossed characters. Thus, there should be no manual entry of the card identifying information, and all of the merchant's transactions should be chargeback protected (i.e., the transaction protected flag will be set to "Y" for each of the transactions). Those skilled in the art will appreciate that mail order/telephone order (MOTO) transactions will not be chargeback protected regardless of the status of the chargeback protection flag, since a card is not present, and the data must be entered manually by the merchant.

In the second group (Group 2), the chargeback protected flag is set to "Y" and the embossed card reader flag is set to "N". In the preferred embodiment of the present invention, this status will occur only after the embossed card reader becomes inoperative, and the transaction processor has been notified of the failure. The preferred embodiment is operative to notify the merchant of a malfunction in the embossed card reader via the LCD 123, and to prompt the merchant to call the transaction processor. The transaction processor will then be apprised of the malfunction and order that a replacement embossed card reader be sent to the merchant, or take other remedial steps such as repair the embossed card reader.

The transaction processor may elect, at its option, to continue to provide chargeback protected transaction processing services to merchants in the event of a failure of the embossed card reader for the benefit of its merchants/customers, although doing so will require that the merchant enter card identifying data manually in the event the card swipe fails. This aspect of the present invention is described more completely in conjunction with FIG. 28.

It will be appreciated that the transactions shown in Groups 3 and 4 are not chargeback protected.

Turning now to FIG. 25, the preferred method 850 for the initialization and operation of the terminal will be described. This method is implemented as software for the terminal's CPU 255, and is stored in the program memory 258 associated with the terminal. Generally, the method 850 is operative to initialize the terminal 35 upon power-up and determine whether the terminal is properly configured. If not, the terminal initiates a download request. Once the terminal is properly configured, the method 850 causes the preferred terminal to enter a main loop or "idle" state from which the terminal may be instructed to execute a variety of functions.

The preferred method 850 begins at step 853 when power is applied to the terminal. At this step, the terminal determines whether it has previously received the proper parameters and application software from the transaction processor. If not, the terminal will detect that it needs to request a download and will branch to step 855. It will be recalled from earlier discussion that the terminal's memory 258 comprises read only memory (ROM) for system code storage, and random access memory (RAM) for both applications program storage and data storage, including storage of transaction data and compressed signature signals. The system code is operative to carry out the download routines, if necessary, while applications programs (which utilize the flags discussed above) are stored in battery backed up RAM.

At step 855, the terminal is operative to prompt the merchant to initialize a download request, for example by displaying a message on the LCD 123. When a download request is initiated by the merchant, by invoking a predetermined keystroke combination, the terminal dials a predetermined telephone number associated with a download host computer that is operated by the transaction processor.

Once the communication is established, the terminal sends a download request. At step 857, the terminal receives the appropriate download parameters (including the CPF and ERF, if applicable) and application software from the transaction processor. Those skilled in the art will appreciate that the download parameters sent by the transaction processor are determined according to the nature of the agreement between the merchant and the transaction processor and the services provided in connection with that agreement.

At step 860 the terminal stores the received parameters and proceeds to step 862 where the terminal enters the main program loop.

If at step 853, the terminal determines that the proper parameters are resident in the terminal and that a download is not required, the method 850 branches to step 862, whereupon the terminal enters the main loop or idle state. Those skilled in the an will understand that it is from this main loop that the terminal may be instructed to carry out any of a variety of functions. For example, from the main loop, the terminal may be instructed to initiate, for example, a credit sale authorization transaction 900. A credit sale authorization transaction 900 is initiated when a magnetic card 15 is swiped through the swipe slot 103, or by the activation of one of the buttons on the terminal's keypad 120. The credit sale authorization transaction 900 is discussed more completely below.

In addition to the methods associated with the completion of a credit sale transaction, those skilled in the art will understand that both the preferred terminal and other prior art terminals are capable of performing a close terminal routine 932. Generally described, a close terminal routine is performed at predetermined intervals, and comprises steps wherein the terminal transmits all data related to transactions occurring during a predetermined accounting period to the transaction processor.

Other functions which may be accessed from the main loop 862 include a terminal set-up routine 865. As described briefly above, a terminal set-up routine is typically operable to allow a merchant to determine the nature and format of reports provided by the terminal, the text of messages that may be printed on the receipt, etc. Those skilled in the art will appreciate that there are a variety of other functions common to prior art terminals that may also be implemented in the preferred terminal, and will not be discussed further herein.

Use of Preferred Terminal in Connection with Chargeback Protection Method

FIG. 26 illustrates a method 900 that is executed by the preferred terminal/printer 30 during an exemplary credit sale authorization transaction. The method 900 is preferably implemented as program steps for the terminal CPU 255.

This exemplary credit sale authorization transaction is carried out within the context of the preferred data card transaction system 25 constructed in accordance with FIG. 2. Such an exemplary credit sale is processed with transaction data capture by the terminal/printer 30, with authorization from an authorization source such as a host computer 40, and subsequent transmission of transaction data including compressed signature signals to the host 40. (It should be understood that while the host computer 40 in FIG. 2 is providing both authorization functions and transaction data processing functions, the authorization system and the transaction data processing system could be separate and independent systems.)

A credit sale authorization transaction is selected when the merchant desires to authorize a transaction and capture the transaction data simultaneously. When the transaction is authorized by the host computer 40, the transaction data will be captured by both the terminal 35 and the host computer 40. The method 900 is operative to insure that the data card is present, that the proper transaction data is collected and retained, and that the transaction qualifies for chargeback protection.

In FIG. 26, the method 900 begins at step 901 when a credit sale authorization transaction is initiated by the merchant, in response to presentation of a data card by a cardholder in connection with a proposed transaction. This typically occurs when a credit card 15 is swiped through the card swipe slot 103. At this step, a transaction record for the transaction, in which transaction information is stored for subsequent transmission to the host computer 40, is created. It will be understood that the transaction record will include the transaction protected flag set in accordance with the state of the chargeback protection flag (CPF). The state of the transaction protected flag can also be conditioned upon whether or not an authorization has been received, as well as the nature of the authorization indicia received (such as whether the authorization indicia is electronic authorization or off-line authorization), at the discretion of the transaction processor.

It will therefore be appreciated that at this step the transaction protected flag is determined and stored with other transaction data in a transaction record, for transmission to the transaction processor.

If the card is not present at the time of the transaction, as would be the case in the event of a mail order or telephone order (MOTO) transaction, the merchant may manually enter the account number from the keyboard and complete the transaction. However, a MOTO transaction, where the card is not present, will not be chargeback protected (i.e., the transaction protected flag is cleared) since the evidence indicative of the validity of the transaction (e.g., the card is physically present and a signature is captured) is simply not available. Such transactions, being of a conventional nature, will not be discussed any further.

At step 905, a subroutine 905 denominated READ CARD DATA is executed. The READ CARD DATA subroutine 905 determines the account number and expiration date of the credit card. Generally, the preferred method attempts to reduce the likelihood of chargebacks by reading the account number and expiration date from the most reliable source available, which is usually the magnetic stripe. Thus, the READ CARD DATA subroutine 905 first attempts to read the account number and expiration date from the card's magnetic stripe. If reading the magnetic stripe is unsuccessful, the terminal prompts the merchant to insert the card into the embossed card reader 112 by displaying a message on the LCD 123. Once the card is inserted into the embossed card reader, the terminal 30 attempts to read the account number from the characters that are embossed on the card. The READ CARD DATA subroutine 905 is discussed in more detail in connection with FIG. 28.

It should understood at this juncture that the disclosed steps of reading the magnetic stripe first and prompting for insertion of the card into the embossed card reader only in the event of failure of the magnetic stripe are preferred steps. Other embodiments of the invention contemplate usage of the embossed card reader in connection with the transaction regardless of whether the magnetic stripe was successfully read or not.

Subsequent to execution of the READ CARD DATA subroutine 905, the terminal/printer 30 performs steps to determine whether the account number associated with the card is valid (with the known checksum calculation) at step 907, whether the card type is one that may be accepted by the merchant (i.e., whether the terminal accepts a given issuer's card) at step 911, and whether the card has not expired at step 913. If any of the steps 907, 911, 913 result in a negative answer, the transaction will be terminated and the subroutine will return to the idle state in FIG. 25 (the main loop).

Once the account number and expiration date are determined to be valid, the method 900 proceeds to step 918. At step 918, the INPUT AMOUNT subroutine is executed. Generally described, the INPUT AMOUNT subroutine 918 prompts the merchant to enter the proposed purchase amount with the keyboard 120. The purpose of the subroutine is to obtain a proposed purchase amount from the merchant and to return that value.

The subroutine 918, which is not separately illustrated, causes the terminal's liquid crystal display 123 to display a message instructing the merchant to "ENTER PURCHASE AMOUNT" into the keyboard 120. The program then waits for the merchant to enter a number corresponding to the purchase amount. Once this number is input, it exits the INPUT AMOUNT subroutine 918 and returns control to the program 900.

After collecting the account number, expiration date, and proposed purchase amount, the terminal/printer 30 executes step 921, whereupon the signature capture printer 38 prints a portion of the sales receipt, typically a header portion. The portion of the receipt that is printed includes the date and time of the purchase, the account number, expiration date, purchase amount, and a line for the cardholder's signature. The signature capture printer 38 then advances the paper until the line for the signature is positioned over the signature capture window 160 located on the signature capture printer 38.

After printing the first portion of the receipt at step 921, the terminal/printer 30 executes step 923 and jumps to a subroutine denominated CAPTURE SIGNATURE. As described earlier, the cardholder uses a magnetic/ink stylus 165 to sign the receipt on the signature capture window 160, which covers the printer's digitizer printed circuit board 300. The CAPTURE SIGNATURE subroutine 923 is operative to digitize and compress the signature and transmit the compressed signature signals from the signature capture printer 38 to the terminal 35, where it is temporarily stored. The CAPTURE SIGNATURE subroutine 923 is described more fully in conjunction with FIG. 29.

Once the signature is transmitted to the terminal 35 and stored in memory, the terminal/printer 30 proceeds to step 926, where upon a REQUEST AUTHORIZATION subroutine is executed. At this point, the terminal 35 attempts to dial the transaction processor's host computer 40 in order to request authorization for the transaction.

It will be understood that, in the preferred embodiment, once the connection with the host is established, all of the data associated with the transaction (including compressed signature) is transmitted to the host computer 40. If the transaction is authorized, an authorization number or indicia is returned to the terminal and the REQUEST AUTHORIZATION subroutine is complete. If the transaction is not authorized, the transaction is terminated. The REQUEST AUTHORIZATION subroutine 926 is discussed in more detail in conjunction with FIG. 30.

At step 929, the signature capture printer 38 is made to print the remainder of the sales receipt, which includes the authorization number received from the host computer. The program then proceeds to step 930 and jumps to a STORE DATA subroutine. Generally described, the STORE DATA subroutine 930 causes the terminal to store the data related to the transaction. This subroutine is described in more detail in conjunction with FIG. 31.

Once the terminal stores the data, the credit sale authorization transaction routine 900 is complete and returns control to the main loop or idle state in FIG. 25, awaiting further transactions.

Restoring Track 1 Data with Track 2 Data

It will be recalled from earlier discussion that many card issuing institutions, such as VISA ® and MasterCard ®, promulgate regulations governing the manner for handling transactions associated with their card(s). If a merchant, transaction processor, or other presenter for payment does not give evidence of compliance with the regulations, transactions presented for payment may be refused or returned, resulting in chargebacks to the merchant or other presenter.

Individual card issuers have historically been responsible for payment of transactions accompanied by evidence of a card presented in connection with the transaction, with a check-digited account number containing an identifying prefix assigned to them by a card issuing association.

In an effort to reduce fraudulent uses of account numbers, card associations began requiring encoding of information on the back of the plastic card (via a magnetic stripe) as well as embossing of the front of the card. Present day data cards include a plurality of tracks on the magnetic stripe, generally referred to as "track 1" and "track 2". Originally, only track 2 of the magnetic stripe was required to be encoded with information. Accordingly, prior art terminals were created with the ability to read only information in track 2 of the magnetic stripe.

Current regulations generally require that information be encoded on both tracks, as shown in FIG. 27. It will be noted that the information on track 1 includes all of the information required on track 2 and includes additional information such as the cardholder's name and expanded "discretionary data ". More recently, data card processing terminals have been designed to allow reading of track 1 information or, optimally, to read the contents of both magnetic tracks.

Card association regulations allow some protection for transactions where "proof" that the account number was electronically read (rather than manually entered) can be provided (i.e., indicators that the authorization request has been generated from the magnetic stripe data), or alternatively where an impression (imprint) of an embossed card can be produced to "prove" that a card bearing the account number was actually presented for payment. Chargeback protection is limited to certain disputes regarding the validity of the account number, and issuers can obtain "counterfeit" loss protections for items paid on counterfeited cards.

Due to the skill of counterfeiters in producing properly embossed and encoded cards, issuers have set in motion plans to imbed a code in the discretionary data area of the magnetic tracks that can be used to validate the encoding, using a "secret" algorithm known only to the issuer or association acting on behalf of the issuer. These plans will eventually require that the entire magnetic stripe track be captured and transmitted to the issuer/card association for validation during the authorization process. Transactions not meeting this criteria may, in the future, when the ability to validate these "card verification values" is fully implemented, be subject to chargeback by the issuer.

In light of this trend, the ability to read both tracks on a card's magnetic stripe, and to be able to restore information where only a small data area is damaged, is desirable. Proposed regulations require that either track be read and transmitted with the authorization request; track 1 information, allowing capture and printing of the cardholder's name and transmission of more information to the issuer during the authorization process, is preferred over track 2 information.

As previously mentioned, many data cards nowadays include more than one track of information on the magnetic stripe. These multiple tracks contain redundant information, for example, both track 1 and track 2 contain the account number and expiration date, that could be used in the event of a failure to be able to read one of the tracks. Moreover, the embossing on the card contains the account number and expiration date. It would be desirable to be able to utilize these other sources of information of the account number, expiration date, etc. in the event of errors in reading the information from the magnetic stripe, for example if only a portion of the magnetic stripe were damaged. Alternative embodiments of the present invention allow such operation.

Transaction processors and others may therefore find it advantageous to utilize embodiments of the present invention that are operative to obtain information from one track or from the embossed card reader to construct a complete or error-corrected account number, expiration date, or the like in the event that an error occurs in reading another track of the magnetic stripe data. However, it will be understood that the preferred embodiments of the invention are constructed to obtain the desired information from the magnetic stripe.

In this regard, the data card magnetic stripe encoding standard in widespread use today is found in ANSI Standard X4.16-1983, published by the American National Standards Institute, New York, N.Y., which is incorporated herein by reference. FIG. 27 illustrates the method of encoding data on track 1 1001 and track 2 1002 of the magnetic stripe of a typical data card in accordance with this ANSI standard.

In track 1 1001, data characters are encoded as six bit values, with one parity bit, for a total of seven bits per character. The major components or fields included in the track 1 data are an account number region, an account holder's name region, an expiration date region, and a longitudinal redundancy check (LRC) region. In addition, track 1 includes a start sentinel (SS), a format code (FC), a plurality of field separators (FS), discretionary data, and an end sentinel (ES). Those skilled in the art will also understand that the track 1 data illustrated in FIG. 27 are both preceded and followed by a series of clocking characters (logic O's) that are read by the magnetic stripe read circuitry and used solely for the purpose of synchronizing the decode circuitry.

Track 2 1002 contains data characters that are encoded as four bit values, with one parity bit, for a total of five bits per character. The major components or fields included in the track 2 data are an account number region, an expiration date region, and an LRC region. In addition, track 2 data also includes a start sentinel (SS), a field separator (FS), discretionary data, an end sentinel (ES), and a series of leading and trailing clocking characters like those discussed in conjunction with track 1 1001.

The account numbers and expiration dates that are encoded on track 1 1001 and track 2 1002 are identical to each other and to the embossed account number and expiration date that appear on the face of the data card. Each track 1001, 1002 has a unique LRC that allows the terminal to verify the accuracy of the data read from the card. Generally described, the bit configuration of the LRC characters are identical to the bit configuration of the data characters. Thus, the LRC of track 1 1001 consists of seven bits including one parity bit, and the LRC of track 2 1002 consists of five bits including one parity bit. The LRC character recorded on each track is calculated so that a total number of ONE bits encoded in the corresponding bit location of all characters of the data message, including the start sentinel, data, end sentinel, and LRC characters, is even. The LRC character's parity bit is calculated so that the total number of ONE bits in the LRC character, including the parity bit, is odd.

Those skilled in the art, will understand that a terminal 35 constructed in accordance with the present invention will calculate a value for the LRC for the data read from track 1 1001 and compare it to the LRC encoded on track 1 1001. If the two are identical, it is determined that the data has been read from track 1 1001 without errors.

In the event the two are not identical, the terminal also calculates a value for the LRC for the track 2 data and compares it to the LRC encoded on track 2 1002. If they are identical, it is understood that the terminal 35 has read the encoded data in track 2 without encountering errors. However, if the LRC encoded on either track does not match that calculated by the terminal 35, it is determined that the data read from the magnetic stripe, both track 1 and track 2, is erroneous and should not be used to process the transaction or should be restored, if possible.

Those skilled in the art will appreciate that it is possible with the present invention to restore the data read from the magnetic stripe in the event the LRC calculated by the terminal for the data read does not match that stored on the magnetic stripe. Even if the LRC for track 1 or track 2 indicates that the magnetic stripe read contained errors, it is possible that the account number was read properly, in whole or in part. By obtaining at least a portion of the account number from another source, such as the other track of the magnetic stripe or from the embossed card reader, replacing selected characters of the account number which may be in error with corresponding characters from the alternative source account number, and verifying the account code checksum, the account number may be restored to its original error-free state.

In the preferred embodiment, each character of the account number that is read by the embossed card reader 112 may be converted into the appropriate character format for track 1 or track 2 data, and used to restore at least a portion of the account number read from the magnetic stripe. Likewise, since each character in the account number of track 1 and or track 2 includes parity bits, it may be possible to identify which one of the plurality of alphanumeric characters forming the account number or expiration date is erroneous.

It is thus possible with the present invention to (1) identify a character or characters in the data read from a first track of the magnetic stripe that have incorrect parity, and substitute the corresponding character from a second track of the magnetic stripe or from the embossed card reader, or (2) substitute the entire account number or other data read from a first track with data read from a second track, or from the embossed card reader, and (3) thereafter recalculate the value for the checksum associated with the account number and/or LRC for the entire track to determine if it then matches the account number checksum and/or the LRC for the entire track.

If the checksum and/or LRC calculated from the account number formed by substituting selected characters or by substituting the entire account number, matches the account number checksum and/or LRC associated for the respective track, it will be determined that the data originally read from the particular track of the magnetic stripe was erroneous, that the error has been corrected, and that the accuracy of the account number, expiration date, etc. data has been verified by recalculating the checksum and/or LRC. By this method, it is possible to utilize data from any of the three sources to determine the account number and expiration date and to maintain a high level of confidence as to the accuracy of those numbers.

Subroutine READ CARD DATA

Turning now to FIG. 28, the preferred subroutine READ CARD DATA 905 will be described. This subroutine comprises steps taken in the preferred terminal for automatically reading the account number and expiration date from the card, and verifying the accuracy of the data to the extent possible. Namely, the READ CARD DATA subroutine 905 first attempts to read the account number and expiration date from a card's magnetic stripe. If the LRC is verified and the data appears to be accurate, the transaction is processed using that information. If the LRC verification fails and the magnetic data therefore is determined to be inaccurate, the subroutine reads and decodes the account number from the characters that are embossed on the face of the card, and prompts the merchant to manually enter the expiration date from the keyboard. This data is then used to restore portions of the data read from the magnetic stripe and the LRC is recalculated. If the LRC is verified, the transaction is processed using the restored magnetic data. However, if the attempt to verify LRC fails again, the transaction is processed using the account data that was read from the embossed characters.

The subroutine 905 begins at step 1020 when a card 15 is swiped through the card swipe slot 112. At this step, the preferred card swipe interface 265 reads and decodes the data recorded on both track 1 1001 and track 2 1002 of the card's magnetic stripe 110. Those skilled in the art will understand that the method by which the magnetic stripe data is read and decoded is substantially similar to that used in prior art devices. A description of a method of reading and decoding the data contained in a magnetic stripe associated with a data card may be found in copending U.S. patent application Ser. No. 07/790,658, filed Nov. 8, 1991, entitled "Card Transaction Terminal", the disclosure of which is incorporated herein by reference and made a part hereof, and in U.S. Pat. No. 4,788,420 to Chang et al. Thus, the decode algorithm will not be described herein in any additional detail.

At step 1022, the CPU 255 calculates LRC values for the data read from both tracks 1 and 2, and compares them to the LRC values encoded on the card's magnetic stripe. If the data from either track is determined to be valid, the method proceeds to step 1025. If neither track 1 1001 nor track 2 1002 is valid, the subroutine proceeds to step 1027 and the merchant is prompted to swipe the credit card 15 through the card swipe slot 103 again, by displaying the message "CARD NOT READ—PLEASE SWIPE CARD AGAIN" on the LCD 123 on the terminal. When the card 15 is swiped through the card swipe slot 103 the second time, the preferred card swipe interface 265 again attempts to read and decode the data recorded on both track 1 1001 and track 2 1002 of the card's magnetic stripe 110.

After the card is swiped for the second time, the subroutine 905 proceeds to step 1030, and repeats the tests carried out at step 1022. Thus, the LRC values for the data read from both tracks 1 and 2 are calculated and compared to the LRC values encoded on the magnetic stripe. If either track 1 1001 or track 2 1002 is valid, the subroutine proceeds to step 1025.

At step 1025, the terminal determines whether the track 1 data possessed a valid LRC. If so, the track 1 data is determined to be valid, and the CPU proceeds to step 1032. At step 1032, a flag is set to indicate that the data used to process the transaction is "swiped track 1 data" and the CPU 255 exits the READ CARD DATA subroutine 905 and returns to the CREDIT SALE AUTHORIZATION routine 900.

Returning now to step 1025, in the event the track 1 data is determined to be invalid, the terminal proceeds to step 1035, where the track 1 account number is compared to the track 2 account number. If the account numbers read from track 1 and track 2 are different, the CPU 255 proceeds to step 1037 and begins the process of using the account number read from track 2 to restore the data read from track 1. If the account numbers are found to be identical, at step 1035, the method 905 advances to step 1045, which is discussed below.

Those skilled in the art will understand that even though track 1 and track 2 both include the account number and expiration date, it is preferable to process a transaction using track 1 data if possible, since it includes the cardholder's name and additional discretionary data. In addition, the track 1 discretionary data may include alphanumeric characters, whereas all track 2 is limited to numeric data.

At step 1037, the defective track 1 data 1001 is restored by substituting at least a portion of the account number from track 2 into the account number field of track 1. With the track 1 data reconstructed in this manner, the terminal proceeds to step 1040 and attempts to verify the validity of the restored track 1 data by retesting the LRC. If the LRC is determined to be valid, the terminal proceeds to step 1032 whereupon it sets a flag to indicate that the data used to process the transaction is "swiped track 1 data built using track 2", exits the READ CARD DATA subroutine 905, and returns to the CREDIT SALE AUTHORIZATION method 900.

If, at step 1040, the reconstructed track 1 data is determined to be invalid, the terminal proceeds to step 1047. At step 1047, the terminal sets a flag indicating that the data used to process the transaction is "swiped track 2 data", exits the READ CARD DATA subroutine 905 and returns to the CREDIT SALE AUTHORIZATION method 900.

Turning now to step 1045, if the track 1 and track 2 expiration dates are determined to be different, the program advances to step 1050. At this step, the terminal attempts to restore the data read from track 1 by replacing the track 1 expiration date with the expiration date read from track 2. The method 905 then returns to step 1040, where the terminal recalculates the track 1 LRC and tests the validity of the restored track 1 data. If the restored track 1 data is now valid, the terminal proceeds to step 1037, whereupon the program sets a flag to indicate that the data used to process the transaction is "swiped track 1 data built using track 2", leaves the READ CARD DATA subroutine 905 and returns to the CREDIT SALE AUTHORIZATION method 900.

If, at step 1040, the reconstructed track 1 data is determined to be invalid, the terminal proceeds to step 1047. At step 1047, the terminal sets a flag indicating that the data used to process the transaction is "swiped track 2 data", exits the READ CARD DATA subroutine 905 and returns to the CREDIT SALE AUTHORIZATION method 900.

Returning now to step 1030, the preferred steps executed in the event neither track 1 nor track 2 are valid will be described. If, at step 1030, neither track 1 nor track 2 are determined to be valid, the program advances to step 1055, and determines whether the embossed card reader 112 is activated. If so, the terminal proceeds to step 1057. If the terminal's embossed card reader is not activated, the program proceeds to step 1084 and allows the merchant to manually enter the account number and expiration date. This process is described more completely below.

At step 1057, the terminal first causes the liquid crystal display 123 to display a message instructing the merchant to insert the card 15 into the terminal's embossed card reader 112, for example "INSERT CARD INTO EMBOSSED CARD READER". Once the card is inserted, the embossed card reader 112 automatically reads and decodes the numeric characters 115 that are representative of the account number and embossed on the face of the card.

Once the embossed characters are read, the program proceeds to step 1060, and determines whether the characters read from the card are "acceptable", that is, generally within the specifications prescribed for embossed characters on data cards. Those skilled in the art will appreciate that the embossed characters on a credit card comply with the Farrington 7B standard. However, the resolution of the disclosed embossed card reader 112 does not allow determination whether the characters of the embossing are within the precision set forth in the Farrington 7B standard. Nonetheless, this resolution is sufficient to permit determination as to whether the characters are grossly out of proportion, size, alignment, spacing, etc., and can detect badly worn cards or certain fraudulent cards. Thus, the determination of whether the embossed characters are "acceptable" will vary with the resolution of the embossed card reader and the degree to which the transaction processor decides to set parameters of acceptability. For purposes of the present invention, characters are acceptable if the size and spacing of the characters is within the tolerance of the tactile imager, that is, about 0.5 millimeters.

It will of course be expected that as the resolution of tactile imaging technology improves, it will be possible with future embodiments of the present invention to determine whether embossing on cards is within the tolerances provided by the Farrington standard, thereby providing still further levels of confidence in the validity of the card and of the transaction.

In addition to determining whether the embossed characters themselves are acceptable at step 1060, the terminal also tests to see if the data from the embossed card reader is all numeric, if the length of the account number is valid for the card type, and if the account number passes the MOD 10 check, that is, the known checksum calculation associated with credit card account numbers. If any of these tests fail, the characters read by the embossed card reader is determined to be not acceptable.

If the embossed characters 115 are determined to be acceptable, the program proceeds to step 1062.

At step 1062, the terminal causes the liquid crystal display 123 to instruct the merchant to enter the expiration date via the keyboard 120. Once the merchant has read the expiration date from the credit card and entered it from the keypad, the program goes to step 1064. At this step, the terminal determines whether it was able to read any data from the magnetic stripe at the previous steps 1020, 1027. If the terminal determines that the magnetic data was nonexistent, the program advances to step 1066, whereupon the terminal sets a flag indicating that the data used to process the transaction is "embossed data only". The terminal then exits the READ CARD DATA subroutine 905 and returns to the CREDIT SALE AUTHORIZATION method 900.

Again, it will be understood that transactions flagged as "embossed data only" may not be afforded the same treatment as magnetically read transactions by certain card issuing institutions or card issuers. Nonetheless, transaction processors who employ the present invention may elect to treat "embossed data only" transactions in the manner it desires, inasmuch as the election to take the risk for a given transaction rests with the transaction processor. It will of course be appreciated that users of the present invention may realize a greater degree of confidence that a card was actually present during a transaction, when the data read from the embossing matches data read from track 1 and/or track 2 of the magnetic stripe, and that the card was a valid one if the characters read from the embossing are deemed acceptable.

If, at step 1064, the terminal determines that magnetic track data does exist, the program proceeds to step 1068. At this step, the terminal reconstructs the data read from track 1 by replacing the account number and expiration date from track 1 with the account number read by the embossed character reader 112 and the expiration date that was manually entered by the merchant. Once the reconstruction is complete, the program proceeds to step 1070, and recalculates the LRC for the restored track 1 data. If the LRC is verified and the restored track 1 data is determined to be valid, the terminal proceeds to step 1072, where it sets a flag indicating that the data used to process the transaction is "embossed data inserted into track 1", exits the READ CARD DATA subroutine 905 and returns to the CREDIT SALE AUTHORIZATION method 900. If the reconstructed track 1 data is invalid, the program goes to step 1074.

At step 1074, the terminal reconstructs the track 2 data by replacing the account number and expiration date read from track 2 with the account number read by the embossed character reader 112 and the expiration date entered by the merchant. Once the reconstruction is complete, the program proceeds to step 1076, and recalculates the LRC for the restored track 2 data. If the LRC is verified and the restored track 2 data is thus determined to be valid, the terminal proceeds to step 1078, where it sets a flag indicating that the data used to process the transaction is "embossed data inserted into track 2". The terminal then exits the READ CARD DATA subroutine 905 and returns to the CREDIT SALE AUTHORIZATION method 900. If the reconstructed track 2 data is invalid, the program goes to step 1080.

At step 1080, the terminal sets a flag indicating that the data used to process the transaction is "track 1 or track 2 data with embossed data inserted and LRC failure". The program then exits the READ CARD DATA subroutine 905 and returns to the CREDIT SALE AUTHORIZATION method 900.

Returning now to step 1060, the steps that follow a determination that the charaders read by the embossed character reader are not acceptable will be described. If the embossed characters read from the card are not acceptable, the program proceeds to step 1082 and determines whether the embossed card reader 112 is broken. If not, the terminal advances to step 1088 and causes the liquid crystal display 123 to instruct the merchant to request another form of payment from the customer. The credit sale transaction is then terminated.

If the embossed card reader 112 is determined to be inoperative at step 1082, the program proceeds to step 1083, where it causes the liquid crystal display 123 to direct the merchant to notify the transaction processor 12 that the embossed card reader appears to be defective. Once notified, the transaction processor will cause the terminal software to be modified temporarily to allow the terminal to continue processing credit sales until the embossed card reader can be repaired or replaced. The program then proceeds to step 1084 where it allows the merchant to manually enter the account number and expiration date. Once the account number and expiration date are manually entered by the merchant, the terminal proceeds to step 1086, where it sets a flag indicated that the data used to process the transaction is "manually entered", exits the READ CARD DATA subroutine 905, and returns to the CREDIT SALE AUTHORIZATION method 900. Again, it will be understood that transaction processors and credit card issuers may not afford the same treatment to transactions flagged as "manually entered" as they would to magnetically read transactions.

An alternative embodiment of the present invention contemplates additional verification of the authenticity of the account number read from the card. For example, a terminal constructed according to an alternative embodiment contemplates that the credit sale transaction would be terminated if the terminal is unable to read the data from the card's magnetic stripe. In addition, once the data is successfully read from the magnetic stripe, the terminal prompts the merchant to insert the card into the embossed card reader or to manually enter the account number via the keyboard so that the magnetically read account number can be verified against the number obtained manually or read from the embossed card reader. In this manner, a transaction processor is enabled to receive additional assurance that a card is genuine and that the embossed characters and/or magnetic stripe have not been altered by the cardholder.

From the foregoing, those skilled in the art will understand and appreciate that the "restoration" of data which has a redundant source is an option available with use of the present invention. It will be appreciated that one method of restoring data involves reconstructing the account number and/or expiration date read from a first track with data read from a second track and/or the embossed card reader. Another common use would be to restore either track's data with data read from the embossed card reader. In any case, preferred embodiments of the present invention will identify the manner of obtaining the data and transmit information corresponding thereto, such as "embossed data inserted into track 1", "embossed data inserted into track 2", "track 2 data inserted into track 1", "track 1 or track 2 data with embossed data inserted and LRC failure", and the like.

Those skilled in the art will furthermore understand that transaction processors, card issuing institutions, card issuers, and others may elect to differentiate between transactions as a function of the manner in which the data was obtained. Specifically, it is expected that magnetic stripe data, unrestored and original, is more likely to be accepted under stringent regulations of certain card issuing institutions. However, track 1 data restored with track 2 data and/or embossed card data is equally reliable, as is track 2 data restored with track 1 and/or embossed card data. Accordingly, the present invention's ability to restore data obtained from one source of information associated with a data card with information obtained from a redundant source will now be appreciated.

Subroutine CAPTURE SIGNATURE

Turning to FIG. 29, the CAPTURE SIGNATURE subroutine 923 will now be described. Generally, the subroutine 923 is operative to cause the signature capture printer 38 to digitize and compress the data representative of the cardholder's signature The method 923 begins at step 1101, when the terminal causes the liquid crystal display 123 of the terminal 35 to prompt to merchant to ask the cardholder to sign the receipt, by displaying a message prompt such as "ASK FOR SIGNATURE". The program then proceeds to step 1105.

As described earlier, the portion of the receipt printed at step 921 of the method 900 (FIG. 26) includes the date and time of the transaction, purchase amount, credit card account number and expiration date. After the information recorded on the receipt is verified, the cardholder signs the receipt over the signature capture window 160 on the signature capture printer 38 using the magnetic/ink stylus 165.

As the cardholder signs the receipt, the magnetic field generated by the X- and Y-grids 601, 602 on the digitizer printer circuit board 300 is detected and converted into electrical signals by the magnetic/ink stylus 165. At step 1105, the digitizer printer circuit board 300 receives the signals from the magnetic/ink stylus. Then, at step 1107, the digitizer printer circuit board converts these electrical signals into a digital signals representative of the strokes of the signature provided by the cardholder. These signals are then transmitted to the printer controller printed circuit board 280.

At step 1112, the circuitry on the printer controller board 280 compresses the numeric data received from the digitizer printed circuit board, in the manner described in connection with FIG. 18 through FIG. 24.

Those skilled in the art will appreciate that the compression of the X, Y data points comprising the signature signals is effective to reduce the amount of data required to accurately represent the cardholder's signature. Since an object of the present invention is to provide archival-type storage of a facsimile of the cardholder's signature, the compression of the data facilitates storage of the signature by reducing the amount of memory required to accomplish this objective. In addition, inasmuch as the facsimile of the signature must be transmitted from the terminal 35 to the host computer 40, the time required to transfer the data is reduced by decreasing the amount of data that must be transferred. Finally, compression of the data increases the number of transactions that can be stored in the limited memory available in the terminal 35. This is essential in the event the terminal is unable to communicate with the host computer, in which case the terminal must store the facsimile of the signature along with all of the other transaction data that is typically stored in the terminal, until such time as communications with the host can be re-established.

Once the data is compressed, the compressed data representative of the signature is transferred from the signature capture printer 38 to the preferred terminal 35 at step 1115. Once the facsimile of the signature is received by the terminal, the method 923 proceeds to step 1117, where the terminal exits the subroutine 923 and returns to the CREDIT SALE AUTHORIZATION method 900 in FIG. 26.

Subroutine REQUEST AUTHORIZATION

FIG. 30 illustrates the method that is embodied in the REQUEST AUTHORIZATION subroutine 926, which is executed by the terminal 35. Generally described, the method 926 causes the terminal 35 to initiate communications with the host computer 40 of a transaction processor. During the established communications session, the terminal transmits the data pertaining to the proposed transaction and requests an authorization indicia or code from the host computer. The authorization will be granted if the card issuer or its agent so stipulates, or, in the event of failure to communicate with the card issuer or its agent, if the transaction data received by the host computer falls within predetermined parameters that are prescribed by the credit card transaction processor 12 or by the card issuing association 18a–d.

In the event the terminal 35 is unable to establish communications with the host computer 40, or communications are interrupted, the terminal then attempts to initiate and receive an off-line authorization from an alternative facility known as an audio response unit (ARU) 70. If the transaction is not approved by one of these two means, the transaction is terminated. However, if the transaction is authorized, the subroutine causes the authorization number to be stored and the routine terminates and returns to the CREDIT SALE AUTHORIZATION routine 900.

The subroutine 926 begins at step 1150 when the CPU 255 in the terminal 35 causes the modem 446 to dial a predetermined first or primary telephone number corresponding to a primary authorization source (for example, a front end processor of the host computer 40 of the transaction processor 12 in the case of preferred embodiments of the invention). Dialing this number comprises an attempt to establish a first telecommunications link between the terminal 35 and an authorization source.

It will be understood that the terminal 35 is preprogrammed with the telephone number of the primary authorization source computer system. In the preferred embodiment, the authorization source telephone number consists of an access code and telephone number utilizing a first or primary telecommunications carrier, and the authorization source is preferably the transaction host computer system 40.

At step 1152, the inquiry is made whether the authorization source host system has responded. If so, the program branches to step 1160.

If at step 1152 the primary authorization source has not responded, then step 1155 is executed. At step 1155 the CPU 255 in the terminal 35 causes the modem 446 to dial a predetermined secondary telephone number corresponding to a secondary authorization source (for example, a direct dial in port associated with the host computer 40 of the transaction processor 12 in the case of preferred embodiments of the invention). Dialing this number comprises an attempt to establish a second telecommunications link between the terminal 35 and a secondary authorization source.

At step 1156, the inquiry is made whether the secondary authorization source has responded. If so, the program branches to step 1160. If not, the program branches to step 1159 to attempt to obtain an off-line authorization.

It will be understood that the terminal 35 is preprogrammed with this secondary authorization source telephone number. In the preferred embodiment, the secondary authorization source telephone number consists of an access code and telephone number utilizing a secondary telecommunications carrier, and the secondary authorization source may be a dial-in port associated with the transaction host computer system 40.

It should be understood that in the preferred systems, the attempts to establish a first and then a second telecommunication link comprises attempts to communicate with the transaction processor host system 40, which serves as a communication channel for obtaining authorizations from an originating authorization source such a card issuer or card issuing institution, as in FIG. 1 and FIG. 2. Of course, the host system 40 itself could be the authorization source. Moreover, it should be understood that the first telecommunication link and the second telecommunication links are preferably independent packet networks, so as to provide redundant communication means. Thus, the primary authorization source and the secondary authorization source could comprise the same host computer system, but may be considered separate authorization sources because of the fact that the host is accessed via separate, redundant telecommunication links.

It will thus be appreciated that the provision of separate primary and secondary telephone numbers, each associated with a different telecommunications carrier, allows independent and therefore redundant access paths to the host system 40 of the transaction processor, which performs the authorization functions on behalf of the merchant and transaction processor. Such redundant communication paths increase the likelihood that an electronic authorization can be obtained for any given transaction, which is a preferred result to an off-line authorization.

In the event that communications with either the primary authorization source or the secondary authorization source have been established, at step 1160 the program causes the transaction data accumulated by the terminal to be transmitted to the host computer. Once the account number, expiration date, purchase amount, transaction date, and compressed signature signals are transmitted to the host computer 40, the program proceeds to step 1162. Such a transmission comprises a request for authorization of the transaction.

It will be appreciated here that the described method of transmitting to the host all transaction data (account number, expiration date, purchase amount, transaction date, compressed signature signals, and transaction protected flag) upon establishment of communications for purposes of seeking an authorization is presently preferred for use in the present invention. Nonetheless, those skilled in the art will appreciate that other sequences of operation are considered within the scope of the present invention. For example, alternative embodiments of the present invention contemplate operation wherein the authorization is sought immediately after obtaining the account number, and wherein the compressed signature signals are transmitted after obtaining the authorization. However, it will be appreciated that for transaction processors electing to provide chargeback protection on behalf of merchant/customers, it is advantageous to capture all relevant information concerning the transaction including the signature prior to seeking authorization.

At step 1162, the program receives a response from the host computer in response to the authorization request. If at step 1164 the response is a "decline", the subroutine exits and control is returned to the CREDIT SALE AUTHORIZATION routine 900. If the response was not a decline, the inquiry is made at step 1166 whether the response was an approval.

If the response was an approval, the program branches to step 1170, where the approval code is recorded within the terminal's memory associated with the other transaction data. The approval code will be retained with the other transaction data until the terminal is closed, in accordance with the CLOSE TERMINAL subroutine. The subroutine exits and control is returned to the CREDIT SALE AUTHORIZATION routine 900.

If at the inquiry step 1166 the response received from the authorization source is not an approval, the only other alternative is a "referral" or call me. In this case, the program branches to step 1175.

Returning now for a moment to step 1156, if no response has been received from either the primary or the secondary authorization sources, step 1159 is reached. Steps of the method subsequent to this point, which is reached if the attempts to establish communications via the first telecommunication link and the second telecommunication link to obtain an electronic authorization have failed, may be considered steps of an "off-line authorization" method.

At step 1159, the inquiry is first made whether the proposed transaction amount is less than a predetermined floor limit or minimum transaction size for which an authorization is required. If the transaction is beneath the floor limit (e.g., the transaction is less than, say $10.00), a "floor limit" process is carried out at step 1177, comprising in the preferred embodiment the generation of an off-line approval code within the terminal itself, indicative of a less than floor limit transaction. No communications with any external off-line authorization source are attempted, since it may not be deemed economically feasible to obtain an off-line approval code for small transactions.

It should be understood that the term "off-line authorization", as used herein, signifies that an authorization is being sought from an authorization source other than that provided by the data communication link normally established between the terminal and the transaction host system 40. Such an "off-line authorization" may a verbal authorization or telephonic authorization instead of an electronic authorization comprising authorization indicia that is transmitted electronically from an authorization source and electronically stored and associated with the transaction data without intervention by or data entry by the merchant.

If at step 1159 the transaction is of a magnitude that exceeds the floor limit amount, the program branches to step 1175. At step 1175, the terminal automatically dials a preprogrammed number associated with the transaction processor's off-line authorization source. Such an off-line authorization source in the preferred system is the transaction processor's own ARU 70. It will be appreciated that the attempt to communicate with the ARU is made via a voice grade telephone connection, instead of a packet network as in the case of the first telecommunications link and/or the second telecommunications link.

At step 1176, data associated with the proposed transaction is transmitted by the terminal 35 using DTMF tones generated by the modem 446. The response of the ARU 70 and off-line authorization source constructed in accordance with the present invention is described in connection with FIG. 35.

Once the ARU 70 answers, the transaction data is transmitted from the terminal 35 to the audio response unit 70 using dual tone multiple frequency (DTMF) signals, such as those produced by a TOUCH-TONE ® telephone. It will be appreciated that the preferred terminal 35 is programmed to automatically transmit the transaction data via DTMF signals when communicating with the ARU, but this operation is selective and the terminal can be made operative to require keyboard entry of transaction data.

If automatic DTMF transmission of transaction data is not selected, the merchant will enter the account number, expiration date, and purchase amount using the portion of the keyboard 120 that forms a telephone-type keypad. Once the audio response unit 70 receives the transaction data, the ARU automatically attempts to obtain an authorization approval from the card issuer via its connection to an appropriate authorization source, or, in the event of a host outage, determines whether the transaction may be approved according to predetermined guidelines for off-line authorizations maintained by the transaction processor 12. If so, the ARU produces an audible series of numbers corresponding to an off-line authorization number. If the transaction may not be approved, the ARU will automatically refer the call to a live operator in the voice services department 72 (FIG. 2) in order to accommodate a direct voice telephone call to the card issuer.

Further details of the off-line authorization system are provided in connection with FIG. 35.

At step 1180, the inquiry is made whether an approval was received from the ARU 70. If not, the terminal branches to step 1182, where the inquiry is made whether the response to the authorization request was a decline. If the response was a decline, the at step 1184 the terminal displays "DECLINE" on the LCD 123 and the subroutine exits and control is returned to the CREDIT SALE AUTHORIZATION routine 900. The merchant of course must at this juncture decide whether to proceed with the transaction using another source of payment.

If at inquiry step 1180 the transaction is to receive an off-line approval, the program branches to step 1192. At step 1192, it is assumed that a speech-synthesized three-digit authorization code has been spoken to the merchant by the ARU 70, in accordance with the discussion in connection with FIG. 35. The merchant at 1192 is then prompted (by synthesized speech from the ARU) to enter this three digit code via the keypad. As described below, two of the three digits are derived from any authorization code obtained from a card issuer or card issuing association's authorization system by the ARU 70, while the third digit is a check digit designed to check for mistaken or fraudulently entered authorization codes.

At step 1193, a check is made whether the "charge back protection" (CPF) flag (described in TABLE II) has been set. If not, the subroutine exits to the CREDIT SALE AUTHORIZATION routine. 900.

If at step 1193 the CPF flag has been set, the program checks the approval code entered by the merchant at the keypad at step 1194. If a valid approval code has been entered, the subroutine exits and control is returned to the main loop 900.

The terminal performs a predetermined check-digit-type authentication algorithm as a part of step 1194 to validate the authenticity of the purported off-line approval code. Those skilled in the art will understand that because the off-line authorization code is being provided in the form of synthesized speech, via the telephone, to the merchant, and the merchant is entering the numbers via the keyboard, there is a possibility that the authorization code could be wrongly or fraudulently entered. In preferred embodiments of the present invention, a three-number authorization code is provided from the ARU 70—the first two numbers are a subset comprising the least significant digits of any actual multiple digit authorization code received from a card issuer or card issuing association's authorization system (as described in greater detail in connection with FIG. 35), while the third number is a check digit computed according to a known check digit algorithm for purposes of ensuring that a valid approval was actually received and/or entered by the merchant. The terminal 35 in the preferred embodiment is programmed to check the three numbers entered by the merchant for correctness via the check digit, using the same algorithm as utilized by the ARU 70 in generating the three numbers, which is discussed in conjunction with FIG. 35.

If at step 1195 the approval code is not valid, as determined by check digit logic carried out within the terminal 35, the terminal will display a prompt on the LCD for the merchant to re-enter the approval code, by branching to step 1192. The merchant will be afforded two opportunities to enter the approval code including check digit properly, after which the terminal assumes that the approval code was not heard properly by the merchant or is fraudulent, and the subroutine will exit and return control to the main loop 900.

Returning now to step 1182, if the response from the off line approval source was not a decline, it is deemed that the response is a "call me", and the program branches to step 1186. At this step, the merchant is advised via a message on the LCD 123 to call the card issuer for an approval or other message. In alternative embodiment, the terminal may be programmed with the telephone number of the card issuer and the terminal will be automatically operative for initiating a call to the issuer. After calling the card issuer, the program branches to step 1188 and transmits any required data to the card issuer, if applicable, and exits. Typically, in such cases the terminal will switch the telephone line to the handset, since a voice communication with a live operator associated with the card issuer will likely follow. Thus, in some cases the merchant may speak directly to a voice services operator. After step 1188, the subroutine exits and control is returned to the CREDIT SALE AUTHORIZATION routine 900.

Subroutine STORE DATA

Turning now to FIG. 31, the subroutine STORE DATA 930 will be described. Generally described, the STORE DATA subroutine is operative to store the transaction related data, including signature signals, in the terminal 35 after the terminal has received an authorization code from the host computer 40 or the audio response unit 70. If the authorization code was received from the host computer, the host computer will have received and stored all of the transaction data including the signature. In such a case, the terminal will store all of the transaction data except the cardholder's signature, thereby freeing memory for storage of additional transactions.

On the other hand, it will be understood that if the transaction was authorized by an off-line authorization code, the transaction data will not have been transferred to the host computer since the terminal was unable to establish communications with the host computer. Thus, the terminal stores all of the transaction data including the cardholder's signature until such time as the terminal again establishes communications with the host computer and is able to transfer transaction data to the host. Those skilled in the art will understand that the data stored in the terminal remains there only until the terminal is "closed" periodically and the transaction data is transferred to the transaction processor for clearing and settlement.

The STORE DATA subroutine 930 begins at step 1202, where the terminal determines whether the authorization code received by the terminal at step 926 was an off-line authorization code. If it was not an off-line authorization, the method proceeds to step 1204, where the terminal's microprocessor 401 causes all data corresponding to the transaction, except the signature signals, to be retained in the terminal's memory 258. Memory formerly utilized for storing the signature associated with the transaction is then released for other uses by the microprocessor 401, including storage of other transaction data. Once the data is stored at step 1204, the program exits and returns to the CREDIT SALE AUTHORIZATION routine 900.

If, at step 1202 the authorization was determined to have been received via an off-line authorization code, the method advances to step 1206. At this point, the CPU 255 in the terminal causes all of the transaction data including the signature to be stored in the terminal's memory 258. Once the appropriate data is stored, the program exits and returns to the CREDIT SALE AUTHORIZATION routine 900.

Routine for Terminal Closing

FIG. 32 is a flow chart illustrating the preferred CLOSE TERMINAL subroutine 932, described generally in connection with the main loop in FIG. 25, that is operative to "close" a terminal/printer 30 constructed in accordance with the present invention. As discussed earlier, the terminal is "closed" periodically (e.g., daily) when the merchant transfers accounting period data to the transaction processor 12, for example an amount corresponding to the total of all transactions during a given accounting period, along with the data associated with the particular transactions. The CLOSE TERMINAL subroutine 932 of FIG. 32 is implemented as a function which may be initiated from the main program, as illustrated in FIG. 25.

Those skilled in the art will understand that in the present invention and in prior art data capture terminals, the transaction data is preferably transmitted to the transaction processor at the time of each transaction. Thus, it may only be necessary to transmit a total amount representing the merchant's accounts receivable from the transaction processor when the terminal is closed. However, there are times when the terminal is unable to communicate with the host computer, and terminals constructed in accordance with the present invention store all transaction data until it can be transmitted to the host computer 40 at the time the terminal is closed.

At step 1225, the terminal 35 determines whether it has been instructed to execute the close procedure. This may be upon command by the merchant with a predetermined command keystroke on the keyboard, or the terminal 35 may be programmed to close automatically at a predetermined time each day. In either case, the program advances to step 1229 if the close instruction has been issued. If not, the program exits the CLOSE TERMINAL routine and returns to the idle state.

At step 1229, the terminal software (which can include separate accounting software not forming a part of the present invention but operative in the MS-DOS compatible terminal CPU 255) determines the amount of the "deposit" made by the merchant to the transaction processor. It will be understood that the "deposit" comprises an amount corresponding to a number of transactions, for which the merchant is seeking payment from the transaction processor or other paying entity. If the close procedure is entered manually, the merchant will be prompted to enter the amount of the deposit via the keyboard. If the close procedure is initiated automatically, the terminal 35 determines the total amount of the deposit as represented by the transactions accumulated since the terminal was last closed. Once the deposit amount is determined, the method proceeds to step 1232.

At step 1232, the terminal determines which of the transactions stored in the terminal need to be transmitted to the host. As discussed earlier, in the preferred embodiment only those transactions that are stored with off-line authorization codes have not already been transmitted to the host. Thus, the terminal only transmits the transaction data and signatures associated with those transactions that are stored with off-line authorization codes.

It should be understood that a normal terminal closing will result in all transaction data elements being deleted from memory (i.e., the terminal's memory is made available for new transactions), thereby freeing all memory for new transactions. Such a closing would be deemed a "complete" closing. However, those skilled in the art will understand that the steps of FIG. 32 may be modified to provide for a "partial" closing, whereby a portion of the terminal's free memory is allocated for a new batch of transactions, while a previous batch of transaction data is retained in memory, pending closing or other accounting reconciliation.

Once any data is transmitted, the method proceeds to step 1235, where the terminal causes the signature signals associated with the transactions just transmitted to the host to be deleted from the terminal's memory 258. The program then exits the subroutine 932 and re-enters the main loop awaiting further transactions or commands in FIG. 25.

Methods of Operation of Transaction Processing Systems Employing Preferred Terminal/Printer After the foregoing discussion, those skilled in the art will be enabled to construct a data card terminal/printer including a signature capture printer, with embossed card reader, having the ability to provide more information concerning a particular data card transaction than has heretofore been possible. Transaction processors will be able to enjoy the advantages provided by such a terminal/printer combination, or even merely certain subcombinations such as the signature capture printer, the restoration of unreadable or damaged data read from a first magnetic stripe track with data from a second magnetic stripe track or with data from the embossed card reader. Because of the additional confidence in the validity and collectability of a transaction afforded by use of the disclosed terminal/printer 30, it may be expected that transaction processors will be able to provide additional types of services on behalf of their merchant/customers, namely, the provision of chargeback protection for transactions conducted using the terminal.

Furthermore, a transaction processor, such as the transaction processor 12, that utilizes the present invention to capture and store the transaction data including signature signals on behalf of its customers/merchants will be able to provide valuable services on behalf of its customers. Such services include the retrieval of transaction data upon request of a card issuer or card issuing association, thereby eliminating any involvement of and inconvenience to the merchant, and by eliminating the need for the merchant to retain paper records of transactions.

Moreover, the disclosed terminal 30 facilitates the provision of off-line authorization capability by a transaction processor which also serves as an authorization source. In such cases, the inability of the terminal to communicate directly with the transaction processor's host to obtain on-line authorization does not preclude the transaction processor from providing chargeback protection for transactions that obtain an off-line authorization, as described herein.

Such advantages provided by use of the present invention will be described next.

Retrieval Request Processing Method

Turning now to FIG. 33, a method 1400 that is employed by a transaction processor host computer 40 to process a retrieval request will be described. A system constructed in accordance with the present invention facilitates retrieval requests by providing a method for storing information corresponding to transactions, including the signature, in a compact electronic form. Merchants who retain the services of a transaction processor that uses systems constructed in accordance with the present invention will find that they no longer have the need to store paper records of their data card transactions, since such data is stored electronically, paperlessly, in the database of the transaction processor. Transaction processors using the present invention can respond to retrieval requests on behalf their customers (e.g. merchants) quickly and efficiently since all data is stored in the transaction processor's host computer, allowing the transaction processor to provide a valuable service to the merchant.

Generally, the method 1400 in FIG. 33 allows a transaction processor to respond to a retrieval request without the involvement of the merchant. This is possible because the present invention insures that all of the transaction data, including the cardholder's signature, is recorded and stored by the transaction processor 12 in a data storage facility 64 (FIG. 2) such as a bank of disk drives, tape drives, optical drives, or the like.

Starting in FIG. 33 at step 1401, a transaction processor 12 receives a retrieval request from one of the card issuing associations 18a–d. This retrieval request contains certain identifying information such as a transaction reference number, cardholder account number, transaction date, and transaction amount. At step 1405, the host computer 40 of the transaction processor causes a receipt file stored in data storage 64 to be searched by the reference number (or other identifying information) contained in the retrieval request to locate a data item corresponding to the transaction in question. Once this data item, also considered a "receipt", is located, the method proceeds to step 1407.

At step 1407, the host computer causes a facsimile of the data item or receipt corresponding to the requested transaction to be printed by the transaction processor 12. Reproduction of the receipt generally involves printing all data associated with the transaction such as purchase amount, account number, expiration date, authorization number, merchant's product identifying or other inventory code, and cardholder signature. The cardholder signature of course is stored in its compressed form, so printing the receipt requires decompressing with the decompressor software 42 and reconstructing the strokes of the signature in the manner described in connection with FIG. 24.

Thus, the cardholder's signature is reproduced along with the other transaction data. The retrieved receipt is then printed at step 1407, and includes the reconstructed signature. At step 1409, the printed receipt containing the transaction data and signature is forwarded to the credit card issuing association or other entity that initiated the retrieval request.

Chargeback Processing Method

Turning now to FIG. 34, a method 1500 that is employed by the transaction processor host computer 40 in the preferred system to process a chargeback will be described. Generally, the preferred method 1500 allows a transaction processor that utilizes terminals 30 and software constructed according to the present invention to respond to most chargebacks without the involvement of the merchant. This is possible because a system constructed in accordance with the present invention insures that all of the transaction data, including the cardholder's signature, is recorded and stored by the transaction processor 12 in a storage facility 64. Use of the present invention therefore allows a transaction processor to assume the risk of certain types of chargebacks on behalf of its customers (merchants) if it so chooses, with a high level of confidence that the transaction was a valid one.

Starting in FIG. 34 at step 1501, the transaction processor 12 receives a chargeback from one of the credit card issuing association 18a-d or from another source within the chain of data card transaction communications. The method then proceeds to step 1505, where the host computer 40 determines whether the a copy of the transaction receipt will be needed in order to respond to the chargeback. This would be the case when a cardholder initiates a chargeback because he or she believes there is a discrepancy in the transaction data. It will be appreciated that certain types of chargebacks may require documentation in accordance with card issuing institution regulations, while others may not.

If a receipt is needed, the method proceeds to step 1507, where the host computer 40 causes the receipt file stored in data storage 64 to be searched by the reference number or other identifying information that is contained in the chargeback transaction, matching it against the reference number assigned by the transaction processor at the time the transaction is processed. This search process is identical to the search process conducted in connection with a retrieval request.

Once the receipt is located, at step 1510 the host computer causes a facsimile of the receipt corresponding to the disputed transaction to be printed. The receipt printed at this point will contain all of the transaction data including the signature, as in the case of a retrieval request. Once the receipt is printed at step 1510, the method proceeds to step 1513.

If at step 1505 it is determined that a copy of the receipt is not needed, or after the receipt is printed at step 1510, the method advances to step 1513. At step 1513, the host computer determines whether the chargeback is "retrieval related", that is, the chargeback must be responded to by retrieving and reproducing the transaction receipt. If the transaction is retrieval related, the method proceeds to step 1517, and the receipt and chargeback are returned to the card issuer that generated the chargeback transactions. If the chargeback is not retrieval related, the method proceeds instead to step 1520.

At step 1520, the host computer determines whether the chargeback is related to a customer dispute. If so, the method advances to step 1522, where the dispute is researched and, if the dispute appears valid, the responsibility for the chargeback is transferred to the merchant. It will be recalled that a customer dispute chargeback typically arises when the customer (cardholder) denies participating in a transaction, or is dissatisfied with the goods or services purchased. When possible, the transaction processor will refute cardholder disputes by using information obtained by the terminal, i.e., the card present indicator and/or the cardholder signature. In other cases, the transaction processor can not assume the risk of the chargeback, since the transaction processor has no control over disputes that arose from a customer (cardholder) of the merchant. Thus, it will be left to the merchant to refute charges related to these disputes.

If, at step 1520 the chargeback is determined not to have arisen from a customer dispute, the method proceeds to step 1525. At this step, the transaction processor 12 absorbs the loss associated with the chargeback or re-presents the transaction data to the issuer.

It will be appreciated that use of the preferred terminal/printer 30 can provide a transaction processor with substantial assistance in connection with a cardholder or customer dispute mainly when the cardholder can be assuaged with a copy of the receipt bearing his or her signature, and is satisfied that the signature is authentically his or hers, or is reminded (for example by reviewing the date, merchant name and location, etc.) that he or she actually participated in the transaction in question.

It will also be appreciated that use of the present invention minimizes what may be termed "technical chargebacks" to a merchant, and allows a transaction processor to offer to assume the risk of such chargebacks provided that the merchant uses a terminal constructed in accordance with the present invention. Technical chargebacks often result from erroneous keying in of transaction data, such as the account number or purchase amount, by the merchant. While the preferred terminal cannot assist the merchant in keying in the proper purchase amount, when coupled with known bar code scanners, connected to one of the RS-232 serial ports 208 associated with the terminal 35, the terminal can minimize amount entry errors.

By ensuring that a card is present during every transaction (such as by verifying the account number read from a second track and/or the embossed card reader against a first track's account number), obtaining an authorization from an authorization source, bar code scanning the UPC codes to obtain purchase amounts, automatically computing taxes and other discounts, and requiring that a signature be obtained before a transaction will be accepted at the terminal, systems constructed in accordance with the present invention provide transaction processors and their customers/merchants with high levels of assurance that a given transaction will not be charged back because of keying errors or other technical reasons. Furthermore, since the same transaction data is used for the initial transaction capture, authorization, clearing (closing), and settlement, use of systems and terminals constructed in accordance with the present invention reduces keying errors and thereby further minimizes the likelihood of a technical chargeback.

Off-Line Authorization System and Methods

Turning now to FIG. 35, a method 1600 that is employed to request an off-line authorization approval will be described. Generally, the method 1600 allows a merchant to obtain an authorization determination in the situation wherein the terminal is unable to communicate with the host or whenever a card issuer has issued a "call me" referral in order to speak with the merchant. The method illustrated in FIG. 35 is preferably implemented as a computer program operative in the audio response unit (ARU) 70 in the preferred transaction processing system 12 shown in FIG. 2.

Starting at step 1601, the program resident in the ARU 70 examines the number dialed (DNIS). Those skilled in the art will understand that many transaction processors utilize telecommunications services provided by private telecommunications firms (such as AT&T, US SPRINT, MCI, etc.) for connecting merchant terminals to their host systems. Such private telecommunications providers have the ability to identify calls originating with certain merchants by virtue of the phone number dialed in order to access a particular incoming telephone line. This capability is called by those skilled in the art as "DNIS". Essentially, DNIS comprises information available to the ARU 70 concerning the number dialed by an incoming call on a particular telephone line. DNIS typically allows identification of a particular merchant or category of merchant (for example, one category of merchant may include large retailers conducting business from a number of stores through a centralized facility) that is a customer of the transaction processor 12, as well as determination whether a merchant has DTMF-capable telephone equipment or rotary dial equipment.

Similarly, telecommunications features known as "automatic number identification" or "ANI" are also available from telecommunications providers. ANI-capable telecommunications results in the provision of information identifying the "calling number" or the telephone number from which the incoming telephone call originated. This information is provided at the beginning of an incoming telephone call and contains the telephone number of the originating telephone.

If at step 1601 the examined DNIS is one assigned to merchants with rotary telephones, the program proceeds to step 1605. If a non-rotary telephone number was dialed, the program then proceeds to step 1607.

At step 1607, the program checks the dialed number (DNIS) for one of a series of unique numbers assigned to specific merchants. If a match is found, the program proceeds to step 1610. At step 1610, the number is searched against a table of numbers in order to determine a merchant identification number which, in turn, is placed in the merchant number field of a host authorization transaction record. The program than proceeds to step 1613.

Returning to step 1607, if ANI has been provided by the telecommunications provider, the program will also check for the existence of a merchant number in a file ordered by the calling telephone number. If a match is found, the merchant number found will be inserted in the host authorization transaction record and the program will proceed to step 1613.

Returning to step 1607, if neither the number called nor the calling number is indicative of the merchant, the program will proceed to step 1613. At step 1613 the program causes the ARU to accept the sale amount and cardholder account number, if present in the form of DTMF signals from the terminal. In the event the data has not been presented by the merchant or by a data card terminal constructed in accordance with the present invention, with off-line transaction capability, the program will cause the ARU to request the data, one field at a time, where needed. If some data elements are already present, such as the merchant number, this field will not be requested. Similarly, individual fields may be re-requested in an iterative process if subsequent validation logic detects errors or omissions. The program then proceeds to step 1619.

At step 1619, the ARU program tests for the receipt of any DTMF tones. If none are found (as where a merchant used a rotary phone or opted to ignore TOUCH-TONE® response requests), the program proceeds to step 1605. If DTMF tones were received, the program proceeds to step 1621.

At step 1621, the program checks each field for a variety of conditions, depending on the individual fields. Among these are field length, numeric content, reasonableness, and, in the case of a cardholder account number, check digit verification. If an error is found in any field, the program proceeds to step 1625 before proceeding to edit the next field.

At step 1625, the program checks for the validation status of each field. If an error is found, the program proceeds to step 1628.

At step 1628, a program counter is checked to determine if previous attempts have been made within the current transaction to re-request the erroneous field. If there have been previous attempts, the number of attempts is compared to a program constant to control the number of iterations of requests. Currently, the preferred value of this constant is '2', allowing two attempts at obtaining the data for each field. The preferred program, however, allows for ease of changing the value of this constant based on experience gained in the operation of the system. If the maximum number of attempts has been made and a validation error condition still exists, the program will proceed to step 1605. If the maximum number of attempts have not been made, the program will return to step 16 13 to re-request the data for the field in error.

Returning to step 1625, if the program has determined that all data fields have passed all the edit criteria, the program then proceeds to step 1630.

At step 1630 the program checks for the availability of the mainframe host authorization computer. If communications with the host computer are not able to be established, the host computer is deemed to be not available and the program proceed to step 1633.

At step 1633 the program compares the sale amount of the host authorization transaction to a program constant identified as a floor limit. If the sale amount is greater than the floor limit, the program proceeds to step 1635. If the sale amount is equal or less than the floor limit, the program proceeds to step 1640.

At step 1640, the program generates an authorization approval code and proceeds to step 1680.

Returning to step 1630, if the program is able to communicate with the host computer, the host is deemed to be available and the program proceeds to step 1650. At step 1650, the host authorization transaction is transmitted to the host computer and when a response is received, the program proceeds to step 1652.

At step 1652, the authorization response received from the host computer is analyzed in order to determine the ensuing steps to be taken. If the response was an approval, the program proceeds to step 1655.

At step 1655, the program edits the authorization response code received from the host computer. Once the response code is received from the authorization source, the program substitutes any alphabetic characters in the low-order, or terminating position of the authorization code with a zero. The two low-order positions of the authorization code are then moved to the ARU response code field and the program proceeds to step 1680.

At step 1680, the program checks the number dialed to determine if the transaction originated from a data card terminal constructed in accordance with the present invention with off-line authorization transaction generation capability. If it did, the program then proceeds to step 1681.

At step 1681, the program calculates a check digit based on information that is already contained in the terminal, such as the account number, expiration date, purchase amount, transaction date, etc., and appends it to the end of the two-digit ARU response code, to form a three-digit approval code. The ARU response code thus formed is stored by the ARU in a manner that corresponds with the authorization indicia that was received from the authorization source, so that the authorization indicia may subsequently be associated with the transaction. The program then proceeds to step 1682.

Returning to step 1680, if the program determines from the number dialed (DNIS) that the transaction did not originate at a data terminal constructed in accordance with the present invention with off-line authorization capability, the program proceeds to step 1682.

At step 1682, the program causes the ARU to speak an approval message along with the original sale amount and the three-digit ARU approval code. Currently, the preferred form of this message is "Your approval for X dollars is Y", where X is the original sale amount and Y is the three-digit ARU approval code or indicia (including the check digit). The form and content of this message may be varied from time to time to promote better comprehension by the merchant while keeping the duration of the message as short as possible, consistent with the need for comprehension by the merchant. The program then proceeds to step 1685.

At step 1685, the program causes the ARU to pause approximately three seconds before proceeding to step 1688. The time interval may be changed from time to time to accommodate the needs of merchants that may not have heard, comprehended, or noted the response issued at 1682.

At step 1688, the approval message spoken at step 1682 is repeated, the call is disconnected, and then the program exits the routine.

At step 1605 the program causes the ARU to accept the sale amount, cardholder number, through the use of voice recognition circuitry in the ARU. In the event the data has not been presented by the merchant via a data card terminal constructed in accordance with the present invention, having off-line authorization capability, the program will cause the ARU to request the data, one field at a time, where needed. If some data elements are already present, such as the merchant number, this field will not be requested. Similarly, individual fields may be re-requested in an iterative process if subsequent validation logic detects errors or omissions. The program then proceeds to step 1691.

At step 1691 the program checks each field for a variety of conditions, depending on the individual fields. Among these are field length, numeric content, reasonableness, and, in the case of a cardholder number, check digit verification. If an error is found in any field, the program proceeds to step 1693 before proceeding to edit the next field.

At step 1693, the program checks for the validation status of each field. If an error is found, the program proceeds to step 1695.

At step 1695, a program counter is checked to determine if previous attempts have been made within the current transaction to re-request the erroneous field. If there have been previous attempts, the number of attempts is compared to one of two program constants to control the number of iterations of requests. Currently, the preferred value of these constants are '2' and '3', allowing two or three attempts at obtaining the data for each field. If no DTMF tones were ever received, the constant '3' is used to control the number of iterations. If DTMF tones were detected, the constant '2' is used. The preferred program is written to allow for ease of changing the value of these constants based on experience gained in the operation of the off-line authorization system.

If the maximum allowed number of attempts has been made and a validation error condition still exists, the program will proceed to step 1635. If the maximum number of attempts have not been made, the program will return to step 1605 to re-request the data for the field in error.

Returning to step 1693, the program has determined that all data fields have passed all the edit criteria, the program than proceeds to step 1630.

Returning now to step 1652, if the authorization response received from the host computer was a "decline", the program then proceeds to step 1697. At step 1697, the program causes the ARU to speak a "decline" message of the currently preferred form, "Your customer's bank has declined this transaction", disconnect the call, and then exits. The form and content of this message may vary from time to time to accommodate the need for comprehension by the merchant.

Returning again to step 1652, if the authorization response received from the host computer was a "referral", the program then proceeds to step 1635. At step 1635, the program causes the ARU to speak a "referral" message of the form "Please hold", then automatically transfers the call, along with identifying data, to an operator in the voice services department 72 (FIG. 2). The program then exits.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A data card transaction terminal operative for communicating information corresponding to a data card transaction, comprising:
   card leading means for obtaining card identifying information from an information source associated with a data card;
   means for setting a terminal parameter:
   means responsive to said terminal parameter and the nature of transaction data associated with the data card transaction for providing a transaction protected flag associated with said transaction; and
   communication means for communicating said card identifying information and said transaction protected flag to a remote transaction processor.

2. The terminal of claim 1, wherein said card identifying information obtaining means comprises means for reading a magnetic stripe associated with the data card.

3. The terminal of claim 1, wherein said card identifying information obtaining means comprises means for detecting embossed characters formed in the data card.

4. The terminal of claim 1, further comprising authorization means for requesting transaction authorization indicia from an authorization source.

5. The terminal of claim 1, wherein said card identifying information is provided in a plurality of sources on the data card,
   wherein said card reading means is operative for obtaining said card identifying information from a first source of said plurality of sources and from a second source of said plurality of sources; and further comprising:

means for verifying the accuracy of card identifying information obtained from said first source;

means for restoring at least a portion of said card identifying information obtained from said first source with information obtained from said second source in response to a determination by said verifying means that said card identifying information obtained from said first source is not accurate.

6. The terminal of claim 5, wherein said first source comprises a magnetic stripe, and wherein said second source comprises embossed characters.

7. The terminal of claim 6, wherein said card identifying information comprises an account number associated with the data card, and wherein said verifying means comprises means for computing a longitudinal redundancy check (LRC) associated with said magnetic stripe, and wherein said restoring means is operative for restoring at least a portion of the account number read from said magnetic stripe with at least a portion of the account number read from said embossed characters if said verifying means determines that data read from said magnetic stripe is not accurate or complete.

8. The terminal of claim 5, wherein said first source comprises a first track associated with a magnetic stripe on the data card, and wherein said second source comprises a second track associated with the magnetic stripe on the data card.

9. The terminal of claim 8, wherein said card identifying information comprises an account number associated with the data card, and wherein said verifying means comprises means for computing a longitudinal redundancy check (LRC) associated with said first track, and wherein said restoring means is operative for restoring at least a portion of the account number read from said first track with at least a portion of the account number read from said second track if said verifying means determines that data read from said first track is not accurate or complete.

10. The terminal of claim 1, wherein said terminal parameter is selected from a group comprising a chargeback protection flag, an embossed reader flag, and a signature capture flag.

11. The terminal of claim 1, wherein said transaction data includes said card identifying information.

12. The terminal of claim 1, further comprising signature means for capturing a signature of a customer in connection with a proposed transaction and for providing signature signals, said signature signals being communicated to said remote transaction processor by said communication means; and wherein said transaction data includes said signature signals.

13. The terminal of claim 1, further comprising card detecting means for detecting the physical presence of a data card presented in connection with a proposed transaction and for providing a card present signal; and wherein said transaction data includes said card present signal.

14. The terminal of claim 13, wherein said card detecting means comprises means for reading a magnetic stripe associated with the data card.

15. The terminal of claim 13, wherein said card detecting means comprises means for detecting embossed characters formed in the data card.

16. The terminal of claim 1, wherein said terminal parameter comprises a card type flag associated with a particular type of data card accepted by the terminal, and a chargeback protection flag associated with said card type flag, said chargeback protection flag indicative of whether transactions conducted with said particular type of data card are chargeback protected.

17. The terminal of claim 16, wherein said communication means is operative for receiving indicia transmitted from a remote location for selectively setting said chargeback protection flag.

18. The terminal of claim 1, wherein said communication means is operative for receiving transaction authorization indicia from a remotely located authorization source, and wherein said transaction data includes said authorization indicia.

19. A data card transaction terminal, comprising:

means for reading a magnetic stripe associated with a data card presented in connection with a proposed transaction and for providing card identifying information;

embossed card reader means for detecting embossed characters formed in the data card and for providing card identifying information;

signature means for capturing a signature of a cardholder in connection with said proposed transaction and for providing signature signals;

means for setting a terminal parameter;

means responsive to said terminal parameter and the nature of transaction data associated with the proposed transaction for providing a transaction protected flag associated with said proposed transaction; and communication means for communicating said card identifying information and said transaction protected flag to a remote transaction processor.

20. The terminal of claim 19, further comprising means for detecting the physical presence of a data card at the terminal and for providing a card present flag; and wherein said transaction data is selected from a group comprising said card present flag, said signature signals provided by said signature means, and said card identifying information from said magnetic stripe reading means or said embossed characters detecting means.

21. The terminal of claim 20, wherein said communication means is operative for requesting and receiving an authorization indicia from an authorization source, and wherein said group of transaction data further comprises said authorization indicia.

22. The terminal of claim 20, wherein said card present detecting means comprises said magnetic stripe reading means.

23. The terminal of claim 20, wherein said card present detecting means comprises said embossed card reader means.

24. The terminal of claim 20, wherein said transaction protected flag providing means is responsive to a plurality of said transaction data.

25. The terminal of claim 19, wherein said signals communicated to said remote transaction processor include an authorization request signal for requesting authorization indicia from an authorization source, and wherein said communication means is operative for communicating said authorization request signal to an authorization source as a request for authorization indicia.

26. The terminal of claim 25, wherein said signals communicated to said remote transaction processor include said signature signals and transaction information signals, and wherein said communication means is operative for transmitting said signature signals and said transaction information signals to said remote transaction processor while the terminal is communicating with said transaction processor for requesting said authorization indicia.

27. The terminal of claim 26, further comprising memory means for storing said signature signals and said transaction information signals as a transaction record in a transaction batch, and wherein said communication means is operative for transmitting said transaction batch to said remote transaction processor during a communications session.

28. The terminal of claim 27, wherein said communication means is operative for communicating a transaction record associated with a transaction being conducted at the terminal during an authorization communications session when said communication means communicates with said remote transaction processor for requesting said authorization indicia, and is alternatively operative for transmitting said transaction record to said remote transaction processor during a subsequent communications session in the event that the terminal is unable to communicate with the remote transaction processor during said authorization communications session.

29. The terminal of claim 19, wherein said card identifying information comprises an account number associated with the data card.

30. The terminal of claim 19, wherein said magnetic stripe reading means comprises means for reading a first track of information stored on the magnetic stripe of a data card and means for reading a second track of information stored on the magnetic stripe of the data card, said first track and said second track including said card identifying information, and further comprising means for restoring a portion of said card identifying information read from said first track with card identifying information read from said second track.

31. The terminal of claim 30, wherein said card identifying information provided by said magnetic stripe reading means comprises an account number associated with the data card, and further comprising means for verifying the accuracy of the data read from said first track, and wherein said restoring means is operative for restoring at least a portion of the account number read from said first track with at least a portion of the account number read from said second track if said verifying means detects that the data read from said first track is not accurate or complete.

32. The terminal of claim 31, wherein said verifying means comprises longitudinal redundancy check (LRC) means.

33. The terminal of claim 31, wherein said verifying means comprises means for validating a checksum digit associated with the account number.

34. The terminal of claim 19, further comprising means for restoring at least a portion of said card identifying information read from said magnetic stripe reading means with at least a portion of said card identifying information provided by said embossed card reader means.

35. The terminal of claim 34, further comprising means for verifying the accuracy of said card identifying information provided by said magnetic stripe reading means, and wherein said restoring means is operative for restoring at least a portion of card identifying information provided by said magnetic stripe reading means with at least a portion of said card identifying information provided by said embossed card reader means if said verifying means detects that said card identifying information provided by said magnetic stripe reading means is not accurate.

36. The terminal of claim 35, wherein said verifying means comprises longitudinal redundancy check (LRC) means.

37. The terminal of claim 35, wherein said verifying means comprises means for validating a checksum digit associated with the account number.

38. The terminal of claim 19, wherein said transaction data comprises said card identifying information.

39. The terminal of claim 19, wherein said transaction data comprises said signature signals.

40. The terminal of claim 19, wherein said terminal parameter is selected from a group comprising a chargeback protection flag, an embossed reader flag and a signature capture flag.

41. A data card transaction terminal, comprising:
means for detecting the physical presence of a data card at a data card terminal at which a transaction is recorded and for providing a card present flag;
said data card terminal being operative for obtaining transaction information corresponding to said transaction;
means for electronically obtaining card identifying information relating to the data card from an information carrying medium associated with the data card;
means for capturing a signature provided by a holder of the data card who is purportedly authorized to conduct a transaction with the data card and for providing signature signals corresponding to the signature;
means for setting a terminal parameter; and
means responsive to said terminal parameter and the nature of transaction data associated with the transaction for providing a transaction protected flag associated with said transaction information said transaction data selected from the group comprising said card present flag, said signature signals, and said card identifying information from said card identifying information obtaining means.

42. The terminal of claim 41, wherein said card identifying information comprises an account number associated with the data card.

43. The terminal of claim 41, wherein said card identifying information is stored on a magnetic stripe associated with the data card, and wherein said card identifying information obtaining means comprises magnetic stripe reading means operative to obtain at least a portion of said card identifying information from the data card.

44. The terminal of claim 43, wherein said magnetic stripe reading means comprises means for reading a first track of information stored on the magnetic stripe of the data card and means for reading a second track of information stored on the magnetic stripe of the data card, said first track and said second track including said card identifying information, and further comprising means for restoring at least a portion of said card identifying information read from said first track with card identifying information read from said second track.

45. The terminal of claim 44, wherein said card identifying information comprises an account number and/or an expiration date associated with the data card, and further comprising means for verifying the accuracy of the data read from said first track, and wherein said restoring means is operative for restoring at least a portion of the account number and/or the expiration date read from said first track with at least a portion of the account number and/or the expiration date read from said second track if said verifying means detects that the data read from said first track is not accurate.

46. The terminal of claim 45, wherein said verifying means comprises longitudinal redundancy check (LRC) means.

47. The terminal of claim 44, wherein said card identifying information comprises an account number associated with the data card, and further comprising means for verifying the accuracy of the account number read from said first track, and wherein said restoring means is operative for restoring at least a portion of the account number read from said first track with at least a portion of the account number read from said second track if said verifying means detects that the account number read from said first track is not accurate.

48. The terminal of claim 47, wherein said verifying means comprises means for validating a checksum digit associated with the account number.

49. The terminal of claim 43, wherein said card identifying information obtaining means further comprises an embossed card reader operative to obtain at least a portion of said card identifying information from an embossed character region of the data card, and further comprising means for restoring at least a portion of said card identifying information obtained by said magnetic stripe reading means with card identifying information obtained by said embossed card reader.

50. The terminal of claim 49, wherein said card identifying information comprises an account number and/or an expiration date associated with the data card, and further comprising means for verifying the accuracy of the data read by said magnetic stripe reading means, and wherein said restoring means is operative for restoring at least a portion of the account number and/or the expiration date read by said magnetic stripe reading means with at least a portion of the account number and/or the expiration date read by said embossed card reader if said verifying means detects that the data read from said first track is not accurate.

51. The terminal of claim 41, wherein said card identifying information is embossed in an embossed character region on the data card, and wherein said card identifying information obtaining means comprises an embossed card reader operative to obtain at least a portion of said card identifying information from the embossed character region of the data card.

52. The terminal of claim 51, wherein said embossed card reader comprises:
means for detecting the insertion of an embossed data card and for providing a card inserted signal;
a tactile imaging array for providing matrix signals corresponding to the impression of a contacted object;
contacting means responsive to said card inserted signal for causing said tactile imaging array to operatively contact with the embossed character region of the inserted data card; and
means responsive for interpreting said matrix signals from said tactile imaging array and for providing a data output corresponding to the embossed characters in said embossed character region.

53. The terminal of claim 52, wherein said contacting means comprises:
a pressure plate comprising a pressure applying region corresponding to the embossed character region of the inserted data card; and
means for biasing said pressure plate against the inserted data card,
whereby said tactile imaging array contacts with the embossed region of the inserted data card when said pressure plate is biased by said biasing means.

54. The terminal of claim 53, wherein said contacting means further comprises:
a drive motor;
a first switch operative to be actuated upon insertion of the data card and apply power to said drive motor; and
cam means rotatably attached to said drive motor for releasing said pressure plate to be biased by said biasing means,
such that said pressure plate is held away from said tactile imaging array when no card is present.

55. The terminal of claim 54, further comprising a first switch actuating arm for initially contacting an inserted data card and for actuating said first switch.

56. The terminal of claim 54, wherein said cam means comprises a cam shaft operative to rotate in response to motion by said drive motor.

57. The terminal of claim 56, wherein said cam shaft assumes an initial position such that an edge of said pressure plate is lowered to facilitate insertion of the data card, and a halfway position that allows said pressure plate to pivot against the inserted data card.

58. The terminal of claim 54, further comprising:
a pressure plate actuating arm operatively connected to said pressure plate; and
a second switch positioned to be actuated by said pressure plate actuating arm, for removing power from said drive motor upon completion of movement of said cam means.

59. The terminal of claim 54, wherein said pressure plate is pivoted by said cam means to bring said pressure applying region into contact with the inserted data card.

60. The terminal of claim 51, wherein said card identifying information is also stored on a magnetic stripe associated with the data card, wherein said card identifying information obtaining means further comprises magnetic stripe reading means operative to obtain at least a portion of said card identifying information from the data card, and further comprising:
means for restoring at least a portion of said card identifying information read from said magnetic stripe reading means with at least a portion of said card identifying information provided by said embossed card reader.

61. The terminal of claim 41, wherein said card present flag comprises information indicative that said card identifying information obtaining means successfully obtained said card identifying information electronically from the data card.

62. The terminal of claim 61, wherein said card identifying information obtaining means comprises a magnetic stripe reader for obtaining said card identifying information from a magnetic stripe on the data card.

63. The terminal of claim 61, wherein said card identifying information obtaining means comprises an embossed card reader for obtaining said card identifying information from an embossed character region on the data card.

64. The terminal of claim 41, wherein said card identifying information is provided in a plurality of sources on the data card,
wherein said card identifying information obtaining means comprises means for obtaining said card identifying information from a first source of said plurality of sources and from a second source of said plurality of sources; and further comprising:
means for verifying the accuracy of card identifying information obtained from said first source;
means for restoring at least a portion of said card identifying information obtained from said first source with information obtained from said second source in response to a determination by said verifying means that said card identifying information obtained from said first source is not accurate or complete.

65. The terminal of claim 64, wherein said first source comprises a magnetic stripe, and wherein said second source comprises embossed characters.

66. The terminal of claim 65, wherein said card identifying information comprises an account number associated with the data card, and wherein said verifying means comprises means for checking a checksum associated with said account number, and wherein said restoring means is operative for restoring at least a portion of the account number read from said magnetic stripe with at least a portion of the account number read from said embossed characters.

67. The terminal of claim 64, wherein said first source comprises a first track associated with a magnetic stripe on the data card, and wherein said second source comprises a second track associated with the magnetic stripe on the data card.

68. The terminal of claim 41, further comprising communication means for communicating said transaction information, said signature signals, and said transaction protected flag from said data card terminal to a remote transaction processing means.

69. The terminal of claim 68, further comprising chargeback protection flag means associated with said data card terminal for providing a chargeback protection flag indicative of whether transactions conducted with said data card terminal are chargeback protected, and wherein said communication means is operative for receiving indicia transmitted from a remote location for selectively setting said chargeback protection flag.

70. The terminal of claim 69, wherein said transaction protected flag means is further responsive to the state of said chargeback protection flag for providing said transaction protected flag.

71. The terminal of claim 68, wherein said communication means is operative for receiving transaction authorization indicia from a remotely located authorization source, and
wherein said transaction protected flag providing means is responsive to said authorization indicia, said card present flag, said signature signals, and said card identifying information from said card identifying information obtaining means for providing said transaction protected flag.

72. The terminal of claim 71, further comprising chargeback protection flag means for providing a chargeback protection flag indicative of whether transactions conducted with said data card terminal are chargeback protected, and wherein said transaction protected flag means is further responsive to the state of said chargeback protection flag for providing said transaction protected flag.

73. The terminal of claim 72, wherein said communication means is operative for receiving indicia transmitted from a remote location for selectively setting said chargeback protection flag.

74. The terminal of claim 71, wherein said remotely located authorization source comprises a computer system associated with a transaction processor, card issuing association, or a card issuer.

75. The terminal of claim 71, wherein said transaction processor host computer system operates as said authorization source, wherein said data card terminal communicates with said transaction processor host computer system for obtaining said authorization indicia, and wherein said data card terminal is operative for transmitting said signature signals, said transaction protected flag, and said transaction information to said transaction processor host computer system while said data card terminal is communicating with said host computer system for obtaining said authorization indicia.

76. The terminal of claim 75, further comprising memory means in said data card terminal for storing said signature signals, said transaction protected flag, and said transaction information as a transaction record in a transaction batch, and wherein said data card terminal is operative for transmitting said transaction batch to said transaction processor host computer system during a communications session.

77. The terminal of claim 76, wherein said data card terminal is operative for communicating a transaction record associated with a transaction being conducted at the data card terminal during an authorization communications session when said data card terminal communicates with said transaction processor host computer system for obtaining said authorization indicia, and is alternatively operative for transmitting said transaction record to said transaction processor host computer system during a subsequent communications session in the event that said data card terminal is unable to communicate with said transaction processor host computer system during an authorization communications session.

78. The terminal of claim 41, wherein said signature capturing means comprises:
a stylus;
a signature capturing window in which the card holder enters a signature with said stylus;
digitizer means for providing coordinate position signals of said stylus with respect to said signature capturing window;
means for compressing said coordinate position signals and for providing compressed signature signals.

79. The terminal of claim 78, wherein said compressed signature signals comprise digital signals.

80. The terminal of claim 78, further comprising contact signal means for providing a contact signal indicative of the stylus being in operative contact with said signature capturing window, and
stroke detecting means responsive to said contact signal for causing said compressing means to provide a stroke signal indicative of the starting coordinate and the final coordinate of each stroke of a signature.

81. The terminal of claim 80, further comprising stroke counting means for providing a stroke count signal corresponding to the number of strokes in a signature, and wherein said signature signals comprise said stroke count signal and a plurality of coordinate position difference signals corresponding to differences between said coordinate position signals provided by said digitizer means.

82. The terminal of claim 78, wherein said compressing means comprises:
means for providing a stroke started signal;
means for providing a stroke completed signal;
means for determining a number N of strokes in a signature, a stroke being determined by an initial starting coordinate provided in response to said stroke started signal and a final coordinate provided in response to said stroke completed signal;
means for providing, for each stroke of the N strokes in said signature, compressed output signals comprising a difference between a first coordinate position signal provided at a first sample time from said digitizer means and a second coordinate position signal provided at a second sample time from said digitizer means.

83. The terminal of claim 82, wherein said compressed output signals comprise an a bit digital code as the output signal if the difference between said first coordinate position signal and said second coordinate position signal is less than a first predetermined value; and
a b bit digital code as the output signal if the difference between said first coordinate position signal and said second coordinate position signal is greater than said first predetermined value but less than a second predetermined value, where a is less than b.

84. The terminal of claim 41, wherein said transaction protected flag providing means is responsive to a plurality of said transaction data.

85. The terminal of claim 41, wherein said terminal parameter is selected from a group comprising a chargeback protection flag, an embossed reader flag and a signature capture flag.

86. A transaction terminal operative for communicating information corresponding to a transaction concurrently with the transaction, comprising:
transaction means for obtaining transaction information corresponding to a proposed transaction;
signature means for capturing a signature of a customer in connection with the proposed transaction and for providing signature signals;
memory means for storing said signature signals and said transaction information; and
communication means for attempting to communicate said transaction information and said signature signals to a remote transaction processor via a first communications link during an initial time period substantially concurrently with the transaction,
said communication means being further operative for attempting to communicate said transaction information to said remote transaction processor via a second communications link during said initial time period in response to failure to establish said first communications link,
said memory means operative to retain said signature signals in the event that said communication means is unable to communicate same to said remote transaction processor during said initial time period,
said communication means being further operative for attempting to communicate said signature signals to said remote transaction processor during a second time period subsequent to said initial time period in the event that said signals were not communicated during said initial time period.

87. The transaction terminal of claim 86, wherein said communication means comprises data communications circuitry operative to:
dial a host computer when attempting to communicate said transaction information and said signature signals via said first communications link, and
dial an audio response unit (ARU) when attempting to communicate said transaction information via said second communications link.

88. A data card transaction terminal operative for communicating information corresponding to a data card transaction, comprising:
card reading means for obtaining card identifying information, said card identifying information being provided in a plurality of sources on the data card, and wherein said card reading means is operative for obtaining said card identifying information from a first source of said plurality of sources and from a second source of said plurality of sources;
means for verifying the accuracy of card identifying information obtained from said first source;
means for restoring at least a portion of said card identifying information obtained from said first source with information obtained from said second source in response to a determination by said verifying means that said card identifying information obtained from said first source is not accurate; and
communication means for communicating said card identifying information to a remote transaction processor.

89. The terminal of claim 88, wherein said first source comprises a magnetic stripe, and wherein said second source comprises embossed characters.

90. The terminal of claim 89, wherein said card identifying information comprises an account number associated with the data card, and wherein said verifying means comprises means for computing a longitudinal redundancy check (LRC) associated with said magnetic stripe, and wherein said restoring means is operative for restoring at least a portion of the account number read from said magnetic stripe with at least a portion of the account number read from said embossed characters if said verifying means determines that data read from said magnetic stripe is not accurate or complete.

91. The terminal of claim 88, wherein said fast source comprises a first track associated with a magnetic stripe on the data card, and wherein said second source comprises a second track associated with the magnetic stripe on the data card.

92. The terminal of claim 91, wherein said card identifying information comprises an account number associated with the data card, and wherein said verifying means comprises means for computing a longitudinal redundancy check (LRC) associated with said first track, and wherein said restoring means is operative for restoring at least a portion of the account number read from said first track with at least a portion of the account number read from said second track if said verifying means determines that data read from said first track is not accurate or complete.

93. A data card transaction terminal, comprising:
means for reading a magnetic stripe associated with a data card presented in connection with a proposed transaction and for providing card identifying information, said magnetic stripe reading means including means for reading a first track of information stored on the magnetic stripe of a data card and means for reading a second track of information stored on the magnetic stripe of the data card, said first track and said second track including said card identifying information;
means for restoring a portion of said card identifying information read from said first track with card identifying information read from said second track; and
communication means for communicating signals associated with a data card transaction to a remote transaction processor.

94. The terminal of claim 93, wherein said card identifying information provided by said magnetic stripe reading means comprises an account number associated with the data card, and further comprising means for verifying the accuracy of the data read from said first track, and wherein said restoring means is operative for restoring at least a portion of the account number read from said first track with at least a portion of the account number read from said second track if said verifying means detects that the data read from said first track is not accurate or complete.

95. The terminal of claim 94, wherein said verifying means comprises longitudinal redundancy check (LRC) means.

96. The terminal of claim 94, wherein said verifying means comprises means for validating a checksum digit associated with the account number.

97. A data card transaction terminal, comprising:
means for reading a magnetic stripe associated with a data card presented in connection with a proposed transaction and for providing card identifying information;
embossed card reader means for detecting embossed characters formed in the data card and for providing card identifying information;
means for restoring at least a portion of said card identifying information read from said magnetic stripe reading means with at least a portion of said card identifying information provided by said embossed card reader means; and
communication means for communicating signals associated with a data card transaction to a remote transaction processor.

98. The terminal of claim 97, further comprising means for verifying the accuracy of said card identifying information provided by said magnetic stripe reading means, and wherein said restoring means is operative for restoring at least a portion of card identifying information provided by said magnetic stripe reading means with at least a portion of said card identifying information provided by said embossed card reader means if said verifying means detects that said card identifying information provided by said magnetic stripe reading means is not accurate.

99. The terminal of claim 98, wherein said verifying means comprises longitudinal redundancy check (LRC) means.

100. The terminal of claim 98, wherein said verifying means comprises means for validating a checksum digit associated with the account number.

101. A data card transaction terminal, comprising:
means for detecting the physical presence of a data card at a data card terminal at which a transaction is recorded and for providing a card present flag, said data card terminal being operative for obtaining transaction information corresponding to the particular transaction;
means for electronically obtaining card identifying information relating to the data card, said card identifying information being provided in a plurality of sources on the data card, said card identifying information obtaining means including means for obtaining said card identifying information from a first source of said plurality of sources and from a second source of said plurality of sources;
means for verifying the accuracy of card identifying information obtained from said first source;
means for restoring at least a portion of said card identifying information obtained from said first source with information obtained from said second source in response to a determination by said verifying means that said card identifying information obtained from said first source is not accurate or complete; and
means responsive to said card present flag and said card identifying information from said card identifying information obtaining means for providing a transaction protected flag associated with said transaction information.

102. The terminal of claim 101, wherein said first source comprises a magnetic stripe, and wherein said second source comprises embossed characters.

103. The terminal of claim 102, wherein said card identifying information comprises an account number associated with the data card, and wherein said verifying means comprises means for checking a checksum associated with said account number, and wherein said restoring means is operative for restoring at least a portion of the account number read from said magnetic stripe with at least a portion of the account number read from said embossed characters.

104. The terminal of claim 101, wherein said first source comprises a first track associated with a magnetic stripe on the data card, and wherein said second source comprises a second track associated with the magnetic stripe on the data card.

105. A data card transaction terminal, comprising:
means for detecting the physical presence of a data card at a data card terminal at which a transaction is recorded and for providing a card present flag, said data card terminal being operative for obtaining transaction information corresponding to the particular transaction;
means for electronically obtaining card identifying information relating to the data card from an information carrying medium associated with the data card;
means for capturing a signature provided by a holder of the data card who is purportedly authorized to conduct a transaction with the data card and for providing signature signals corresponding to the signature;
means responsive to said card present flag, said signature signals, and said card identifying information from said card identifying information obtaining means for providing a transaction protected flag associated with said transaction information;

means for communicating said transaction information, said signature signals, and said transaction protected flag from said data card terminal to a remote transaction processing means; and chargeback protection flag means associated with said data card terminal for providing a chargeback protection flag indicative of whether transactions conducted with said data card terminal are chargeback protected, said communicating means being operative for receiving indicia transmitted from a remote location for selectively setting said chargeback protection flag.

106. The terminal of claim 105, wherein said transaction protected flag means is further responsive to the state of said chargeback protection flag for providing said transaction protected flag.

107. The terminal of claim 105, wherein said communicating means is operative for receiving transaction authorization indicia from a remotely located authorization source, and wherein said transaction protected flag providing means is responsive to said authorization indicia, said card present flag, said signature signals, and said card identifying information for providing said transaction protected flag.

108. The terminal of claim 107, wherein said remotely located authorization source comprises a computer system associated with a transaction processor, a card issuing association, or a card issuer.

109. The terminal of claim 107, wherein a transaction processor host computer system operates as said authorization source, wherein said data card terminal communicates with said transaction processor host computer system for obtaining said authorization indicia, and wherein said data card terminal is operative for transmitting said signature signals, said transaction protected flag, and said transaction information to said transaction processor host computer system while said data card terminal is communicating with said host computer system for obtaining said authorization indicia.

110. The terminal of claim 109, further comprising memory means in said data card terminal for storing said signature signals, said transaction protected flag, and said transaction information as a transaction record in a transaction batch, and wherein said data card terminal is operative for transmitting said transaction batch to said transaction processor host computer system during a communications session.

111. The terminal of claim 109, wherein said data card terminal is operative for communicating a transaction record associated with a transaction being conducted at the data card terminal during an authorization communications session when said data card terminal communicates with said transaction processor host computer system for obtaining said authorization indicia, and is alternatively operative for transmitting said transaction record to said transaction processor host computer system during a subsequent communications session in the event that said data card terminal is unable to communicate with said transaction processor host computer system during an authorization communications session.

112. A data card transaction terminal, comprising:
means for reading a magnetic stripe associated with a data card presented in connection with a proposed transaction and for providing card identifying information, said magnetic stripe reading means including means for reading a first track of information stored on the magnetic stripe and means for reading a second track of information stored on the magnetic stripe, said first track and said second track including said card identifying information;

means for restoring a portion of said card identifying information read from said first track with card identifying information read from said second track;

means for obtaining transaction information; and communication means for communicating signals associated with a data card transaction to a remote transaction processor.

113. The terminal of claim 112, further comprising means for verifying the accuracy of data read from said first track, and wherein said restoring means is operative for restoring at least a portion of the account number read from said first track with at least a portion of the account number read from said second track if said verifying means detects that the data read from said first track is not accurate.

114. The terminal of claim 113, wherein said verifying means comprises longitudinal redundancy check (LRC) means.

115. A data card transaction terminal, comprising:
means for reading a magnetic stripe associated with a data card presented in connection with a proposed transaction and for providing card identifying information;

embossed card reader means for detecting embossed characters formed in the data card and for providing card identifying information;

means for restoring at least a portion of said card identifying information read from said magnetic stripe with at least a portion of said card identifying information read from said embossed characters;

means for obtaining transaction information; and communication means for communicating signals associated with a data card transaction to a remote transaction processor.

116. The terminal of claim 115, further comprising means for verifying the accuracy of said card identifying information provided by said magnetic stripe reading means, and wherein said restoring means is operative for restoring at least a portion of card identifying information provided by said magnetic stripe reading means with at least a portion of said card identifying information provided by said embossed card reader means if said verifying means detects that said card identifying information provided by said magnetic stripe reading means is not accurate.

117. A data card transaction terminal, comprising:
means for reading a magnetic stripe associated with a data card presented in connection with a proposed transaction and for providing card identifying information;

signature means for capturing a signature of a cardholder in connection with a proposed transaction and for providing signature signals; and communication means for communicating signals associated with a data card transaction to a remote location, said communicated signals including transaction information signals, said signature signals and an authorization request signal for requesting authorization indicia from an authorization source associated with said remote location;

said communication means being operative for communicating said authorization request signal to said authorization source as a request for authorization indicia; and said communication means being operative for transmitting said signature signals and said transaction information signals to said remote location while the terminal is communicating with said remote location for requesting said authorization indicia.

118. The terminal of claim 117, wherein said remote location comprises a transaction processor.

119. The terminal of claim 117, wherein said remote location comprises an authorization source.

120. The terminal of claim 119, wherein said authorization source comprises a transaction processor.

121. The terminal of claim 117, further comprising memory means for storing said signature signals and said transaction information signals as a transaction record in a transaction batch, and wherein said communication means is operative for transmitting said transaction batch to said remote location during a communications session.

122. The terminal of claim 121, wherein said communication means is operative for communicating a transaction record associated with a transaction being conducted at the terminal during an authorization communications session when said communication means communicates with said remote location for requesting said authorization indicia, and is alternatively operative for transmitting said transaction record to said remote location during a subsequent communications session in the event that the terminal is unable to communicate with the remote location during said authorization communications session.

123. A data card transaction terminal, comprising:
means for detecting the physical presence of a data card at a data card terminal at which a transaction is recorded and for providing a card present flag, said data card terminal being operative for obtaining transaction information corresponding to a particular transaction;
means for electronically obtaining card identifying information relating to the data card from an information carrying medium associated with the data card;
means responsive to at least one predetermined characteristic of the data card transaction indicative of the validity of the transaction for providing a transaction protected flag associated with said transaction;
means for communicating said transaction information and said transaction protected flag from said data card terminal to a remote transaction processing means; and
chargeback protection flag means associated with said data card terminal for providing a chargeback protection flag indicative of whether transactions conducted with said data card terminal are chargeback protected.

124. The terminal of claim 123, wherein said communicating means is operative for receiving indicia transmitted from a remote location for selectively setting said chargeback protection flag.

125. The terminal of claim 123, wherein said at least one predetermined characteristic is chosen from the group comprising said card present flag, said transaction information, said card identifying information, and said chargeback protection flag.

126. The terminal of claim 125, further comprising means for capturing a signature provided by a holder of the data card who is purportedly authorized to conduct a transaction with the data card and for providing signature signals corresponding to the signature, and wherein said group of predetermined characteristics further comprises said signature signals.

127. The terminal of claim 125, wherein said communication means is operative for receiving transaction authorization indicia from a remotely located authorization source, and
wherein said group further comprises said authorization indicia.

128. A data card transaction terminal operative for communicating information corresponding to a data card transaction, comprising:
a card reader for obtaining card identifying information from an information source associated with a data card;
circuitry for setting a terminal parameter;
circuitry responsive to said terminal parameter and the nature of transaction data associated with the data card transaction for providing a transaction protected flag associated with said transaction; and
a communication device for communicating said card identifying information and said transaction protected flag to a remote transaction processor.

129. The terminal of claim 128, wherein said terminal parameter is selected from a group comprising a chargeback protection flag, an embossed reader flag, and a signature capture flag.

130. The terminal of claim 128, wherein said transaction data includes said card identifying information.

131. The terminal of claim 128, further comprising a signature capture device for capturing a signature of a customer in connection with a proposed transaction and for providing signature signals, said signature signals being communicated to said remote transaction processor by said communications device; and
wherein said transaction data includes said signature signals.

132. The terminal of claim 128, wherein said card reader detects the physical presence of a data card presented in connection with a proposed transaction and for providing a card present signal; and
wherein said transaction data includes said card present signal.

133. The terminal of claim 132, wherein said card reader comprises a magnetic stripe reader for reading a magnetic stripe associated with the data card.

134. The terminal of claim 132, wherein said card reader comprises an embossed card reader for detecting embossed characters formed in the data card.

135. The terminal of claim 128,
wherein said terminal parameter comprises a card type flag associated with a particular type of data card accepted by the terminal, and a chargeback protection flag associated with said card type flag, said chargeback protection flag indicative of whether transactions conducted with said particular type of data card are chargeback protected.

136. The terminal of claim 135, wherein said communications device is operative for receiving indicia transmitted from a remote location for selectively setting said chargeback protection flag.

137. The terminal of claim 128, wherein said communications device is operative for receiving transaction authorization indicia from a remotely located authorization source, and
wherein said transaction data includes said authorization indicia.

138. The terminal of claim 128, wherein said card reader comprises a magnetic stripe reader for reading a magnetic stripe associated with the data card.

139. The terminal of claim 128, wherein said card reader comprises an embossed card reader for detecting embossed characters formed in the data card.

140. The terminal of claim 128, further comprising authorization circuitry for requesting transaction authorization indicia from an authorization source.

141. The terminal of claim 128, wherein said card identifying information is provided in a plurality of sources on the data card,
wherein said card reader is operative for obtaining said card identifying information from a first source of said plurality of sources and from a second source of said plurality of sources; and further comprising:
verifying circuitry for verifying the accuracy of card identifying information obtained from said first source;
restoring circuitry for restoring at least a portion of said card identifying information obtained from said first source with information obtained from said second source in response to a determination by said verifying circuitry that said card identifying information obtained from said first source is not accurate.

142. The terminal of claim 141, wherein said first source comprises a magnetic stripe, and wherein said second source comprises embossed characters.

143. The terminal of claim 142, wherein said card identifying information comprises an account number associated with the data card, and wherein said verifying circuitry computes a longitudinal redundancy check (LRC) associated with said magnetic stripe, and wherein said restoring circuitry is operative for restoring at least a portion of the account number read from said magnetic stripe with at least a portion of the account number read from said embossed characters if said verifying circuitry determines that data read from said magnetic stripe is not accurate or complete.

144. The terminal of claim 141, wherein said first source comprises a first track associated with a magnetic stripe on the data card, and wherein said second source comprises a second track associated with the magnetic stripe on the data card.

145. The terminal of claim 144, wherein said card identifying information comprises an account number associated with the data card, and wherein said verifying circuitry computes a longitudinal redundancy check (LRC) associated with said first track, and wherein said restoring circuitry is operative for restoring at least a portion of the account number read from said first track with at least a portion of the account number read from said second track if said verifying circuitry determines that data read from said first track is not accurate or complete.

146. A data card transaction terminal, comprising:
a magnetic stripe reader for reading a magnetic stripe associated with a data card presented in connection with a proposed transaction and for providing card identifying information;
an embossed card reader for detecting embossed characters formed in the data card and for providing card identifying information;
a signature capture device for capturing a signature of a cardholder in connection with said proposed transaction and for providing signature signals;
circuitry for setting a terminal parameter;
circuitry responsive to said terminal parameter and the nature of transaction data associated with the proposed transaction for providing a transaction protected flag associated with said proposed transaction; and
a communications device for communicating said card identifying information and said transaction protected flag to a remote transaction processor.

147. The terminal of claim 146, wherein said transaction data comprises said said identifying information.

148. The terminal of claim 146, wherein said transaction data comprises said signature signals.

149. The terminal of claim 146, further comprising circuitry for detecting the physical presence of a data card at the terminal and for providing a card present flag; and
wherein said transaction data is selected from a group comprising said card present flag, said signature signals provided by said signature capture device, and said card identifying information from said magnetic stripe reader or said embossed card reader.

150. The terminal of claim 149, wherein said transaction protected flag providing circuitry is responsive to a plurality of said transaction data.

151. The terminal of claim 149, wherein said communications device is operative for requesting and receiving an authorization indicia from an authorization source, and
wherein said group of transaction data further comprises said authorization indicia.

152. The terminal of claim 149, wherein said card present detecting circuit comprises said magnetic strip reader.

153. The terminal of claim 149, wherein said card present detecting circuitry comprises said card card reader.

154. The terminal of claim 146, wherein said signals communicated to said remote transaction processor include an authorization request signal for requesting authorization indicia from an authorization source, and wherein said communications device is operative for communicating said authorization request signal to an authorization source as a request for authorization indicia.

155. The terminal of claim 154, wherein said signals communicated to said remote transaction processor include said signature signals and transaction information signals, and wherein said communications device is operative for transmitting said signature signals and said transaction information signals to said remote transaction processor while the terminal is communicating with said transaction processor for requesting said authorization indicia.

156. The terminal of claim 155, further comprising memory for storing said signature signals and said transaction information signals as a transaction record in a transaction batch, and wherein said communications device is operative for transmitting said transaction batch to said remote transaction processor during a communications session.

157. The terminal of claim 156, wherein said communications device is operative for communicating a transaction record associated with a transaction being conducted at the terminal during an authorization communications session when said communications device communicates with said remote transaction processor for requesting said authorization indicia, and is alternatively operative for transmitting said transaction record to said remote transaction processor during a subsequent communications session in the event that the terminal is unable to communicate with the remote transaction processor during said authorization communications session.

158. The terminal of claim 146, wherein said card identifying information comprises an account number associated with the data card.

159. The terminal of claim 146, wherein said magnetic stripe reader is operative for reacting a first track of information stored on the magnetic stripe of a data card and for reading a second track of information stored on the magnetic stripe of the data card, said first track and said second track including said card identifying information, and further comprising circuitry for restoring a portion of said card identifying information read from said first track with card identifying information read from said second track.

160. The terminal of claim 159, wherein said card identifying information provided by said magnetic stripe reader comprises an account number associated with the data card, and further comprising circuitry for verifying the accuracy of the data read from said first track, and wherein said restoring circuitry is operative for restoring at least a portion of the account number read from said first track with at least a portion of the account number read from said second track if said verifying circuitry detects that the data read from said first track is not accurate or complete.

161. The terminal of claim 160, wherein said verifying circuitry comprises circuitry for performing a longitudinal redundancy check (LRC).

162. The terminal of claim 160, wherein said verifying circuitry comprises circuitry for validating a checksum digit associated with the account number.

163. The terminal of claim 146, further comprising circuitry for restoring at least a portion of said card identifying information read from said magnetic stripe reader with at least a portion of said card identifying information provided by said embossed card reader.

164. The terminal of claim 163, further comprising circuitry for verifying the accuracy of said card identifying information provided by said magnetic stripe reader, and wherein said restating circuitry is operative for restoring at least a portion of card identifying information provided by said magnetic stripe reader with at least a portion of said card identifying information provided by said embossed card reader if said verifying circuitry detects that said card identifying information provided by said magnetic stripe reader is not accurate.

165. The terminal of claim 164, wherein said verifying circuitry comprises circuitry for performing a longitudinal redundancy check (LRC).

166. The terminal of claim 164, wherein said verifying circuitry comprises circuitry for validating a checksum digit associated with the account number.

167. The terminal of claim 146, wherein said terminal parameter is selected from a group comprising a chargeback protection flag, an embossed reader flag and a signature capture flag.

168. A data card transaction terminal, comprising:
a card reader for detecting the physical presence of a data card at a data card terminal at which a transaction is recorded and for providing a card present flag;
said data card terminal being operative for obtaining transaction information corresponding to said transaction;
said card reader operative for electronically obtaining card identifying information relating to the data card from an information carrying medium associated with the data card;
a signature capture device for capturing a signature provided by a holder of the data card who is purportedly authorized to conduct a transaction with the data card and for providing signature signals corresponding to the signature;
circuitry for setting a terminal parameter; and
circuitry responsive to said terminal parameter and the nature of transaction data associated with the transaction for providing a transaction protected flag associated with said transaction information, said transaction data selected from the group comprising said card present flag, said signature signals, and said card identifying information from said card reader.

169. The terminal of claim 168, wherein said transaction protected flag providing circuitry is responsive to a plurality of said transaction data.

170. The terminal of claim 168, wherein said card identifying information comprises an account number associated with the data card.

171. The terminal of claim 168, wherein said card identifying information is stored on a magnetic stripe associated with the data card, and wherein said card reader comprises a magnetic stripe reader operative to obtain at least a portion of said card identifying information from the data card.

172. The terminal of claim 171, wherein said magnetic stripe reader is operative for reading a first track of information stored on the magnetic stripe of the data card and for reading a second track of information stored on the magnetic stripe of the data card, said first track and said second track including said card identifying information, and further comprising circuitry for restoring at least a portion of said card identifying information read from said first track with card identifying information mad from said second track.

173. The terminal of claim 172, wherein said card identifying information comprises an account number and/or an expiration date associated with the data card, and further comprising circuitry for verifying the accuracy of the data read from said first track, and wherein said restoring circuitry is operative for restoring at least a portion of the account number and/or the expiration date read from said first track with at least a portion of the account number and/or the expiration date read from said second track if said verifying circuitry detects that the data read from said first track is not accurate.

174. The terminal of claim 173, wherein said verifying circuitry comprises circuitry for performing a longitudinal redundancy check (LRC).

175. The terminal of claim 172, wherein said card identifying information comprises an account number associated with the data card, and further comprising circuitry for verifying the accuracy of the account number read from said first track, and wherein said restoring circuitry is operative for restoring at least a portion of the account number read from said first track with at least a portion of the account number read from said second track if said verifying circuitry detects that the account number read from said first track is not accurate.

176. The terminal of claim 175, wherein said verifying circuitry comprises circuitry for validating a checksum digit associated with the account number.

177. The terminal of claim 171, wherein said card reader further comprises an embossed card reader operative to obtain at least a portion of said card identifying information from an embossed character region of the data card, and further comprising circuitry for restoring at least a portion of said card identifying information obtained by said magnetic stripe reader with card identifying information obtained by said embossed card reader.

178. The terminal of claim 177, wherein said card identifying information comprises an account number and/or an expiration data associated with the data card, and further comprising circuitry for verifying the accuracy of the data read by said magnetic stripe reader, and wherein said restoring circuitry is operative for restoring at least a portion of the account number and/or the expiration date read by said magnetic stripe reader with at least a portion of the account number and/or the expiration date read by said embossed card reader if said verifying circuitry detects that the data read from said first track is not accurate.

179. The terminal of claim 168, wherein said card identifying information is embossed in an embossed character region on the data card, and wherein said card reader comprises an embossed card reader operative to obtain at least a portion of said card identifying information from the embossed character region of the data card.

180. The terminal of claim 179, wherein said card identifying information is also stored on a magnetic stripe associated with the data card, wherein said card reader further comprises a magnetic stripe reader operative to obtain at least a portion of said card identifying information from the data card, and further comprising:
circuitry for restoring at least a portion of said card identifying information read from said magnetic stripe reader with at least a portion of said card identifying information provided by said embossed card reader.

181. The terminal of claim 168, wherein said card present flag comprises information indicative that said card reader successfully obtained said card identifying information electronically from the data card.

182. The terminal of claim 181, wherein said card reader comprises a magnetic stripe reader for obtaining said card identifying information from a magnetic stripe on the data card.

183. The terminal of claim 181, wherein said card reader comprises an embossed card reader for obtaining said card identifying information from an embossed character region on the data card.

184. The terminal of claim 168, further comprising a communications device for communicating said transaction information, said signature signals, and said transaction protected flag from said data card terminal to a remote transaction processor.

185. The terminal of claim 184, wherein said communications device is operative for receiving transaction authorization indicia from a remotely located authorization source, and wherein said transaction protected flag providing circuitry is responsive to said authorization indicia, said card present flag, said signature signals, and said card identifying information from said card reader for providing said transaction protected flag.

186. The terminal of claim 185, further comprising chargeback protection flag circuitry for indicating whether transactions conducted with said data card terminal are chargeback protected, and wherein said transaction protected flag circuitry is further responsive to the state of said chargeback protection flag for providing said transaction protected flag.

187. The terminal of claim 186, wherein said communications device is operative for receiving indicia transmitted from a remote location for selectively setting said chargeback protection flag.

188. The terminal of claim 185, wherein said remotely located authorization source comprises a computer system associated with a transaction processor, card issuing association, or a card issuer.

189. The terminal of claim 185, wherein said transaction processor host computer system operates as said authorization source, wherein said data card terminal communicates with said transaction processor host computer system for obtaining said authorization indicia, and wherein said data card terminal is operative for transmitting said signature signals, said transaction protected flag, and said transaction information to said transaction processor host computer system while said data card terminal is communicating with said host computer system for obtaining said authorization indicia.

190. The terminal of claim 189, further comprising memory in said data card terminal for storing said signature signals, said transaction protected flag, and said transaction information as a transaction record in a transaction batch, and wherein said data card terminal is operative for transmitting said transaction batch to said transaction processor host computer system during a communications session.

191. The terminal of claim 190, wherein said data card terminal is operative for communicating a transaction record associated with a transaction being conducted at the data card terminal during an authorization communications session when said data card terminal communicates with said transaction processor host computer system for obtaining said authorization indicia, and is alternatively operative for transmitting said transaction record to said transaction processor host computer system during a subsequent communications session in the event that said data card terminal is unable to communicate with said transaction processor host computer system during an authorization communications session.

192. The terminal of claim 168, wherein said signature capture device comprises:
a stylus;
a signature capturing window in which the card holder enters a signature with said stylus;
a digitizer for providing coordinate position signals of said stylus with respect to said signature capturing window;
a data compressor for compressing said coordinate position signals and for providing compressed signature signals.

193. The terminal of claim 168, wherein said terminal parameter is selected from a group comprising a chargeback protection flag, an embossed reader flag and a signature capture flag.

194. A transaction terminal operative for communicating information corresponding to a transaction concurrently with the transaction, comprising:
an input device for obtaining transaction information corresponding to a proposed transaction;
a signature capture device for capturing a signature of a customer in connection with the proposed transaction and for providing signature signals;
memory for storing said signature signals and said transaction information; and
a communications device for attempting to communicate said transaction information and said signature signals to a remote transaction processor via a first communications link during an initial time period substantially concurrently with the transaction,
said communications device being further operative for communicating said transaction information to said remote transaction processor via a second communications link during said initial time period in response to failure to establish said first communications link;
said memory operative to retain said signature signals in the event that said communications device is unable to communicate same to said remote transaction processor during said initial time period,
said communications device being further operative for attempting to communicate said signature signals to said remote transaction processor during a second time period subsequent to said initial time period in the event that said signals were not communicated during said initial time period.

195. The transaction terminal of claim 194, wherein said communications device is operative to:
dial a host computer when attempting to communicate said transaction information and said signature signals via said first communication link, and
dial an audio response unit (ARU) when attempting to communicate said transaction information via said second communications link.

196. A data card transaction terminal operative for communicating information corresponding to a data card transaction, comprising:
a card reader for obtaining card identifying information, said card identifying information being provided in a plurality of sources on the data card, and wherein said card reader is operative for obtaining said card identifying information from a first source of said plurality of sources and from a second source of said plurality of sources;
circuitry for verifying the accuracy of card identifying information obtained from said first source;
circuitry for restoring at least a portion of said card identifying information obtained from said first source with information obtained from said second source in response to a determination by said verifying circuitry that said card identifying information obtained from said first source is not accurate; and
a communications device for communicating said card identifying information signals to a remote transaction processor.

197. The terminal of claim 196, wherein said first source comprises a magnetic stripe, and wherein said second source comprises embossed characters.

198. The terminal of claim 197, wherein said card identifying information comprises an account number associated with the data card, and wherein said verifying circuitry computes a longitudinal redundancy check (LRC) associated with aid magnetic stripe, and wherein said restoring circuitry is operative for restoring at least a portion of the account number read from said magnetic stripe with at least a portion of the account number read from said embossed characters if said verifying circuitry determines that data read from said magnetic stripe is not accurate or complete.

199. The terminal of claim 196, wherein said first source comprises a first track associated with a magnetic stripe on the data card, and wherein said second source comprises a second track associated with the magnetic stripe on the data card.

200. The terminal of claim 199, wherein said card identifying information comprises an account number associated with the data card, and wherein said verifying circuitry computes a longitudinal redundancy check CLRC) associated with said first track, and wherein said restoring circuitry is operative for restoring at least a portion of the account number read from said first track with at least a portion of the account number read from said second track if said verifying circuitry determines that data read from said first track is not accurate or complete.

201. A data card transaction terminal, comprising:
a magnetic stripe reader for reading a magnetic stripe associated with a data card presented in connection with a proposed transaction and for providing card identifying information, said magnetic stripe reader operative for reading a first track of information stored on the magnetic stripe of a data card and for reading a second track of information stored on the magnetic stripe of the data card, said first track and said second track including said card identifying information;
circuitry for restoring a portion of said card identifying information read from said first track with card identifying information read from said second track; and
a communications device for communicating signals associated with a data card transaction to a remote transaction processor.

202. The terminal of claim 201, wherein said card identifying information provided by said magnetic stripe reader comprises an account number associated with the data card, and further comprising circuitry for verifying the accuracy of the data read from said first track, and wherein said restoring circuitry is operative for restoring at least a portion of the account number read from said first track with at least a portion of the account number read from said second track if said verifying circuitry detects that the data read from said first track is not accurate or complete.

203. The terminal of claim 202, wherein said verifying circuitry comprises circuitry for performing a longitudinal redundancy check (LRC).

204. The terminal of claim 202, wherein said verifying circuitry comprises circuitry for validating a checksum digit associated with the account number.

205. A data card transaction terminal, comprising:
a magnetic stripe reader for reading a magnetic stripe associated with a data card presented in connection with a proposed transaction and for providing card identifying information;
an embossed card reader for detecting embossed characters formed in the data card and for providing card identifying information;

circuitry for restoring at least a portion of said card identifying information read from said magnetic stripe reader with at least a portion of said card identifying information provided by said embossed card reader; and a communications device for communicating signals associated with a data card transaction to a remote transaction processor.

206. The terminal of claim 205, further comprising circuitry for verifying the accuracy of said card identifying information provided by said magnetic stripe reader, and wherein said restoring circuitry is operative for restoring at least a portion of card identifying information provided by said magnetic stripe reader with at least a portion of said card identifying information provided by said embossed card reader if said verifying circuitry detects that said card identifying information provided by said magnetic stripe reader is not accurate.

207. The terminal of claim 206, wherein said verifying circuitry comprises circuitry for performing a longitudinal redundancy check (LRC).

208. The terminal of claim 206, wherein said verifying circuitry comprises circuitry for validating a checksum digit associated with the account number.

209. A data card transaction terminal, comprising:
a card reader for detecting the physical presence of a data card at a data card terminal at which a transaction is recorded and for providing a card present flag, said data card terminal being operative for obtaining transaction information corresponding to the particular transaction;

said card reader operative for electronically obtaining card identifying information relating to the data card, said card identifying information being provided in a plurality of sources on the data card, said card reader being operative for obtaining said card identifying information from a first source of said plurality of sources and from a second source of said plurality of source;

circuitry for verifying the accuracy of card identifying information obtained from said first source;

circuitry for restoring at least a portion of said card identifying information obtained from said first source with information obtained from said second source in response to a determination by said verifying circuitry that said card identifying information obtained from said first source is not accurate or complete; and circuitry responsive to said card present flag and said card identifying information from said card reader for providing a transaction protected flag associated with said transaction information.

210. The terminal of claim 209, wherein said first source comprises a magnetic stripe, and wherein said second source comprises embossed characters.

211. The terminal of claim 210, wherein said card identifying information comprises an account number associated with the data card, and wherein said verifying circuitry comprises circuitry for checking a checksum associated with said account number, and wherein said restoring circuitry is operative for restoring at least a portion of the account number read from said magnetic stripe with at least a portion of the account number read from said embossed characters.

212. The terminal of claim 209, wherein said first source comprises a first track associated with a magnetic stripe on the data card, and wherein said second source comprises a second track associated with the magnetic stripe on the data card.

213. A data card transaction terminal, comprising:
a card under for detecting the physical presence of a data card at a data card terminal at which a transaction is recorded and for providing a card present flag, said data card terminal being operative for obtaining transaction information corresponding to the particular transaction;

said card reader operative for electronically obtaining card identifying information relating to the data card from an information carrying medium associated with the data card;

a signature capture device for capturing a signature provided by a holder of the data card who is purportedly authorized to conduct a transaction with the data card and for providing signature signals corresponding to the signature;

circuitry responsive to said card present flag, said signature signals, and said card identifying information from said card reader for providing a transaction protected flag associated with said transaction information;

a communications device said transaction information, said signature signals, and said transaction protection flag from said data card terminal to a remote transaction processor; and chargeback protection flag circuitry associated with said data card terminal for providing a chargeback protection flag indicative of whether transactions conducted with said data card terminal are chargeback protected, said communications device being operative for receiving indicia transmitted from a remote location for selectively setting said chargeback protection flag.

214. The terminal of claim 213, wherein said transaction protected flag circuitry is further responsive to the state of said chargeback protection flag for providing said transaction protected flag.

215. The terminal of claim 213, wherein said communications device is operative for receiving transaction authorization indicia from a remotely located authorization source, and
wherein said transaction protected flag providing circuitry is responsive to said authorization indicia, said card present flag, said signature signals, and said card identifying information for providing said transaction protected flag.

216. The terminal of claim 215, wherein said remotely located authorization source comprises a computer system associated with said transaction processor, a card issuing association, or a card issuer.

217. The terminal of claim 215, wherein a transaction processor host computer system operates as said authorization source, wherein said data card terminal communicates with said transaction processor host computer system for obtaining said authorization indicia, and wherein said data card terminal is operative for transmitting said signature signals, said transaction protected flag, and said transaction information to said transaction processor host computer system while said data card terminal is communicating with said host computer system for obtaining said authorization indicia.

218. The terminal of claim 217, further comprising memory in said data card terminal for storing said signature signals, said transaction protected flag, and said transaction information as a transaction record in a transaction batch, and wherein said data card terminal is operative for transmitting said transaction batch to said transaction processor host computer system during a communications session.

219. The terminal of claim 217, wherein said data card terminal is operative for communicating a transaction record associated with a transaction being conducted at the data card terminal during an authorization communications session when said data card terminal communicates with said transaction processor host computer system for obtaining said authorization indicia, and is alternatively operative for transmitting said transaction record to said transaction processor host computer system during a subsequent communications session in the event that said data card terminal is unable to communicate with said transaction processor host computer system during an authorization communications session.

220. A data card transaction terminal, comprising:
a magnetic stripe reader for reading a magnetic stripe associated with a data card presented in connection with a proposed transaction and for providing card identifying information, said magnetic stripe reader being operative for reading a first track of information stored on the magnetic stripe and for reading a second track of information stored on the magnetic stripe, said first track and said second track including said card identifying information;
circuitry for restoring a portion of said card identifying information read from said first track with card identifying information read from said second track;
an input device for obtaining transaction information; and
a communications device for communicating signals associated with a data card transaction to a remote transaction processor.

221. The terminal of claim 220, further comprising circuitry for verifying the accuracy of data read from said first track, and wherein said restoring circuitry is operative for restoring at least a portion of the account number read from said first track with at least a portion of the account number read from said second track if said verifying circuitry detects that the data read from said first track is not accurate.

222. The terminal of claim 221, wherein said verifying circuitry comprises circuitry for performing a longitudinal redundancy check (LRC).

223. A data card transaction terminal, comprising:
a magnetic stripe reader for reading a magnetic stripe associated with a data card presented in connection with a proposed transaction and for providing card identifying information;
an embossed card reader for detecting embossed characters formed in the data card and for providing card identifying information;
circuitry for restoring at least a portion of said card identifying information read from said magnetic stripe with at least a portion of said card identifying information read from said embossed characters;
an input device for obtaining transaction information; and
a communications device for communicating signals associated with a data card transaction to a remote transaction processor.

224. The terminal of claim 223, further comprising circuitry for verifying the accuracy of said card identifying information provided by said magnetic stripe reader, and wherein said restoring circuitry is operative for restoring at least a portion of card identifying information provided by said magnetic stripe reader with at least a portion of said card identifying information provided by said embossed card reader if said verifying circuitry detects that said card identifying information provided by said magnetic stripe reader is not accurate.

225. A data card transaction terminal, comprising:
a magnetic stripe reader for reading a magnetic stripe associated with a data card presented in connection with a proposed transaction and for providing card identifying information;
a signature capture device for capturing a signature of a cardholder in connection with a proposed transaction and for providing signature signals; and
a communications device for communicating signals associated with a data card transaction to a remote location, said communicated signals including transaction information signals, said signature signals and an authorization request signal for requesting authorization indicia from an authorization source associated with said remote location;
said communications device being operative for communicating said authorization request signal to said authorization source as a request for authorization indicia; and
said communications device being operative for transmitting said signature signals and said transaction information signals to said remote location while the terminal is communicating with said remote location for requesting said authorization indicia.

226. The terminal of claim 225, wherein said remote location comprises a transaction processor.

227. The terminal or claim 225, wherein said remote location comprises an authorization source.

228. The terminal of claim 227, wherein said authorization source comprises a transaction processor.

229. The terminal of claim 225, further comprising memory for storing said signature signals and said transaction information signals as a transaction record in a transaction batch, and wherein said communications device is operative for transmitting said transaction batch to said communication during a communications session.

230. The terminal of claim 229, wherein said communications device is operative for communicating a transaction record associated with a transaction being conducted at the terminal during an authorization communications session when said communications device communicates with said remote location for requesting said authorization indicia, and is alternatively operative for transmitting said transaction record to said remote location during a subsequent communications session in the event that the terminal is unable to communicate with the remote location during said authorization communications session.

231. A data card transaction terminal, comprising:
a card reader for detecting the physical presence of a data card at a data card terminal at which a transaction is recorded and for providing a card present flag, said data card terminal being operative for obtaining transaction information corresponding to a particular transaction;
said card reader operative for electronically obtaining card identifying information relating to the data card from an information carrying medium associated with the data card;

circuitry responsive to at least one predetermined characteristic of the data card transaction indicative of the validity of the transaction for providing a transaction protected flag associated with said transaction;

a communications device for communicating said transaction information and said transaction protected flag from said data card terminal to a remote transaction processor; and chargeback protection flag circuitry associated with said data card terminal for providing a chargeback protection flag indicative of whether transactions conducted with said data card terminal am chargeback protected.

232. The terminal of claim 231, wherein said communications device is operative for receiving indicia transmitted from a remote location for selectively setting said chargeback protection flag.

233. The terminal of claim 231, wherein said at least one predetermined characteristic is chosen from the group comprising said card present flag, said transaction information, said card identifying information, and said chargeback protection flag.

234. The terminal of claim 233, further comprising a signature capture device for capturing a signature provided by a holder of the data card who is purportedly authorized to conduct a transaction with the data card and for providing signature signals corresponding to the signature, and wherein said group of predetermined characteristics further comprises said signature signals.

235. The terminal of claim 233, wherein said communications device is operative for receiving transaction authorization indicia from a remotely located authorization source, and wherein said group further comprises said authorization indicia.

* * * * *